United States Patent
Zhou et al.

(10) Patent No.: US 11,337,263 B2
(45) Date of Patent: May 17, 2022

(54) PACKET BASED LINK AGGREGATION ARCHITECTURES

(71) Applicant: QUALCOMM Incorporated, San Diego, CA (US)

(72) Inventors: Yan Zhou, San Diego, CA (US); Abhishek Pramod Patil, San Diego, CA (US); Venkata Ramanan Venkatachalam Jayaraman, San Diego, CA (US); Alfred Asterjadhi, San Diego, CA (US); George Cherian, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 244 days.

(21) Appl. No.: 16/246,410

(22) Filed: Jan. 11, 2019

(65) Prior Publication Data

US 2019/0150214 A1     May 16, 2019

Related U.S. Application Data

(63) Continuation-in-part of application No. 15/872,805, filed on Jan. 16, 2018, now abandoned.
(Continued)

(51) Int. Cl.
*H04W 8/24* (2009.01)
*H04W 76/15* (2018.01)
(Continued)

(52) U.S. Cl.
CPC .......... *H04W 76/15* (2018.02); *H04L 1/1621* (2013.01); *H04W 8/24* (2013.01); *H04W 28/085* (2013.01); *H04W 84/12* (2013.01)

(58) Field of Classification Search
None
See application file for complete search history.

(56) References Cited

U.S. PATENT DOCUMENTS

| 6,816,111 B2 | 11/2004 | Krasner |
| 7,167,686 B2 | 1/2007 | See et al. |

(Continued)

FOREIGN PATENT DOCUMENTS

| CN | 1201298 A | 12/1998 |
| CN | 1938962 A | 3/2007 |

(Continued)

OTHER PUBLICATIONS

International Search Report and Written Opinion—PCT/US2020/012599—ISA/EPO—dated Apr. 15, 2020 (171386B1WO).
(Continued)

*Primary Examiner* — Kodzovi Acolatse
(74) *Attorney, Agent, or Firm* — Holland & Hart LLP

(57) ABSTRACT

Methods, systems, and devices for wireless communication are described. Wireless devices may support parallel communications over multiple wireless links, which may benefit a wireless system in terms of throughput and latency (among other benefits). However, such systems may experience increased system complexity, which may in some cases mitigate some of the benefits provided by the parallel communication links. The described techniques provide for aggregation architectures that address various such complexities. For example, devices communicating in accordance with the described techniques may format data to be transmitted into a set of data units that are allocated to a communication link based on various factors described herein. Correspondingly, a device that receives the data packets may reorder the packets in accordance with the described techniques.

30 Claims, 25 Drawing Sheets

Related U.S. Application Data

(60) Provisional application No. 62/448,326, filed on Jan. 19, 2017.

(51) Int. Cl.
  *H04L 1/16* (2006.01)
  *H04W 84/12* (2009.01)
  *H04W 28/08* (2009.01)

(56) References Cited

U.S. PATENT DOCUMENTS

| | | | |
|---|---|---|---|
| 8,483,223 B2 | 7/2013 | Black et al. | |
| 9,264,353 B2 | 2/2016 | Krishnaswamy et al. | |
| 2004/0081199 A1 | 4/2004 | Lopez et al. | |
| 2009/0116489 A1 | 5/2009 | Hanks | |
| 2010/0014448 A1 | 1/2010 | Wentink et al. | |
| 2010/0284476 A1 | 11/2010 | Potkonjak | |
| 2012/0281564 A1 | 11/2012 | Zhang et al. | |
| 2013/0077554 A1 | 3/2013 | Gauvreau et al. | |
| 2013/0088983 A1 | 4/2013 | Pragada et al. | |
| 2013/0114546 A1 | 5/2013 | Stanwood et al. | |
| 2013/0279427 A1 | 10/2013 | Wentink et al. | |
| 2014/0254349 A1 | 9/2014 | Jia et al. | |
| 2014/0269461 A1 | 9/2014 | Mehta | |
| 2014/0313932 A1 | 10/2014 | Saltsidis | |
| 2014/0328313 A1 | 11/2014 | Merlin et al. | |
| 2015/0117357 A1* | 4/2015 | Ozturk | H04W 24/10 370/329 |
| 2015/0156119 A1* | 6/2015 | Bello | H04L 47/125 370/236 |
| 2015/0271656 A1 | 9/2015 | Sachs et al. | |
| 2015/0282174 A1 | 10/2015 | Takeda et al. | |
| 2015/0288599 A1 | 10/2015 | Zhou et al. | |
| 2015/0341853 A1* | 11/2015 | Cho | H04W 48/20 370/331 |
| 2016/0073429 A1 | 3/2016 | Oteri et al. | |
| 2016/0285746 A1* | 9/2016 | Parron | H04L 45/245 |
| 2017/0111889 A1* | 4/2017 | Li | H04W 74/08 |
| 2017/0244528 A1 | 8/2017 | Gage et al. | |
| 2018/0054847 A1* | 2/2018 | Cariou | H04W 28/08 |
| 2018/0124642 A1 | 5/2018 | Phuyal et al. | |
| 2018/0184233 A1 | 6/2018 | Alpert et al. | |
| 2018/0205502 A1 | 6/2018 | Merlin et al. | |
| 2018/0206174 A1 | 7/2018 | Zhou et al. | |
| 2018/0206284 A1 | 7/2018 | Zhou et al. | |
| 2018/0324828 A1* | 11/2018 | Mukherjee | H04W 16/14 |
| 2018/0343659 A1 | 11/2018 | Hahn et al. | |
| 2018/0376374 A1 | 12/2018 | Trainin et al. | |
| 2019/0036651 A1 | 1/2019 | Chitrakar et al. | |
| 2021/0051563 A1 | 2/2021 | Zhou et al. | |

FOREIGN PATENT DOCUMENTS

| | | |
|---|---|---|
| CN | 101330309 A | 12/2008 |
| CN | 101346887 A | 1/2009 |
| CN | 105682149 A | 6/2016 |
| CN | 105704197 A | 6/2016 |
| KR | 20140069284 A | 6/2014 |
| WO | WO-2003065585 | 8/2003 |
| WO | WO-2004055543 | 7/2004 |
| WO | WO-2009099921 A2 | 8/2009 |
| WO | WO2010118371 A1 | 10/2010 |
| WO | WO-2013043506 | 3/2013 |
| WO | WO-2016144887 A1 | 9/2016 |
| WO | WO-2016163808 A1 | 10/2016 |

OTHER PUBLICATIONS

Huawei, et al., "L2 Reordering and Retransmission Functions", 3GPP Draft; R2-166195, 3rd Generation Partnership Project (3GPP), Mobile Competence Centre; 650, Route Des Lucioles; F-06921 Sophia-Antipolis Cedex; France, vol. RAN WG2, No. Kaohsiung; Oct. 10, 2016-Oct. 14, 2016, Oct. 9, 2016 (Oct. 9, 2016), 5 Pages, XP051150809, Retrieved from the Internet: URL: http://www.3gpp.org/ftp/Meetings_3GPP_SYNC/RAN2/Docs/ [retrieved on Oct. 9, 2016].

HTC: "Clarifications on LWA and LWIP", 3GPP Draft; 36300_CR0935_(REL-14)_R2-168096, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 14, 2016-Nov. 18, 2016, Dec. 9, 2016 (Dec. 9, 2016), XP051191741, Retrieved from the Internet: URL:http://www.3gpp.org/ftp/tsg_ran/WG2_RL2/Specifications/201612_draft_specs_after_RAN_74/ [retrieved on Dec. 9, 2016].

Intel Corporation: "UE Capabilities for eLWA", 3GPP Draft; R2-168583—UE Capabilities for Elwa, 3rd Generation Partnership Project (3GPP), Mobile Competence Centre; 650, Route Des Lucioles; F-06921 Sophia-Antipolis Cedex; France, vol. RAN WG2, No. Reno, Nevada, USA; Nov. 14, 2016-Nov. 16, 2016, Nov. 13, 2016 (Jan. 13, 2016), XP051178154, Retrieved from the Internet: URL:http://www.3gpp.org/ftp/Meetings_3GPP SYNC/RAN2/Docs/ [retrieved on Nov. 13, 2016].

International Search Report and Written Opinion—PCT/US2018/014059—ISA/EPO dated Jul. 4, 2018.

Partial International Search Report—PCT/US2018/014059—ISA/EPO—dated May 9, 2018.

Samsung: "Discussion on LWA Flow Control", 3GPP Draft; R3-152469_DICS of Flow Control, 3rd Generation Partnership Project (3GPP), Mobile Competence Centre 650, Route Des Lucioles; F-06921 Sophia-Antipolis Cedex France, vol. RAN WG3, No. Anaheim, U.S.A.; Nov. 16, 2015-2015112016, Nov. 2015 (Nov. 16, 2015), XP051007344, 6 Pages, Retrieved from Internet: URL:http://www.3gpp.org/ftp/Meetings_3GPP_SYNC/RAN3/Docs/ [retrieved on Nov. 16, 2015].

Taiwan Search Report—TW107101387—TIPO—dated Apr. 28, 2021 (171385TW).

\* cited by examiner

PACKET BASED LINK AGGREGATION ARCHITECTURES

CROSS REFERENCES

The present Application for Patent is a Continuation-In-Part of U.S. patent application Ser. No. 15/872,805 to Zhou et al., titled "PACKET BASED LINK AGGREGATION ARCHITECTURES", filed Jan. 16, 2018, which claims priority to U.S. Provisional Patent Application No. 62/448,326 to Zhou et al., titled "WI-FI MULTICHANNEL AGGREGATION", filed Jan. 19, 2017, assigned to the assignee hereof, and expressly incorporated herein.

BACKGROUND

The following relates generally to wireless communication, and more specifically to packet based link aggregation architectures.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the STA, and the uplink (or reverse link) may refer to the communication link from the STA to the AP.

Devices in a WLAN may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands. The wireless connection between an AP and STA may be referred to as a channel or link. Users may access these radio frequency spectrum bands using various contention-based protocols (e.g., as specified by one or more versions of IEEE 802.11). Each band (e.g., the 5 GHz band) may contain multiple channels (e.g., each spanning 20 MHz in frequency), each of which may be usable by an AP or STA. A channel may support multiple connections (e.g., between multiple STAs and the AP) in a multiple access configuration (e.g., code division multiple access (CDMA)). In some cases, the load or demand on one channel may be low at any particular instant, while the load or demand may be high on other channels. Improved methods for allocating data flows between available channels may thus be desired.

SUMMARY

The described techniques relate to improved methods, systems, devices, or apparatuses that support packet-based link aggregation architectures. Although described in the context of packet-based aggregation, aspects of the present disclosure additionally apply to communications in which a given traffic flow is associated with a specific link (e.g., for a same traffic identifier (TID), which may be referred to as flow-based aggregation). The described techniques provide multiple aggregation architectures, aspects of which may be combined or omitted to produce additional architectures without deviating from the scope of the present disclosure. An example architecture is described in which a transmitting device maintains a respective transmit queue for each link of the multi-link session. For example, such an architecture may support flow-based aggregation (e.g., in which each transmit queue is associated with a given type of traffic) or packet-based aggregation (e.g., in which packets are assigned to transmit queues, for example based on communication quality over the associated link). A second example architecture is described in which a transmitting device maintains a common transmit queue for all links (e.g., or a subset of the links) of the multi-link session. In some cases, the common transmit queue (or the per-link transmit queue) may be used in combination with an encoding process to improve transmission reliability (e.g., by increasing the entropy of a data stream and spreading this encoded data stream across multiple links, or a single link spreading over time). A third example architecture is described in which multiple sets of packet sequencing numbers are introduced. For example, in this architecture operations common across links may be based on a common sequence number while link-specific operations may be based on a per-link sequence number. Additionally, techniques for supporting aggregation over APs that are not co-located are described.

A method of wireless communication at a first wireless device is described. The method may include establishing a multi-link session between the first wireless device and a second wireless device, the multi-link session including a set of wireless links for communications in parallel between the first wireless device and the second wireless device and communicating, over the set of wireless links, parallel communications between the first wireless device and the second wireless device.

An apparatus for wireless communication at a first wireless device is described. The apparatus may include a processor, memory in electronic communication with the processor, and instructions stored in the memory. The instructions may be executable by the processor to cause the apparatus to establish a multi-link session between the first wireless device and a second wireless device, the multi-link session including a set of wireless links for communications in parallel between the first wireless device and the second wireless device and communicate, over the set of wireless links, parallel communications between the first wireless device and the second wireless device.

Another apparatus for wireless communication at a first wireless device is described. The apparatus may include means for establishing a multi-link session between the first wireless device and a second wireless device, the multi-link session including a set of wireless links for communications in parallel between the first wireless device and the second wireless device and communicating, over the set of wireless links, parallel communications between the first wireless device and the second wireless device.

A non-transitory computer-readable medium storing code for wireless communication at a first wireless device is described. The code may include instructions executable by a processor to establish a multi-link session between the first wireless device and a second wireless device, the multi-link session including a set of wireless links for communications in parallel between the first wireless device and the second wireless device and communicate, over the set of wireless links, parallel communications between the first wireless device and the second wireless device.

Some examples of the method, apparatuses, and non-transitory computer-readable medium described herein may further include operations, features, means, or instructions for formatting data to be transmitted to the second wireless device into a set of data units, and transmitting a first set of data units of the set of data units to the second wireless device over a first wireless link of the set of wireless links.

Some examples of the method, apparatuses, and non-transitory computer-readable medium described herein may further include operations, features, means, or instructions for receiving a second set of data units of the set of data units from the second wireless device over a second wireless link of the set of wireless links.

Some examples of the method, apparatuses, and non-transitory computer-readable medium described herein may further include operations, features, means, or instructions for transmitting a second set of data units of the set of data units to the second wireless device over a second wireless link of the set of wireless links.

Some examples of the method, apparatuses, and non-transitory computer-readable medium described herein may further include operations, features, means, or instructions for allocating the first set of data units to a first transmit queue for the first wireless link, and allocating the second set of data units to a second transmit queue for the second wireless link.

Some examples of the method, apparatuses, and non-transitory computer-readable medium described herein may further include operations, features, means, or instructions for allocating the set of data units to a common transmit queue for the first wireless link and the second wireless link.

Some examples of the method, apparatuses, and non-transitory computer-readable medium described herein may further include operations, features, means, or instructions for receiving messages from the second wireless device over a second wireless link of the set of wireless links, where the second wireless link includes a narrower bandwidth than the first wireless link. In some cases, the received messages from the second wireless device over the second wireless link may include feedback responsive to the transmitted first set of data units. In some cases, the plurality of wireless links may be synchronized in time.

Some examples of the method, apparatuses, and non-transitory computer-readable medium described herein may further include operations, features, means, or instructions where a first radio frequency spectrum band punctures the plurality of wireless links, the first radio frequency spectrum band different from each of a plurality of radio frequency spectrum bands corresponding to the plurality of wireless links of the multi-link session.

In some examples of the method, apparatuses, and non-transitory computer-readable medium described herein, communicating further may include operations, features, means, or instructions for communicating to the second wireless device over a first wireless link of the set of wireless links, and communicating to a third wireless device over a second wireless link of the set of wireless links.

Some examples of the method, apparatuses, and non-transitory computer-readable medium described herein may further include operations, features, means, or instructions for receiving a first set of data units from the second wireless device over a first wireless link of the set of wireless links, receiving a second set of data units from the second wireless device over a second wireless link of the set of wireless links, and reordering the first set of data units and the second set of data units to generate a single data message for the second wireless device.

Some examples of the method, apparatuses, and non-transitory computer-readable medium described herein may further include operations, features, means, or instructions for aggregating the first set of data units into a first receive queue for the first wireless link, and aggregating the second set of data units into a second receive queue for the second wireless link.

A method of wireless communication is described. The method may include establishing a multi-link session between the first wireless device and the second wireless device, the multi-link session comprising a plurality of wireless links for communications in parallel between the first wireless device and the second wireless device, formatting data to be transmitted to the second wireless device into a plurality of data units, transmitting a first set of data units of the plurality of data units to the second wireless device over a first wireless link of the plurality of wireless links, and transmitting a second set of data units of the plurality of data units to the second wireless device over a second wireless link of the plurality of wireless links.

An apparatus for wireless communication is described. The apparatus may include means for establishing a multi-link session between the first wireless device and the second wireless device, the multi-link session comprising a plurality of wireless links for communications in parallel between the first wireless device and the second wireless device, means for formatting data to be transmitted to the second wireless device into a plurality of data units, means for transmitting a first set of data units of the plurality of data units to the second wireless device over a first wireless link of the plurality of wireless links, and means for transmitting a second set of data units of the plurality of data units to the second wireless device over a second wireless link of the plurality of wireless links.

Another apparatus for wireless communication is described. The apparatus may include a processor, memory in electronic communication with the processor, and instructions stored in the memory. The instructions may be operable to cause the processor to establish a multi-link session between the first wireless device and the second wireless device, the multi-link session comprising a plurality of wireless links for communications in parallel between the first wireless device and the second wireless device, format data to be transmitted to the second wireless device into a plurality of data units, transmit a first set of data units of the plurality of data units to the second wireless device over a first wireless link of the plurality of wireless links, and transmit a second set of data units of the plurality of data units to the second wireless device over a second wireless link of the plurality of wireless links.

A non-transitory computer-readable medium for wireless communication is described. The non-transitory computer-readable medium may include instructions operable to cause a processor to establish a multi-link session between the first wireless device and the second wireless device, the multi-link session comprising a plurality of wireless links for communications in parallel between the first wireless device and the second wireless device, format data to be transmitted to the second wireless device into a plurality of data units, transmit a first set of data units of the plurality of data units to the second wireless device over a first wireless link of the plurality of wireless links, and transmit a second set of data units of the plurality of data units to the second wireless device over a second wireless link of the plurality of wireless links.

Some examples of the method, apparatus, and non-transitory computer-readable medium described herein may further include processes, features, means, or instructions for allocating the first set of data units to a first transmit queue for the first wireless link. Some examples of the method, apparatus, and non-transitory computer-readable medium described herein may further include processes, features, means, or instructions for allocating the second set of data units to a second transmit queue for the second wireless link.

Some examples of the method, apparatus, and non-transitory computer-readable medium described herein may further include processes, features, means, or instructions for assigning a respective sequence number of a set of sequence numbers to each of the plurality of data units, the set of sequence numbers indicating an order of the plurality of data units for the data.

Some examples of the method, apparatus, and non-transitory computer-readable medium described herein may further include processes, features, means, or instructions for assigning a respective sequence number of a first set of sequence numbers to each of the first set of data units to be transmitted over the first wireless link. Some examples of the method, apparatus, and non-transitory computer-readable medium described herein may further include processes, features, means, or instructions for assigning a respective sequence number of a second set of sequence numbers to each of the second set of data units to be transmitted over the second wireless link.

Some examples of the method, apparatus, and non-transitory computer-readable medium described herein may further include processes, features, means, or instructions for assigning each of a third set of sequence numbers to one of the first set of data units or the second set of data units, wherein each of the first set of data units may be assigned one of the first set of sequence numbers and one of the third set of sequence numbers, and wherein each of the second set of data units may be assigned one of the second set of sequence numbers and one of the third set of sequence numbers.

Some examples of the method, apparatus, and non-transitory computer-readable medium described herein may further include processes, features, means, or instructions for allocating the plurality of data units to a common transmit queue for the first wireless link and the second wireless link.

Some examples of the method, apparatus, and non-transitory computer-readable medium described herein may further include processes, features, means, or instructions for determining a value of a parameter that indicates availability of the first wireless link, or the second wireless link, or both, for transmissions to the second wireless device. Some examples of the method, apparatus, and non-transitory computer-readable medium described herein may further include processes, features, means, or instructions for allocating one or more of the plurality of data units in the common transmit queue to one of the first wireless link or the second wireless link based at least in part on the value of the parameter.

Some examples of the method, apparatus, and non-transitory computer-readable medium described herein may further include processes, features, means, or instructions for assigning a transmitter address, or a receiver address, or a traffic identifier, or a combination thereof, to each of the plurality of wireless links. Some examples of the method, apparatus, and non-transitory computer-readable medium described herein may further include processes, features, means, or instructions for establishing a block acknowledgement session between the first wireless device and the second wireless device based at least in part on the assignment.

In some examples of the method, apparatus, and non-transitory computer-readable medium described herein, establishing the multi-link session between the first wireless device and the second wireless device further comprises: assigning a common value of an operational parameter to the first wireless link and the second wireless link, the operational parameter comprising a sequence number, or a frame number, or a packet number, or a fragment size, or a transmitter address, or a receiver address, or an encryption key, or a combination thereof.

In some examples of the method, apparatus, and non-transitory computer-readable medium described herein, assigning the common value of the operational parameter comprises: identifying a first value of the operational parameter for the first wireless link. Some examples of the method, apparatus, and non-transitory computer-readable medium described herein may further include processes, features, means, or instructions for identifying a second value of the operational parameter value for the second wireless link. Some examples of the method, apparatus, and non-transitory computer-readable medium described herein may further include processes, features, means, or instructions for assigning one of the first value or the second value of the operational parameter to be the common value according to a selection criterion for the operational parameter.

Some examples of the method, apparatus, and non-transitory computer-readable medium described herein may further include processes, features, means, or instructions for duplicating one or more data units of the plurality of data units prior to transmission, wherein at least one of the first set of data units transmitted over the first wireless link comprises the duplicated one or more data units, and wherein at least one of the second set of data units transmitted over the second wireless link comprises the duplicated one or more data units.

Some examples of the method, apparatus, and non-transitory computer-readable medium described herein may further include processes, features, means, or instructions for encoding the data into a plurality of encoding symbols, the data recoverable at the second wireless device by decoding a subset of the plurality of encoding symbols. Some examples of the method, apparatus, and non-transitory computer-readable medium described herein may further include processes, features, means, or instructions for formatting the plurality of encoding symbols into the plurality of data units.

In some examples of the method, apparatus, and non-transitory computer-readable medium described herein, transmitting the first set of data units comprises: identifying a pseudo-random sequence known to both the first wireless device and the second wireless device. Some examples of the method, apparatus, and non-transitory computer-readable medium described herein may further include processes, features, means, or instructions for transmitting the first set of data units using a plurality of frequency resources of the multi-link session according to the identified pseudo-random sequence.

In some examples of the method, apparatus, and non-transitory computer-readable medium described herein, establishing the multi-link session between the first wireless device and the second wireless device comprises: establishing the first wireless link between a first lower media access control (MAC) layer of the first wireless device and a first lower MAC layer of the second wireless device. Some examples of the method, apparatus, and non-transitory computer-readable medium described herein may further include processes, features, means, or instructions for establishing the second wireless link between a second lower MAC layer of the first wireless device and a second lower MAC layer of the second wireless device, wherein the first lower MAC layer and the second lower MAC layer of the first wireless device may be in communication with a common upper MAC layer of the first wireless device.

A method of wireless communication is described. The method may include establishing a multi-link session between the first wireless device and the second wireless device, the multi-link session comprising a plurality of wireless links for communications in parallel between the first wireless device and the second wireless device, receiving a first set of data units from the second wireless device over a first wireless link of the plurality of wireless links, receiving a second set of data units from the second wireless device over a second wireless link of the plurality of wireless links, and reordering the first set of data units and the second set of data units to generate a single data message for the second wireless device.

An apparatus for wireless communication is described. The apparatus may include means for establishing a multi-link session between the first wireless device and the second wireless device, the multi-link session comprising a plurality of wireless links for communications in parallel between the first wireless device and the second wireless device, means for receiving a first set of data units from the second wireless device over a first wireless link of the plurality of wireless links, means for receiving a second set of data units from the second wireless device over a second wireless link of the plurality of wireless links, and means for reordering the first set of data units and the second set of data units to generate a single data message for the second wireless device.

Another apparatus for wireless communication is described. The apparatus may include a processor, memory in electronic communication with the processor, and instructions stored in the memory. The instructions may be operable to cause the processor to establish a multi-link session between the first wireless device and the second wireless device, the multi-link session comprising a plurality of wireless links for communications in parallel between the first wireless device and the second wireless device, receive a first set of data units from the second wireless device over a first wireless link of the plurality of wireless links, receive a second set of data units from the second wireless device over a second wireless link of the plurality of wireless links, and reorder the first set of data units and the second set of data units to generate a single data message for the second wireless device.

A non-transitory computer-readable medium for wireless communication is described. The non-transitory computer-readable medium may include instructions operable to cause a processor to establish a multi-link session between the first wireless device and the second wireless device, the multi-link session comprising a plurality of wireless links for communications in parallel between the first wireless device and the second wireless device, receive a first set of data units from the second wireless device over a first wireless link of the plurality of wireless links, receive a second set of data units from the second wireless device over a second wireless link of the plurality of wireless links, and reorder the first set of data units and the second set of data units to generate a single data message for the second wireless device.

Some examples of the method, apparatus, and non-transitory computer-readable medium described herein may further include processes, features, means, or instructions for aggregating the first set of data units into a first receive queue for the first wireless link. Some examples of the method, apparatus, and non-transitory computer-readable medium described herein may further include processes, features, means, or instructions for aggregating the second set of data units into a second receive queue for the second wireless link.

In some examples of the method, apparatus, and non-transitory computer-readable medium described herein, reordering the first set of data units and the second set of data units to generate a single data message for the second wireless device comprises: identifying, for each data unit of the first set of data units and the second set of data units, one of a set of sequence numbers common between the first set of data units and the second set of data units. Some examples of the method, apparatus, and non-transitory computer-readable medium described herein may further include processes, features, means, or instructions for reordering the first set of data units and the second set of data units based at least in part on the identified set of sequence numbers to generate the single data message.

In some examples of the method, apparatus, and non-transitory computer-readable medium described herein, reordering the first set of data units and the second set of data units to generate a single data message for the second wireless device comprises: identifying, for each data unit of the first set of data units, one of a first set of sequence numbers for the first set of data units. Some examples of the method, apparatus, and non-transitory computer-readable medium described herein may further include processes, features, means, or instructions for identifying, for each data unit of the second set of data units, one of a second set of sequence numbers for the first set of data units. Some examples of the method, apparatus, and non-transitory computer-readable medium described herein may further include processes, features, means, or instructions for reordering the first set of data units and the second set of data units based at least in part on the identified first set of sequence numbers and the identified second set of sequence numbers to generate the single data message.

Some examples of the method, apparatus, and non-transitory computer-readable medium described herein may further include processes, features, means, or instructions for replaying checking the reordered first set of data units and the second set of data units. Some examples of the method, apparatus, and non-transitory computer-readable medium described herein may further include processes, features, means, or instructions for defragmenting the reordered first set of data units and the second set of data units.

DETAILED DESCRIPTION

Figure 1:
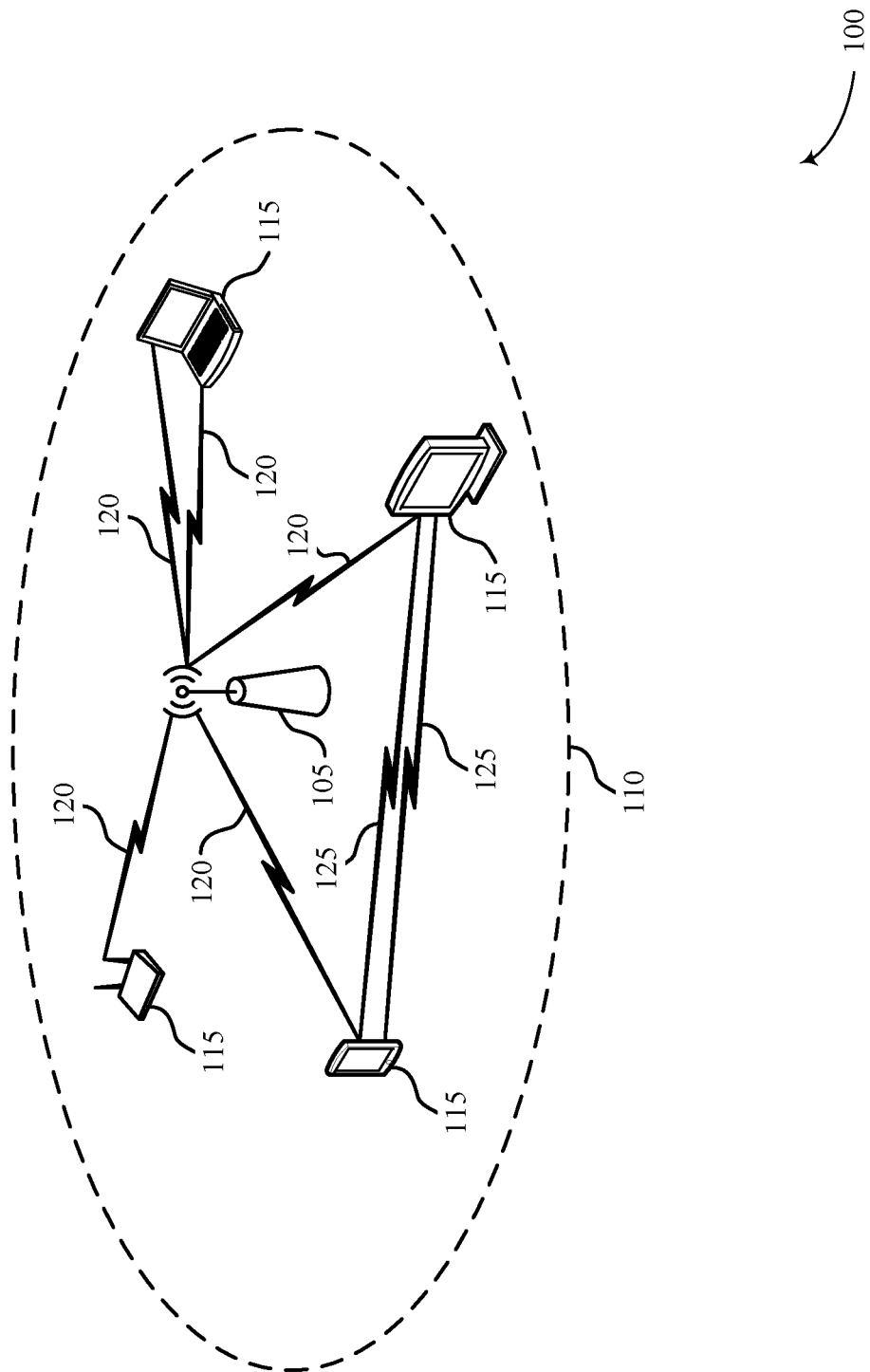
FIG. 1 illustrates an example of a WLAN that supports packet based link aggregation architectures in accordance with aspects of the present disclosure.

Some wireless communications systems may support multiple parallel links between communicating devices (e.g., to increase throughput, to improve link efficiency, to reduce latency, etc.). A wireless link may refer to a communication path between devices and each link may support one or more channels (e.g., logical entities) that support multiplexing of data, such that during at least some duration of time, transmissions or portions of transmissions may occur over both links at the same time, either synchronously or asynchronously. The wireless links may be in the same or different radio frequency (RF) spectrum bands. Each link of a multi-link session may be associated with respective physical components (e.g., antennas, amplifiers, including power amplifiers and low noise amplifiers, etc.) and/or logical processing components (e.g., physical (PHY) layers, media access control (MAC) layers, etc.) of a given wireless device, and these components may be configured to support multi-link communications. The multiple links may connect wireless devices at the MAC layer (e.g., each link may connect respective lower MAC components of communicating devices). The MAC layer may aggregate data packets from the multiple wireless links to provide to upper layers (if the wireless device is receiving) or receive from upper layers (if the wireless devices is transmitting) of the device (e.g., using multiple connections from the MAC layer to the PHY layer). Such parallel communications, while benefiting the system in terms of throughput and spectral utilization, may increase the complexity of the system. For example, these communications may require or benefit from improved transmission architectures to facilitate successful decoding and re-ordering of received packets.

In some cases, the multi-link session may employ a packet-based aggregation architecture (e.g., in which packets are dynamically allocated to links). Such architectures may improve key performance indicators such as user-perceived throughput (UPT) and reduce latency relative to non-aggregated communications. However, supporting parallel communications may increase the complexity of a wireless system. For example, a device may receive packets associated with a single traffic flow over multiple links and need to reorder the packets to successfully decode the transmitted information. Additionally or alternatively, some of the packets may be corrupted (e.g., may experience interference or signal attenuation) during propagation across a wireless medium and need to be retransmitted, which may introduce additional complexities. Improved packet-based link aggregation architectures may be desired.

In a first set of examples, a transmitting wireless device may maintain a packet queue for each wireless link of a multi-link session. Considerations for such an architecture are described further below (e.g., with reference to FIG. 5). In a second set of examples, a wireless device may maintain a common transmit queue for all links of the multi-link session (e.g., as further described with reference to FIG. 6). In some cases, aspects of these architectures may be modified or combined to produce additional architectures. For example, an architecture may be used in which a first subset of links of a multi-link session use a common transmit queue and a second subset of links of the multi-link session use per-link transmit queues. Another set of example architectures includes considerations for segmenting operations that are common across all links from operations that are specific to a given link (e.g., as further described with reference to FIG. 7). Each of these architectures may in some cases be performed by APs that are not co-located, as described with reference to FIGS. 9A and 9B. For example, a STA may exchange aggregation capability information with multiple APs and identify a suitable set of APs for aggregated communication.

Aspects of the disclosure are initially described in the context of a wireless communications system. Aspects of the disclosure are then described with reference to process flow diagrams and packet allocation schemes. Aspects of the disclosure are further illustrated by and described with reference to apparatus diagrams, system diagrams, and flowcharts that relate to signaling for link aggregation setup and reconfiguration.

FIG. 1 illustrates a WLAN 100 (also known as a Wi-Fi network) configured in accordance with various aspects of the present disclosure. The WLAN 100 may include an AP 105 and multiple associated STAs 115, which may represent devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, 802.11az, 802.11ba, etc. In other implementations, peer-to-peer connections or ad hoc networks may be implemented within WLAN 100. Devices in WLAN 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier-sense multiple access (CSMA)/collision avoidance (CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This exchange may alert other devices within range of the sender and receiver not to transmit for the duration of the primary transmission. Thus, RTS/CTS handshake may help mitigate a hidden node problem.

In a system supporting multi-link aggregation (which may also be referred to as multi-channel aggregation), some of the traffic associated with a single STA 115 may be transmitted across multiple parallel communication links 120 (which may also be referred to as "links" or "wireless links" herein). Multi-link aggregation may thus provide a means to increase network capacity and maximize the utilization of available resources. In some cases, each communication link 120 for a given wireless device may be associated with a respective radio of the wireless device (e.g., where a radio comprises transmit/receive chains, physical antennas, signal processing components, etc.). Multi-link aggregation may be implemented in a number of ways. As a first example, the multi-link aggregation may be packet-based. In packet-based aggregation, frames of a single traffic flow (e.g., all traffic associated with a given traffic identifier (TID)) may be sent in parallel across multiple communication links 120 (e.g., on multiple channels). In some cases, the multiple communication links 120 may operate in the same RF spectrum band (e.g., each link may be in the 5 GHz band, and use channels in the 5 GHz band). In other cases, the multiple communication links 120 may be in different RF spectrum bands (e.g., one may be in the 2.4 GHz band while another is in the 5 GHz band). Each link may be associated with a different PHY layer and lower MAC layer as described with reference to FIG. 4. In such an implementation, management of the aggregation of the separate communication links 120 may be performed at a higher MAC layer. The multilink aggregation implemented at the lower MAC layers and PHY layers may be transparent to the upper layers of the wireless device.

As another example, the multi-link aggregation may be flow-based. In flow-based aggregation, each traffic flow (e.g., all traffic associated with a given TID) may be sent using one of multiple available communication links 120. As an example, a single STA 115 may access a web browser while streaming a video in parallel. The traffic associated with the web browser access may be communicated over a first channel of a first communication link 120 while the traffic associated with the video stream may be communicated over a second channel of a second communication link 120 in parallel (e.g., at least some of the data may be transmitted on the first channel concurrent with data transmitted on the second channel). In some examples, the transmissions on the first communication link 120 and the second communication link 120 may be synchronized. In other examples, the transmissions may be asynchronous. As described herein, the channels may belong to the same RF band or to different RF bands. In the case of three communication links 120 (e.g., or other numbers of communication links greater than two), all three communication links 120 may support operation over the same RF band (e.g., all three in the 5 GHz RF band). In other cases, two communication links 120, but not the third, may support operation over the same RF band (e.g., two links in the 5 GHz RF band, and one link in the 2.4 GHz RF band). Or, in still other cases each of the three communication links 120 may support operation for a separate RF band. In some cases, flow-based aggregation may not use cross-link packet scheduling and reordering (e.g., which may be used to support packet-based aggregation). Alternatively, in the case of a single flow (e.g., in the case that the STA 115 simply attempts to access a web browser), aggregation gain may not be available.

In other embodiments, a hybrid of flow-based and packet-based aggregation may be employed. As an example, a device may employ flow-based aggregation in situations in which multiple traffic flows are created and may employ packet-based aggregation in other situations. The decision to switch between multi-link aggregation techniques (e.g., modes) may additionally or alternatively be based on other metrics (e.g., a time of day, traffic load within the network, available battery power for a wireless device, etc.). It is to be understood that while aspects of the preceding are described in the context of a multi-link session involving two (or more) communication links 120, the described concepts may be extended to a multi-link session involving multiple direct wireless links 125.

To support the described multi-link aggregation techniques, APs 105 and STAs 115 may exchange supported aggregation capability information (e.g., supported aggregation type, supported frequency bands, etc.). In some cases, the exchange of information may occur via a beacon signal, a Fast Initial Link Setup (FILS) Discovery (FD) frame, a broadcast probe response frame, a probe request, association request, a probe response, association response, dedicated action frames, an operating mode indicator (OMI), etc. In some cases, an AP 105 may designate a given channel in a given band as an anchor link (e.g., the wireless link on which it transmits beacons and other management frames (such as FD frames, broadcast probe response, probe request or response, (re)association request or response frames)), which may also be referred to as an anchor channel in some instances. In this case, the AP 105 may transmit beacons (e.g., which may contain less information) on other channels or links for discovery purposes. Although described as being frequency-based, the anchor link could additionally or alternatively be time based, and refer to a point in time (e.g., an AP 105 may transmit its beacon during a certain time interval on one or more links). In some examples, an anchor link may be link 125 and may have a narrower bandwidth than another active link 125 in the multi-link session. The wider bandwidth link may be used to transmit data based on the communications on the narrow anchor link 125. In some cases, a lower frequency band may be used alternatively or in addition to a narrow bandwidth, and a higher frequency band may be used alternatively or in addition to a wide bandwidth. For example, anchor link 125 may be a 2.4 GHz band and data may be transmitted on a 5 GHz band. A narrow bandwidth or low frequency band may provide increased reliability and better range over a wider bandwidth or higher frequency band.

To support the described multi-link aggregation techniques, APs 105 and STAs 115 may exchange or advertise their capability to support certain types of aggregation. For example, the capabilities to support certain types of aggregation may include if each link 125 can be of different size or bandwidth, the maximum bandwidth APs 105 and/or STAs 115 can support on a particular link 125 (e.g., based on if the link is on a particular frequency band such as 2.4 GHz the maximum bandwidth may be 40 MHz), if APs 105 and/or STAs 115 support puncturing of a wideband to support multi-link, if APs 105 and/or STAs 115 support FD over multiple links, if APs 105 and/or STAs 115 support in-band aggregation, if APs 105 and/or STAs 115 support independent link (i.e., multiple primary) or common PPDU (i.e., single primary). In some examples, APs 105 and STAs 115 may exchange or advertise their capability through management signaling. Management signaling may include management frames carrying information elements (IEs) such as a high throughput (HT) capability element, very high throughput (VHT) capability element, high efficiency (HE) capability element, an extended capabilities element, or a new element such as an extremely high throughput (EHT) capabilities element or multi-link aggregation capability element. If the support of certain types of aggregation is dynamic, then APs 105 and STAs 115 may exchange or advertise their capability through an operating element such as HT operation element, VHT operation element, HE operation element, EHT operation element, or a new element such as a multi-link aggregation operation element. In some examples, a single management frame may carry multiple elements, for example both an HE capability element and an HE operation element. In other examples, such elements may be carried in separate management frames. In some examples, the AP 105 and STAs 115 may exchange or advertise their multi-link capability via a new element, such as multi-link aggregation element, or via an existing element, such as a multi-band aggregation element.

In some examples, in multi-link aggregation, each link may use its own transmit queue. In other examples, a common transmit queue may be used across the links. In some examples, each link may have a unique transmitter address (TA) and receiver address (RA). In other examples, the TA and RA may be common across the multiple links used for multi-link aggregation. In other examples, one or more of a sequence number (SN), frame number (FN), and/or packet number (PN) may be common across the communication links. Other items that may be common (or different) across two or more of the links include encryption keys, MAC packet data unit (MPDU) generation, aggregated MAC service data unit (AMSDU) constraints, fragment size, reordering, replay check, and/or de-fragmentation techniques. In other examples, encryption keys may be per-link.

In various examples, block acknowledgements (BAs) may be sent in response to multi-link transmissions. A BA may refer to an acknowledgment (ACK) for multiple MPDUs sent together (e.g., an ACK for a block of MPDUs). The transmitting device (e.g., the device requesting the BA) and the receiving device (e.g., the device transmitting the BA) may establish a BA session (also known as a BA agreement) for during a setup phase, negotiating an agreement regarding the terms and capabilities for the BA session (e.g., using an add BA (ADDBA) request and response procedure). The transmitting device and receiving device may exchange capability information such as BA size, buffer size, window size (e.g., a sliding window), and/or policy, and then agree on the common parameters for each of the receiving device and the transmitter device to use. The BA agreement may be later torn down (e.g., using a delete BA (DELBA) request).

Both the transmitting device and the receiving device may maintain a sliding window (e.g., a BA window), and may have previously negotiated the size of the BA. For example, a BA session may have a BA size of 64 MPDUs (e.g., other BA size examples may include 256 MPDUs, 1024 MPDUs, etc.). In such cases, a transmitting device may transmit 64 MPDUs followed by a block acknowledgment request (BAR). In response to the BAR, the receiving device may, upon reception of the 64 MPDUs and the BAR, transmit a BA to the transmitting device. The BA may indicate whether all 64 MPDUs were received correctly, which MPDUs are missing, etc. In some cases, a BA may be used to indicate the longer BA window, or a capability exchange or agreement defining the larger BA window may also be sent. In other examples, a single SN may be used, but with multiple scoreboards (e.g., one scoreboard per channel or link), or with a common, global scoreboard as well as per-link scoreboards. Multi-link aggregation (e.g., flow-based and/or packet-based) may increase network capacity by efficiently allocating utilization of multiple links (and multiple channels).

Figure 2:
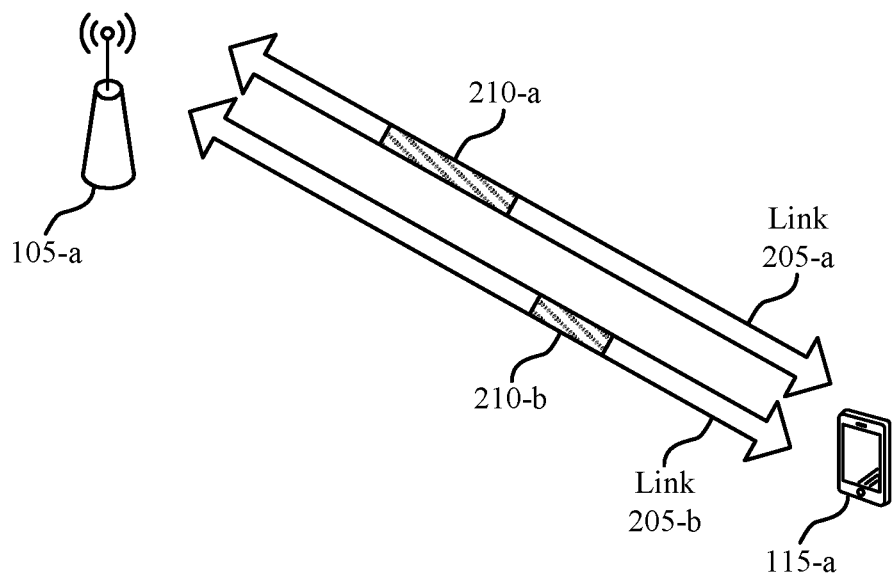
FIG. 2 illustrates an example of a WLAN that supports packet based link aggregation architectures in accordance with aspects of the present disclosure.

FIG. 2 illustrates an example of a WLAN 200 that supports packet based link aggregation architectures in accordance with aspects of the present disclosure. In some examples, WLAN 200 may implement aspects of WLAN 100. A wireless connection between AP 105-*a* and STA 115-*a* may be referred to as a link 205 or a communication link, and each link 205 may include one or more channels. As an example, WLAN 200 may support multi-link aggregation such that AP 105-*a* and STA 115-*a* may communicate in parallel over two or more links (e.g., link 205-*a* and link 205-*b*). STA 115-*a* may thus receive packets (e.g., MPDUs) over both link 205-*a* and link 205-*b* from AP 105-*a*. Such parallel communications 210-*a* and 210-*b* over the two or more links may be synchronized or asynchronous, and may be uplink, or downlink, or a combination of uplink and downlink (e.g., full duplexing) during a particular duration of time. In an example of a full duplex configuration, one or more links may be used for uplink transmissions, while during a same time one or more links may be used for downlink transmissions. As described herein, the parallel communications 210-*a* and 210-*b* over the two or more links 205-*a* and 205-*b* may occur between two STAs 115 (e.g., which may be referred to as sidelink communication) without deviating from the scope of the present disclosure.

Such multi-link aggregation may provide multiple benefits to WLAN 200. For example, multi-link aggregation may improve UPT (e.g., by quickly flushing per-user transmit queues). Similarly, multi-link aggregation may improve throughput for WLAN 200 by improving utilization of available channels (e.g., by increasing trunking gains). That is, multi-link aggregation may increase spectral utilization and may increase the bandwidth-time product. Networks that do not support multi-link aggregation may experience under-utilization of spectrum in non-uniform (e.g., bursty) traffic conditions. For example, the communication load over a given link 205 (e.g., link 205-a) may be low at any particular instant, whereas the demand may be high for another link 205 (e.g., link 205-b). By allowing a single traffic flow (e.g., a single internet protocol (IP) flow) to span across different links 205, the overall network capacity may be increased.

Further, multi-link aggregation may enable smooth transitions between multi-band radios (e.g., where each radio may be associated with a given RF band) and/or enable a framework to setup separation of control channels and data channels. Other benefits of multi-link aggregation include reducing the ON time of a modem, which may benefit a wireless device in terms of power consumption though the final power-saving gains may in some cases depend on other factors including processing requirements, RF bandwidth, etc. Multi-link aggregation additionally increases multiplexing opportunities in the case of a single BSS. That is, multi-link aggregation may increase the number of users per multiplexed transmission served by the multi-link AP 105-a.

In some cases, multi-link aggregation may be supported (including initiated) through signaling between STA 115-a and AP 105-a (or a peer STA 115). As an example, STA 115-a may indicate to AP 105-a (or the peer STA 115) whether it supports multi-link aggregation. For example, STA 115-a may indicate that it supports multi-link aggregation in general, for a particular RF spectrum band, for a link 205 of a given RF spectrum band, etc. Such signaling could be static (e.g., in the form of beacons, FD frames, probes, association or re-association frames, etc.), semi-static, or dynamic (e.g., via OMI or other similar operational parameters). In some cases, AP 105-a (e.g., or the peer STA 115) may decide whether to aggregate communications with STA 115-a based at least in part on the capabilities advertised by STA 115-a.

However, multi-link aggregation may also have implementation challenges. For example, packets may be transmitted and/or received across different links out of order, a given link may suffer degraded communication conditions relative to another of the aggregated links (e.g., frequency-dependent fading, etc.) for some duration of time, a given link or a channel of the link may experience a high traffic volume for some duration of time, etc. Aggregation architectures discussed herein may address various implementation challenges.

In some example aggregation architectures, all TIDs (e.g., or flow IDs or frame types) may be aggregated over link 205-a and link 205-b (e.g., which may be an example of packet-based aggregation). That is, parallel communications 210-a and 210-b may each have at least one packet having a common TID. Packet-based aggregation may provide improvements in UPT and total throughput (e.g., even for the case of a single traffic flow). In some cases, links 205-a and 205-b may have independent PHY and lower MAC operations (e.g., CSMA) while aggregation is performed at an upper MAC layer (e.g., as described further below).

In a first example of such an aggregation architecture, the packet-based aggregation may be supported through the use of per-link transmit queues. That is, link 205-a may be associated with a first transmit queue at a transmitting device such as STA 115-a and link 205-b may be associated with a second transmit queue at STA 115-a. A packet controller (e.g., which may be located at an upper MAC layer as described with reference to FIG. 4) may allocate MAC service data units (MSDUs) to a transmit queue for a given link 205. Aspects of per-link transmit queues are discussed further with reference to FIG. 5.

In a second example of a packet-based aggregation architecture, the aggregation may be supported through the use of a transmit queue that is common to links 205-a and 205-b. In some cases, the transmit queue may be common to all links 205 (e.g., links 205-a and 205-b may be the only aggregated links 205) or may be common to a subset of the aggregated links 205 (e.g., there may be a third link 205 that is associated with its own per-link transmit queue). MSDUs may be dynamically allocated from the common transmit queue to each lower MAC layer, as described with reference to FIG. 6.

In another example of packet-based aggregation, aspects of the common and per-link transmit queue architectures may be combined. For example, a such an aggregation architecture may introduce two sets of packet sequencing numbers. That is, each MSDU may have both a common SN and a per-link SN, as described with reference to FIGS. 7 and 8. In another example aggregation architecture, aggregation may be supported over non-co-located APs 105, aspects of which are described with reference to FIGS. 9A and 9B.

In some cases, an aggregation architecture may include a single primary channel or multiple primary channels. A single primary channel architecture may include a dependent relationship between two links (e.g., link 205-a and link 205-b). For example, in a single primary scheme, link 205-a may include the primary channel where contention, backoff, and NAV are done. The primary channel may perform power detection (PD). Power detection may be used to monitor if the desired spectrum band is being used by another device in the WLAN 200. Additionally, once the PD is above a threshold (e.g., the spectrum band is clear), the second link (e.g., link 205-b) may be used to perform energy detection (ED) to monitor if neighboring traffic will interfere with the link. If energy detection is below a threshold (e.g., there is not significant interference), a synchronous aggregated communication may begin on both links 205-a and 205-b. If PD indicated that the primary link is clear, but ED indicated the secondary link is busy, communications may not be aggregated across both links. In some examples, the primary channel may be static (e.g., always link 205-a) or the primary channel may float (e.g., the primary channel may dynamically switch between link 205-a and link 205-b). By contrast, multiple primary channels may contend for access to each link (e.g., links 205-a and 205-b) independently of one another. For example, separate NAVs may be performed on each link.

According to various aspects of the disclosure, when the parallel communications 210-a and 210-b are a combination of uplink and downlink during a particular duration of time, this may be referred to herein as multilink full duplexing. For example, a full duplex capable STA 115-a may transmit uplink and receive downlink simultaneously. Thus, there may not be contention between the uplink and the downlink for STA 115-*a*. In some cases, the STA 115-*a* may still contend with other STAs for the links (e.g., links 205-*a* and 205-*b*, independently, or jointly). If both devices communicating via multilink (e.g., the STA 115-*a* and the AP 105-*a*) are full duplex capable, communications 210-*a* and 210-*b* do not contend with each other. For example, communication 210-*a* may be a downlink data transmission and communication 210-*b* may be a response (e.g., an acknowledgement) to communication 210-*a*.

In some examples, parallel communications 210-*a* and 210-*b* are a combination of uplink and downlink during a particular duration of time on a single link (e.g., link 205-*a*), this may be referred to herein as full duplexing on a single link. For example, a full duplex capable STA 115-*a* may transmit uplink and receive downlink simultaneously on a single link (e.g., link 205-*a*). In some cases, when a single link is using full duplexing it may appear to operate as two links because of the simultaneous uplink and downlink transmissions. Full duplexing on a single link may include each duplex link utilizing the full operating bandwidth or being on different subchannels, or using different resource units within the operating bandwidth, for example, depending on the radio frequency filtering capabilities of one or more of the wireless devices. In particular, resources (e.g., subchannels or resource units) for uplink may be closer together (or overlapping) in frequency to resources (e.g., subchannels or resource units) for downlink transmissions where the wireless devices have relatively better radio frequency filtering, while further spacing in frequency may be needed for relatively worse or less effective radio frequency filtering.

In some cases, the parallel communication may be synchronized. For example, AP 105-*a* may coordinate target wake times (TWTs) to synchronize the uplink and downlink transmissions of full duplexed communications. This synchronization of parallel communications may be across links and may include an offset of communications on different links or the communications may overlap. For example, communications 210-*a* and 210-*b* may overlap in time. In the case where communication 210-*a* may be a downlink data transmission and communication 210-*b* may be a response (e.g., an acknowledgement) to communication 210-*a*, overlapping communication may provide a live feedback scheme. In some cases, a smaller link, which may also be referred to as a narrow link, may be used for feedback to provide a reliable transmission and extended transmission range.

According to various examples, if AP 105-*a* wins access to link 205-*a* and link 205-*b*, AP 105-*a* may transmit downlink to STA 115-*a* on link 205-*a* while also transmitting a trigger frame or reverse direction grant on link 205-*b*, which allows STA 115-*a* to transmit uplink (e.g., data and/or feedback) on link 115-*a*. AP 105-*a* may adapt the transmission parameters on link 205-*a* based on feedback on link 205-*b* from the STA 115-*a*. In some full duplex cases, link 205-*b* may provide feedback (e.g., live feedback) for link 205-*a* (e.g., acknowledgements or modulation coding scheme (MCS) and/or spatial stream (Nss) selection, etc.) at the same time (or during at least some of the same time) that data is being transmitted on link 205-*a*. Thus, link 205-*a* transmission parameters (e.g., MCS and/or Nss selection) may quickly adapt based on the live feedback received from link 205-*b*. In some examples, link 205-*b* may have a smaller bandwidth than link 205-*a* and may be used for live feedback. Additionally or alternatively, AP 105-*a* may use the multi-link session to communicate with multiple STAs. For example, if AP 105-*a* wins access to a first link (e.g., in the 5 GHz spectrum band) and a second link (e.g., in the 6 GHz spectrum band), AP 105-*a* may transmit downlink on the first link to a first station and downlink on the second link to a second station. In another example, if AP 105-*a* wins access to a first link (e.g., in the 5 GHz spectrum band) and a second link (e.g., in the 6 GHz spectrum band), AP 105-*a* may transmit a trigger frame or a reverse direction grant on the first link to a first station and a trigger frame or a reverse direction grant on the second link to a second station. In yet another example, if AP 105-*a* wins access to a first link (e.g., in the 5 GHz spectrum band) and a second link (e.g., in the 6 GHz spectrum band), AP 105-*a* may transmit a trigger frame or a reverse direction grant on the first link to a first station and downlink on the second link to a second station. In one or more of the above examples, the trigger frame or reverse direction grant may be aggregated with downlink from the AP 105-*a*.

Figure 3:
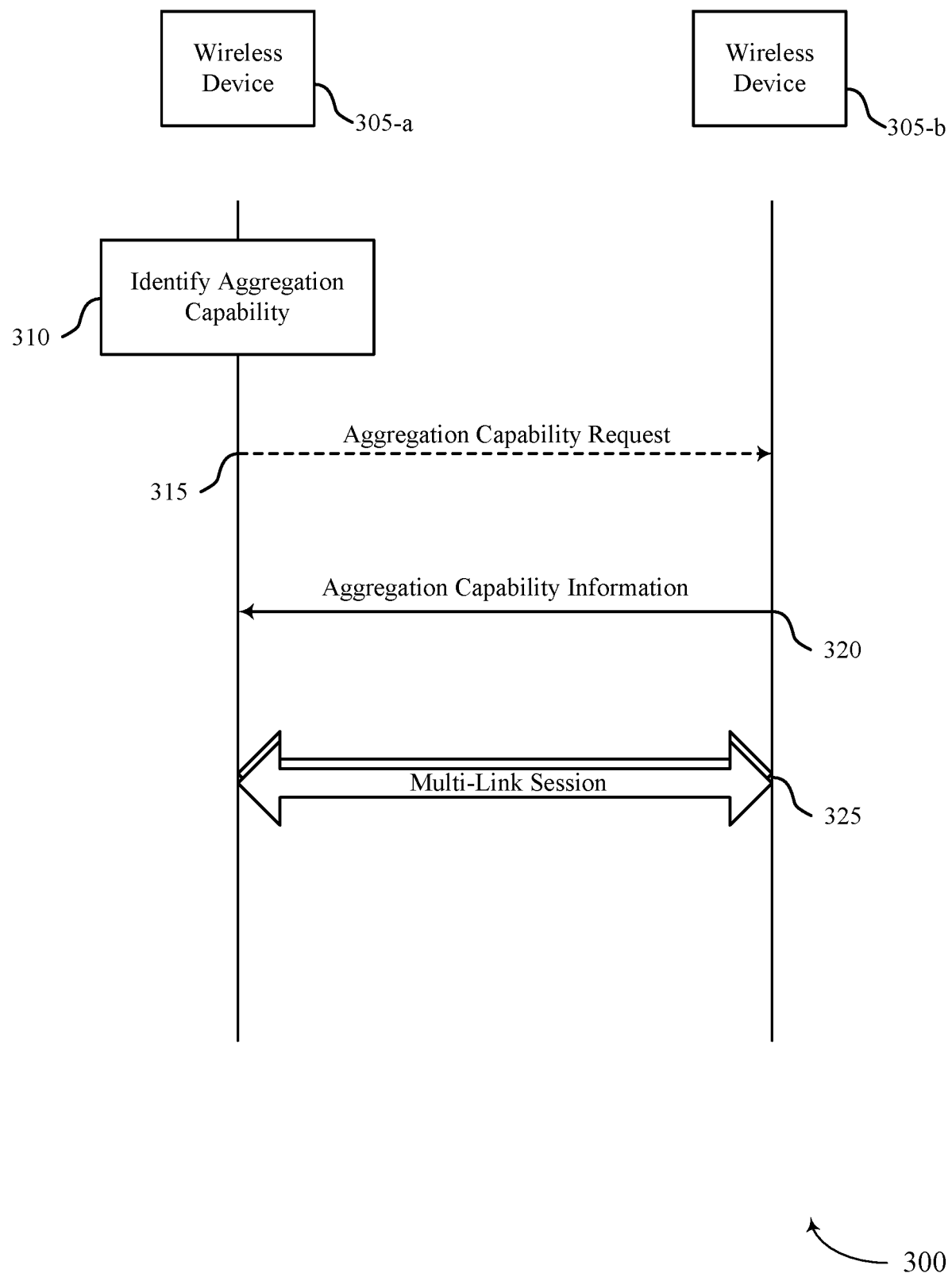
FIG. 3 illustrates an example of a process flow that supports packet based link aggregation architectures in accordance with aspects of the present disclosure.

FIG. 3 illustrates a process flow 300 that supports packet-based link aggregation architectures in accordance with aspects of the present disclosure. Process flow 300 may implement aspects of WLAN 100. For example, process flow 300 includes wireless device 305-*a* and wireless device 305-*b*, each of which may be an example of a STA 115 or an AP 105 as described with reference to WLAN 100.

At 310, wireless device 305-*a* may identify its current aggregation capability. For example, the aggregation capability may in some cases be dynamically or semi-statically determined (e.g., based on a power level, communication load, interference metrics, location, etc.). Alternatively, the aggregation capability may in some cases be preconfigured, in which case wireless device 305-*a* may still be said to identify its current aggregation capability. Examples of aggregation capability information include one or more RF spectrum bands over which aggregation is supported, a maximum number of supported aggregated links, an aggregation type (e.g., packet-based or flow-based), a duration of time for which wireless device 305-*a* is willing to aggregate communications, etc.

At 315, wireless device 305-*a* may optionally transmit an aggregation capability request to one or more neighboring wireless devices 305-*b*. For example, wireless device 305-*a* may be a STA 115 inquiring about aggregation capabilities of nearby APs 105 (e.g., or other STAs 115). Alternatively, wireless device 305-*a* may be an AP 105 inquiring about an aggregation capability of a STA 115. Examples of aggregation capability requests may include probe requests, association requests, dedicated action frames, control fields (e.g., high efficiency (HE) control fields) in frames, etc. In some cases, the aggregation capability request may include a duration of time for which wireless device 305-*a* wants to participate in aggregated communications (e.g., in a multi-link session). That is, wireless device 305-*a* may in some cases include its own aggregation capability information in a request for aggregation capability information of wireless device 305-*b*.

At 320, wireless device 305-*b* may transmit its own aggregation capability information. In some cases, this transmission may be in response to receiving the aggregation capability request at 315. Examples of such transmissions include probe responses, association responses, dedicated action frames, HE control fields, etc. Alternatively, wireless device 305-*b* may in some cases transmit its aggregation capability independently of receiving an aggregation capability request (e.g., wireless device 305-*b* may advertise its aggregation capabilities). For example, wireless device 305-*b* may identify its own aggregation capability (e.g., analogously to 310 as discussed with reference to wireless device 305-*a*) and may broadcast this information (e.g., via a beacon, a FD frame, or a broadcast probe response frame). Examples of aggregation capability information include an aggregation type (e.g., packet-based), link identification information (e.g., a TA, RA, TID, etc.), a receive queue size, a BA bitmap size, an indication of fragmentation support, or a combination of these (e.g., a <TA, RA, TID> tuple, a <TA, RA> tuple, etc.). In some cases, the aggregation capability information may indicate a duration for which that wireless device 305-*b* is willing to aggregate communications.

At 325, wireless device 305-*a* and wireless device 305-*b* may establish a multi-link session. In some cases, a first wireless link of the multi-link session may be in a first RF spectrum band having a first path loss value (e.g., a 2.4 GHz spectrum band), and a second wireless link of the multi-link session may be in a second RF spectrum band having a second path loss value that is greater than the first path loss value (e.g., a 5 GHz spectrum band, a 6 GHz spectrum band, or a 60 GHz spectrum band). Alternatively, the first and second wireless links may in some cases be located in a same RF band. In some examples, at least one link of the multi-link session may include a channel in a shared RF spectrum band. During the multi-link session, a first set of packets may be sent via a first wireless link and a second set of packets may be sent via a second wireless link. For example, the first set of packets and the second set of packets (e.g., or some subset thereof) may be associated with a same TID (e.g., in the case of packet-based aggregation). Additionally or alternatively, the first set of packets may be associated with a first TID and the second set of packets may be associated with a second TID (e.g., in the case of flow-based aggregation).

In some examples, a first wireless link of the multi-link session may be a first size (e.g., a 320 MHz link, or an 80 MHz link), and a second wireless link of the multi-link session may be a second size (e.g., a 20 MHz link, an 80 MHz link, or a 40 MHz link). Thus, the first and second wireless links may be the same size or may be different sizes. If the first and second wireless link are different sizes (e.g., a 320 MHz first link and a 20 MHz second link), the smaller link (e.g., 20 MHz link) may be used for management frames (e.g., beacons, FD frames, broadcast probe response frames), as an anchor (e.g., to transmit control information), for feedback (e.g., live feedback such as acknowledgements or modulation coding scheme (MCS) and/or spatial stream (Nss) selection), as short frames, or as control-response frames (e.g., acknowledgements). The smaller link may be more reliable and have a greater range than the larger link, but the larger link may be capable of greater throughput than the smaller link. In some cases, the smaller link may be used by a STA during discovery and association before operations are extended to other link(s) (e.g., a larger link). Additionally, the size of each link may be flexible or dynamic (e.g., based on available bandwidth, neighboring traffic). The change in link size may be explicitly signaled between wireless device 305-*a* and wireless device 305-*b*. In some cases, the two links may operate using full duplexing.

Interference may be more likely to occur in a wide link (e.g., a 320 MHz link) than a small link (e.g., a 20 MHz link) due to the higher probability of a communication between other devices than wireless device 305-*a* and wireless device 305-*b* on at least a portion of the wide link. Accordingly, the wide link may be punctured resulting in disjoint or discontiguous resource segments. A wireless links may span one or more discontiguous or disjoint frequency segments (e.g., in a 320 MHz link, two segments may be separated by 20 MHz of unused bandwidth). Additionally or alternatively, the 320 MHz link may be contiguous, but overlap portions of multiple spectrum bands (e.g., covering portions of both the lower 6 GHz band and the upper 5 GHz band). In a specific spectrum band, the multilink session may aggregate communications across contiguous resources, discontiguous resources, or both. In some cases, different resource unit segments in a wide bandwidth may act as separate links between wireless device 305-*a* and wireless device 305-*b* (which may be peer devices, for example).

In some cases, wireless device 305-*a* (e.g., or wireless device 305-*b*) may identify a transmission type for a set of packets to be transmitted, where the transmission type includes one of broadcast, multicast, or unicast, and determine a wireless link for the packets based on the transmission type. Similarly, wireless device 305-*a* may allocate data frames to a first wireless link and management (e.g., control) frames to a second wireless link. That is, wireless device 305-*a* (e.g., or wireless device 305-*b*) may identify a frame type for a set of packets to be transmitted, where the frame type comprises data, control, or management, and transmit the set of packets over a given wireless link according to the identified frame type. By way of example, broadcast flows, multicast flows, and/or control frames may be aggregated over links closable by all receiving devices (e.g., 2.4 GHz and 900 MHz links). In some cases, a wireless device 305 may select a set of aggregable wireless devices (e.g., APs 105) in range that are under a same controller, as described further with reference to FIGS. 9A and 9B.

Figure 4:
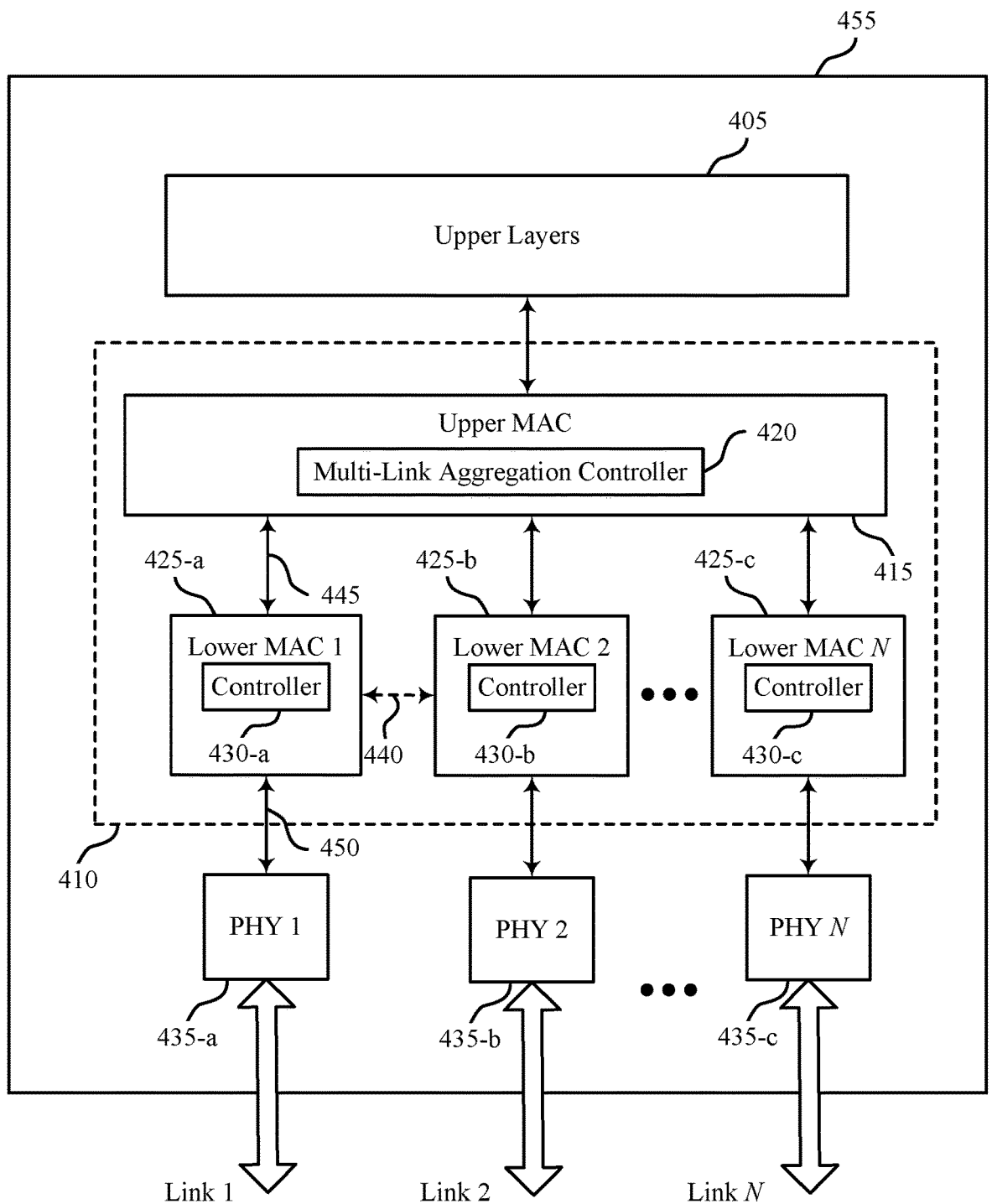
FIG. 4 illustrates an example layer configuration that supports packet based link aggregation architectures in accordance with aspects of the present disclosure.

FIG. 4 illustrates an example layer configuration 400 that supports packet-based link aggregation architectures in accordance with aspects of the present disclosure. Layer configuration 400 may apply to a STA 115 or an AP 105, and be for a transmitting wireless device or a receiving wireless device. It is to be understood that aspects of layer configuration 400 may represent logical constructs (e.g., such that components of layer configuration 400 may share hardware components). A wireless device may support layer configuration 400 through the use of various hardware configurations described herein.

As illustrated, layer configuration 400 may include upper layers 405, a MAC layer 410, and one or more PHY layers 435 (e.g., where each PHY layer 435 may in some cases be associated with a respective link or channel). MAC layer 410 may be further divided into upper MAC layer 415 and lower MAC layer 425-*a*, lower MAC layer 425-*b*, and lower MAC layer 425-*c*. While three lower MAC layers 425 are illustrated, it is to be understood that upper MAC layer 415 may control (e.g., via multi-link aggregation controller 420) any suitable number of lower MAC layers 425. Signaling between a given lower MAC (e.g., lower MAC layer 425-*a*) and upper MAC layer 415 may be carried by connection 445. Similarly, signaling between lower MAC layer 425-*a* and PHY layer 435-*a* may be carried by connection 450 and signaling between lower MAC layer 425-*a* and lower MAC layer 425-*b* may be carried by connection 440. As described herein, the signaling for lower MAC 425-*a*, lower MAC layer 425-*b*, and lower MAC layer 425-*c* may be based on logic associated with respective controller 430-*a*, controller 430-*b*, and controller 430-*c*.

With reference to FIG. 2, lower MAC layer 425-*a* may be associated, for example, with link 205-*a* (e.g., via PHY layer 435-*a*) and lower MAC layer 425-*b* may be associated, for example, with link 205-*b* (e.g., via PHY layer 435-*b*). That is, each link 205 may have an associated lower MAC layer 425 that performs link-specific features (e.g., channel access, UL triggered transmission procedures, multiple-input, multiple-output (MIMO) signaling, etc.) For example, lower MAC layer 425-a and lower MAC layer 425-b may independently perform enhanced distributed channel access (EDCA) countdowns on respective links 205-a and 205-b. Additionally or alternatively, lower MAC layers 425 may perform RTS/CTS procedures, perform clear channel assessment (CCA) procedures, apply a modulation and coding scheme (MCS), control a physical packet data unit (PPDU) duration, transmit sounding reference signals, etc.

Upper MAC layer 415 may provide a single-link interface to upper layers 405. For example, upper MAC layer 415 may perform management and security-related operations. Such a design may allow a single beacon from an AP 105 on a primary band to control multi-band STAs 115. Additionally or alternatively, the single upper MAC layer 415 may allow for a single association procedure to initiate the multi-link session. For example, an association procedure may be performed using a single link, but provide for capability information for multiple links, which may include the link that is being used for the association procedure. In some cases, the upper MAC layer 415 may provide signaling (e.g., OMI signaling) that allows for dynamic bandwidth control (e.g., expansion). The upper MAC layer 415 may additionally or alternatively provide a single BA space (e.g., a single BA scoreboard and sequence space) such that MPDUs may be scheduled dynamically on a per-PPDU basis for each link (e.g., such that a given MPDU may be retransmitted on a different link from that on which it was originally transmitted).

Figure 5:
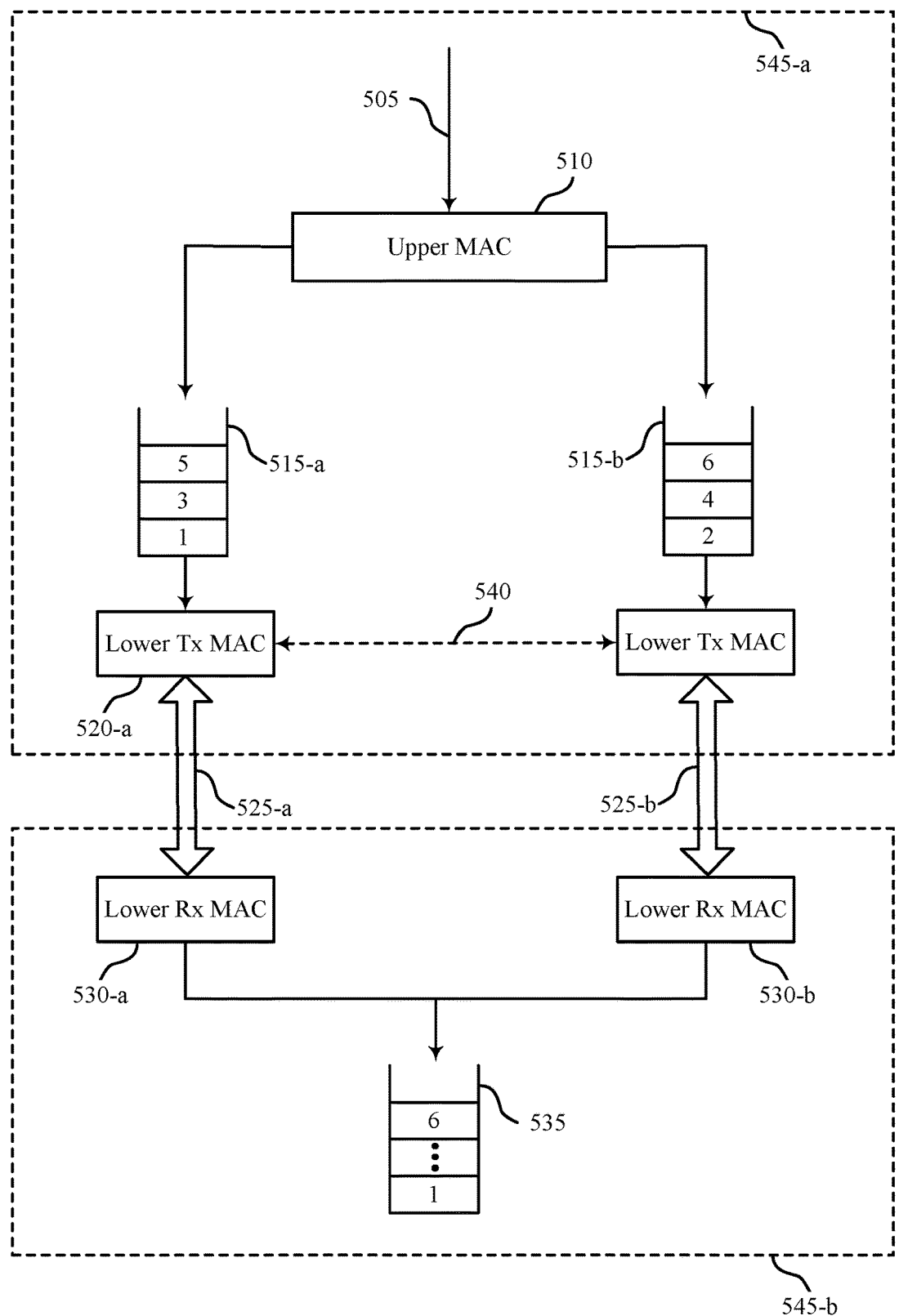
FIGS. 5 through 7 illustrate example communication schemes that support packet based link aggregation architectures in accordance with aspects of the present disclosure.

FIG. 5 illustrates an example of a communication scheme 500 that supports packet based link aggregation architectures in accordance with various aspects of the present disclosure. In some examples, communication scheme 500 may implement aspects of WLAN 100. For example, communication scheme 500 may be implemented between a transmitting wireless device 545-a (e.g., a STA 115 or AP 105) and a receiving wireless device 545-b (e.g., a STA 115 or AP 105). Although described in the context of a single transmitting device and a single receiving device, it is to be understood that aspects of the following may be extended to communications with non-co-located APs 105. Communication scheme 500 illustrates aspects of a per-link transmit queue packet-based aggregation architecture.

Upper MAC 510 (e.g., which may be an example of upper MAC 415 described with reference to FIG. 4) may receive application data 505 as an input. Upper MAC 510 may allocate MSDUs to transmit queue 515-a and transmit queue 515-b. In some cases, the size of the allocated MSDUs may be determined dynamically (e.g., proportionally to a throughput for a given link 525). Additionally or alternatively, the number of MSDUs allocated to a given link 525 may be a function of the communication quality over that link 525 (e.g., such that links 525 that suffer from degraded communication quality may in some cases be allocated fewer and/or smaller MSDUs). In some cases, the operations of upper MAC 510 may be performed by a network controller and each transmit queue 515 may be associated with a respective AP 105 (e.g., as described with reference to FIGS. 9A and 9B).

Each transmit queue 515 may be associated with a respective lower transmit (Tx) MAC 520 (e.g., which may be an example of or implement aspects of a lower MAC 425 described with reference to FIG. 4). In some cases, lower Tx MAC 520-a and lower Tx MAC 520-b may communicate control signaling directly via connection 540 (e.g., which may be an example of connection 440 described with reference to FIG. 4). For example, such control signaling may enable coordination of transmissions across link 525-a and link 525-b (e.g., which may serve to reduce adjacent channel interference or otherwise benefit the communications). Each lower Tx MAC 520 may form MPDUs from the allocated MSDUs and send them over a respective link 525 (e.g., using CSMA).

A receiving device may comprise lower receive (Rx) MAC 530-a and lower Rx MAC 530-b, each of which may also be an example of a lower MAC 425 described with reference to FIG. 4. Each of lower Rx MAC 530-a and lower Rx MAC 530-b may forward decoded MPDUs to a common receive queue 535. In some cases, the MPDUs may be reordered upon arrival at the common receive queue 535. A BA may be sent per link 525 after each received PPDU based on results in common receive queue 535. Each transmit queue 515 may remove any successfully received MSDUs from the queue based on the BA received over the respective link 525.

Figure 6:
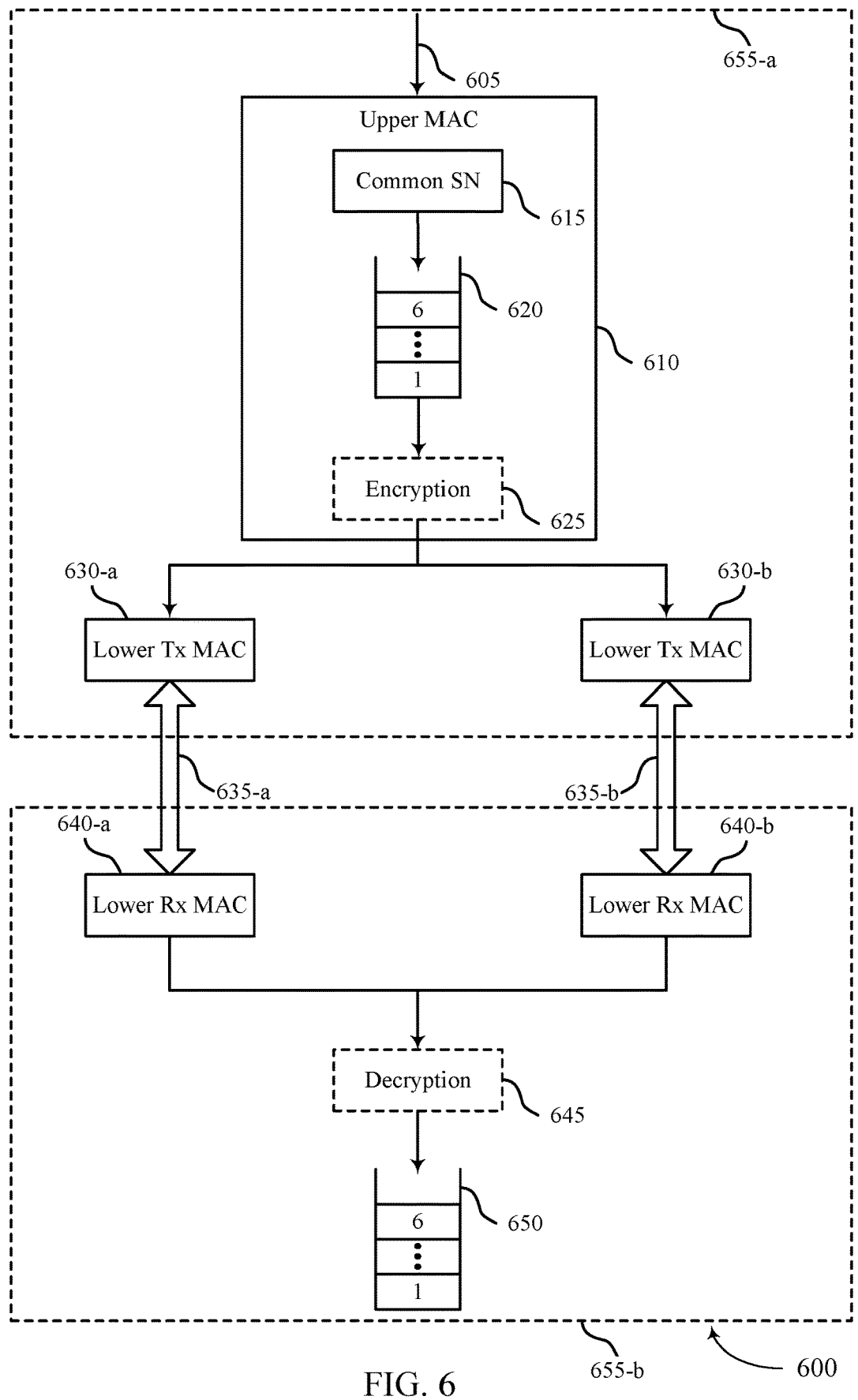

FIG. 6 illustrates an example of a communication scheme 600 that supports packet based link aggregation architectures in accordance with various aspects of the present disclosure. In some examples, communication scheme 600 may implement aspects of WLAN 100. For example, communication scheme 600 may be implemented between a transmitting wireless device 655-a (e.g., a STA 115 or AP 105) and a receiving wireless device 655-b (e.g., a STA 115 or AP 105). Although described in the context of a single transmitting device and a single receiving device, it is to be understood that aspects of the following may be extended to communications with non-co-located APs 105 (APs 105 that are not co-located). Communication scheme 600 illustrates aspects of a common transmit queue packet-based aggregation architecture.

In the example illustrated by communication scheme 600, upper MAC 610 (e.g., which may be an example of upper MAC 415 described with reference to FIG. 4) may receive application data 605 as an input (e.g., in the form of MSDUs). Upper MAC 610 may in some cases attach a common SN to the MSDUs at 615 and may allocate these MSDUs to a common transmit queue 620. In some cases, these MSDUs may be encrypted at 625 before being allocated (e.g., dynamically) from common transmit queue 620 to one of lower Tx MAC 630-a or lower Tx MAC 630-b (e.g., which may each be examples of or implement aspects of a lower MAC 425 as described with reference to FIG. 4). In some examples, a transmitting device may contain multiple common transmit queues 620, each of which is associated with a given access category. Alternatively, all access categories may share a single common transmit queue 620.

In aspects of communication scheme 600, packets associated with one or more traffic flows (packets of each TID of the multi-link session) may be assigned to common transmit queue 620 (i.e., a transmit queue that is common across all links 635) after being assigned a common SN at 615. Such an architecture may support on-demand MSDU allocation in which MSDUs are allocated to a given link 635 when the link is ready to transmit. As an example, when link 635-a is clear for transmission (e.g., as determined by a CCA procedure performed by lower Tx MAC 630-a), lower Tx MAC 630-a may receive enough (A)MSDUs from common transmit queue 620 to form an aggregated MPDU (AMPDU).

In some cases, lower Tx MAC 630-a and lower Tx MAC 630-b may communicate control signaling. For example, such control signaling may enable coordination of transmissions across link 635-a and link 635-b (e.g., which may serve to reduce adjacent channel interference or otherwise benefit the communications). Each lower Tx MAC 630 may form AMPDUs from the allocated MSDUs and send them over a respective link 635 (e.g., using CSMA).

A receiving device may comprise lower Rx MAC 640-*a* and lower Rx MAC 640-*b*, each of which may also be an example of a lower MAC 425 described with reference to FIG. 4. Each of lower Rx MAC 640-*a* and lower Rx MAC 640-*b* may forward decoded MPDUs to a common receive queue 650. In some cases, the MPDUs may be reordered upon arrival at the common receive queue 650. A BA may be sent per link 635 after each received PPDU based on results in common receive queue 650. Additionally or alternatively, a single BA may be sent back for both links 635 via a dedicated link (e.g., via an anchor link). After receiving the BA, common transmit queue 620 may remove the acknowledged MSDUs from the transmission buffer. Any failed (A)MSDUs may be retransmitted (e.g., on a same link 635 or another link 635), where such retransmission may be immediate in some cases.

Communication scheme 600 may avoid MSDUs getting stuck in a transmit queue due to pre-allocation to a given link 635. For example, if a set of MSDUs is pre-allocated to link 635-*a*, and link 635-*a* suddenly suffers a high packet error rate (PER), a gap may be created in common receive queue 650 which may delay the delivery of packets received after the gap (e.g., because the corrupted packets may have to be re-transmitted).

Multi-link aggregation may additionally improve transmission reliability in some cases. Various schemes (e.g., or combinations thereof) may be employed to this end. For example, since broadcast communications are not acknowledged, they may in some cases be duplicated across multiple links 635. Additionally or alternatively, unicast traffic may be duplicated on multiple links 635. For example, the same MPDUs may be sent on link 635-*a* (e.g., which may be a 2.4 GHz link) and link 635-*b* (e.g., which may be a 5 GHz link). Because the BA is handled at upper MAC 610 at the transmitting device, an MPDU may be considered successfully transmitted if it is delivered via either of the links 635. Such a transmission scheme may be leveraging the fact that each RF band is associated with a different band and radio characteristics. For example, higher RF bands generally have a shorter range of transmission (e.g., experience greater degrees of frequency-dependent fading). Additionally or alternatively, each receiving device may experience different link conditions for each aggregated link (e.g., due to communication obstacles, movement of the receiving device during communications, etc.). These varying communication conditions may be leveraged to improve transmission reliability.

By way of example, in some cases the encryption at 625 may include application of codes to a stream that is to be transmitted over the links by transmitting wireless device 655-*a*, which may help to improve reliability by enabling a receiving wireless device 655-*b* to decode the communication even if only a subset of the stream is successfully received by receiving wireless device 655-*b*. For example, the transmitting wireless device 655-*a* may duplicate some or all of the packets to the transmitted over the links. In some examples, the original and duplicated packets may be sent over the same wireless link 635 (e.g., both sets of packets over wireless link 635-*a*). In other examples, the original and duplicated packets may be sent over different wireless links 635 (e.g., the original set of packets over wireless link 635-*a* and the duplicated set of packets over wireless link 635-*b*). In some examples, a combination of these approaches may be used, including transmission of original and duplication packets over three or more different links. The wireless links 635 used may also dynamically change, for example to account for varying link conditions.

Additionally or alternatively, transmission reliability may be improved through the application of encoding algorithms which increase the entropy of the data stream such that a transmission may be decoded even if only a subset of the transmitted data packets are received. By way of example, a data stream comprising Nbits of information may be encoded into a data stream containing N+k bits, and the N+k bits may be formatted into a set of packets such that, even if only a subset of the packets are successfully received, the N bits of information may be decoded. For example, a code engine (e.g., implementing a Raptor code, or other fountain code) after each TID queue (e.g., in the case of communication scheme 500) or after common transmit queue 620 may increase the entropy of the data stream, which may be formatted and transmitted across multiple links 635. Such a communication scheme may allow a receiver to reconstruct the original message even if only portions of the stream of packets are received. For example, if one link 635 suffers a temporary decline in communication quality such that packets transmitted during this time are unable to be successfully received, a receiving device may still successfully decode the transmitted information based on packets received over another link 635.

In some cases, the use of various encoding operations discussed herein may be supported through signaling between communicating devices. For example, a transmitting device may indicate encoding parameters (e.g., N, k, N+k, etc.) used to generate the encrypted packets. In some cases, the encoding parameters may be determined based at least in part on observed channel conditions. For example, in difficult communication conditions, transmitting wireless device 655-*a* may select a more robust encoding scheme (e.g., may increase k) or otherwise alter the distribution of data across the links 635 to improve transmission reliability (e.g., may allocate more data packets to a link experiencing better channel conditions). In some examples, the encoding parameters may be signaled (e.g., via OMI) to allow for dynamic adaptation. Additionally or alternatively, the encoding parameters may in some cases be indicated via a control or management frame (e.g., a beacon), in which an AP indicates the encoding parameters it supports for aggregated communications. In some cases, the encoding parameters may be indicated directly (e.g., N may be indicated in bit notation) or may be indicated through other means or implicitly, such as by reference to a look-up table. Additionally or alternatively, a wireless device may be able to determine the encoding parameters (e.g., based on channel conditions indicated by OMI).

Some wireless systems may support a form of link-hopping where the transmission on a particular link 635 is based on a pseudo-random sequence with which both transmitter and receiver are familiar. For example, the pseudo-random sequence may be known for a particular system (e.g., may be preconfigured), may be negotiated during association, etc. Band-hopping (e.g., in addition to fountain codes) may help make the system more robust to packet loss. Additionally or alternatively, band-hopping may spread the usage across several channels, thus allowing several transmit/receive pairs to simultaneously use the same RF bands without excessive interference (e.g., may increase multiplexing opportunities). Band hopping may be within a particular link, or may occur across two or more links.

Figure 7:
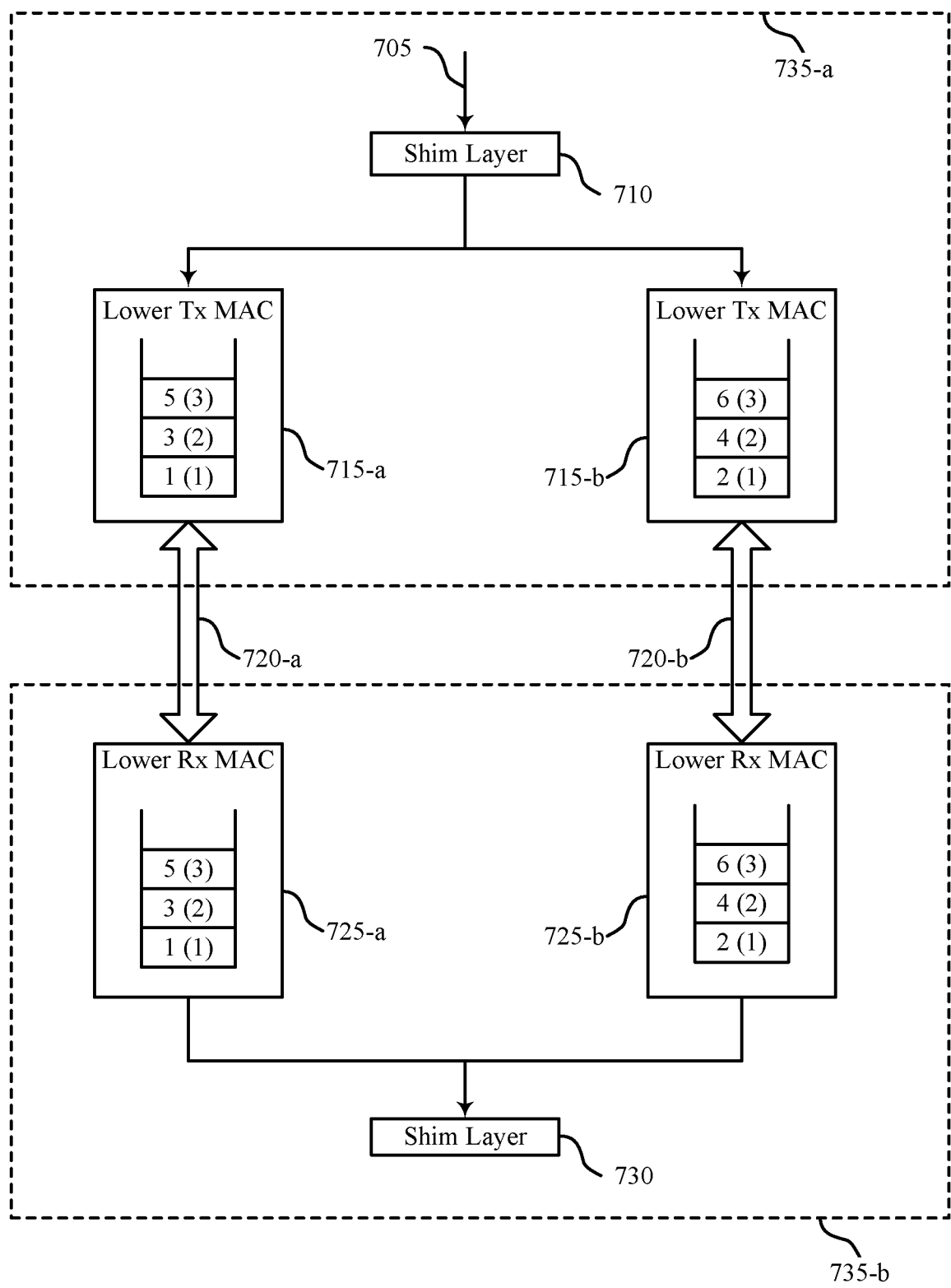

FIG. 7 illustrates an example of a communication scheme 700 that supports packet based link aggregation architectures in accordance with various aspects of the present disclosure. In some examples, communication scheme 700 may implement aspects of WLAN 100. For example, communication scheme 700 may be implemented between a transmitting wireless device 735-*a* (e.g., a STA 115 or AP 105) and a receiving wireless device 735-*b* (e.g., a STA 115 or AP 105). Although described in the context of a single transmitting device and a single receiving device, it is to be understood that aspects of the following may be extended to communications with non-co-located APs 105. Communication scheme 700 illustrates aspects of a multiple sequence number-based aggregation architecture. This aggregation architecture introduces two sets of packet sequencing numbers. Operations required across all links 720 are based on a common SN, while per-link operations are based on a per-link SN. The common and/or per-link SNs may be signaled (e.g., using over-the-air signaling per MPDU) using techniques described with reference to FIG. 8.

At a transmitting wireless device, a shim layer 710 may assign a common SN for application data 705 (e.g., a data message received from an application layer, or other higher layer, for example to be formatted into a number of MSDUs). For example, the operations of shim layer 710 may be performed by an upper MAC as described herein. After assigning the common SN, shim layer 710 may allocate packets to one of lower Tx MAC 715-*a* or lower Tx MAC 715-*b*. Each lower Tx MAC 715 may allocate a per-link SN for the allocated MSDUs and process these MSDUs independently of other lower Tx MACs 715. For example, a packet illustrated as "5 (3)" may have a common SN of 5 assigned by shim layer 710 and a per-link SN of 3 assigned by lower Tx MAC 715-*a*. The packets may be transmitted across respective links 720-*a* and 720-*b* before being received by lower Rx MAC 725-*a* and lower Rx MAC 725-*b*. The lower Rx MACs 725 may feed the received packets to shim layer 730, which may reorder the packets from different links based on the common SN. In aspects, a BA procedure and per-link reordering may be based on the per-link SN.

More generally, shim layer 710 and each lower Tx MAC 715 may have different sets of sequencing numbers (e.g., because of fragmentation and encryption processes which may also be employed for communication scheme 700). For example, the set may include an MSDU SN, an MSDU fragment number (FN), and an MPDU packet number (PN). The operations at shim layer 710 (e.g., and shim layer 730) may be based on common SN, FN, and PN across links 720. For example, at the receiver side, shim layer 730 may reorder decoded MPDUs based on the common SN and FN, may perform a replay check based on the common PN, and may perform de-fragmentation based on the common SN and FN. The operations at lower Tx MACs 715 (e.g., and lower Rx MACs 725) may be based on the per-link SN, per-link FN, and per-link PN. For example, the BA procedure and per-link reordering at each lower Rx MAC 725 may be based on per-link SN and FN, while per-link encryption may be based on a per-link PN.

Figure 8:
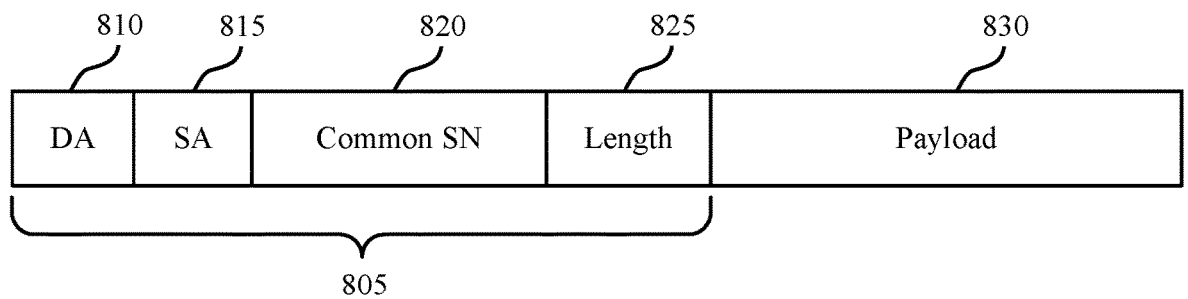
FIG. 8 illustrates an example transmission format that supports packet based link aggregation architectures in accordance with aspects of the present disclosure.

FIG. 8 illustrates an example of a transmission format 800 that supports packet based link aggregation architectures in accordance with various aspects of the present disclosure. In some examples, transmission format 800 may implement aspects of WLAN 100. In some cases, transmission format 800 may support aspects of communication scheme 500, communication scheme 600, and/or communication scheme 700.

In some wireless systems (e.g., systems supporting single link operation), fields may be defined in each MPDU to carry the per-link sequencing numbers. For example, the SN and FN may be included in a sequence control field while the PN may be included in a Counter Mode Cipher Block Chaining Message Authentication Code Protocol CCMP header. However, in the case of multiple SN-based aggregation (e.g., as described with reference to communication scheme 700), each MPDU may also carry common sequencing numbers (e.g., to be used by a shim layer such as shim layer 730). Various options to signal common SNs are considered herein.

Generally, common SNs may be signaled anywhere in the MPDU, or PPDU containing the MPDU. For example, the common SN may be included in a PPDU PHY header, a MPDU MAC header, a MPDU delimiter, a packet extension field, etc. In one example, a new control field (e.g., a HE control field) may be introduced to carry common SNs per MPDU. For example, the HE common SN control field may be introduced in an MPDU header with subfields to carry common SN, FN, and PN.

Alternatively, a subframe header 805 may be modified to include a new common SN field 820, while the common FN and PN may be signaled in a new HE control field. Thus, transmission format 800 illustrates a subframe header 805 as including a destination address (DA) field 810 (which may also be referred to as a receiver address), a sender address (SA) field 815 (which may also be referred to as a transmitter address), common SN field 820, and a length field 825. Transmission format 800 additionally includes payload 830 (e.g., which may be an MSDU, or multiple MSDUs, received from upper layers).

Figure 9A:
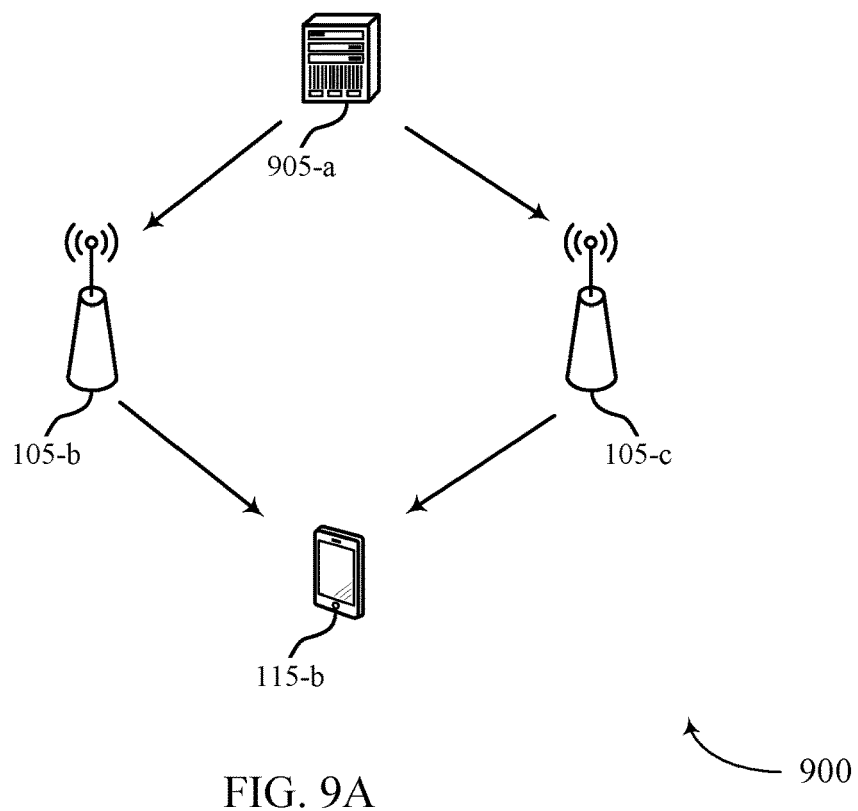
FIGS. 9A and 9B illustrates examples of network configurations that support packet based link aggregation architectures in accordance with aspects of the present disclosure.

FIG. 9A illustrates an example of a network configuration 900 that supports packet based link aggregation architectures in accordance with various aspects of the present disclosure. In some examples, network configuration 900 may implement aspects of WLAN 100. For example, network configuration 900 may be implemented between one or more transmitting devices (e.g., STAs 115 and/or APs 105) and one or more receiving devices (e.g., STAs 115 and/or APs 105). Network configuration 900 illustrates aspects of an aggregation architecture in which a receiving device (e.g., STA 115-*b*) may receive traffic concurrently from multiple non-co-located APs 105 (e.g., AP 105-*b* and AP 105-*c*). The non-co-located APs 105 may in turn be managed by one or more controllers 905 (e.g., controller 905-*a*) which distribute traffic across the APs 105.

As described with reference to FIG. 3, each AP 105 may advertise (e.g., broadcast) its associated controller identifier and aggregation capability information. STA 115-*b* may select a set of aggregable non-co-located APs 105 (e.g., and a controller 905) based on the advertised aggregation capability information. It is to be understood that though the APs 105 are described in some examples as non-co-located, aspects of the examples may also be applicable to co-located APs 105.

Network configuration 900 illustrates an example in which STA 115-*b* receives traffic concurrently from AP 105-*b* and AP 105-*c*. In some examples, AP 105-*b* is located remotely from AP 105-*c*. Alternatively, AP 105-*b* and AP 105-*c* may be co-located (e.g., may be separate radio heads of a wireless node, may be separate nodes connected via a backhaul that is substantially ideal (can be assumed to be ideal), etc.). AP 105-*b* and AP 105-*c* may be managed by controller 905-*a*, which distributes traffic across the APs 105. That is, controller 905-*a* may in some cases perform some operations of the upper MAC layers described herein (e.g., may allocate packets from a common transmit queue to one of AP 105-*b* or AP 105-*c*). In some examples, AP 105-*b* and/or AP 105-*c* may further distribute the packets across multiple available links (e.g., each AP 105 may contain the functionality of the upper MAC layers described herein). In some cases, controller 905-*a* may be another AP 105 (e.g., a remote node) or may be one of the APs 105 in the aggregation set (e.g., AP 105-*b* or AP 105-*c*).

Figure 9B:
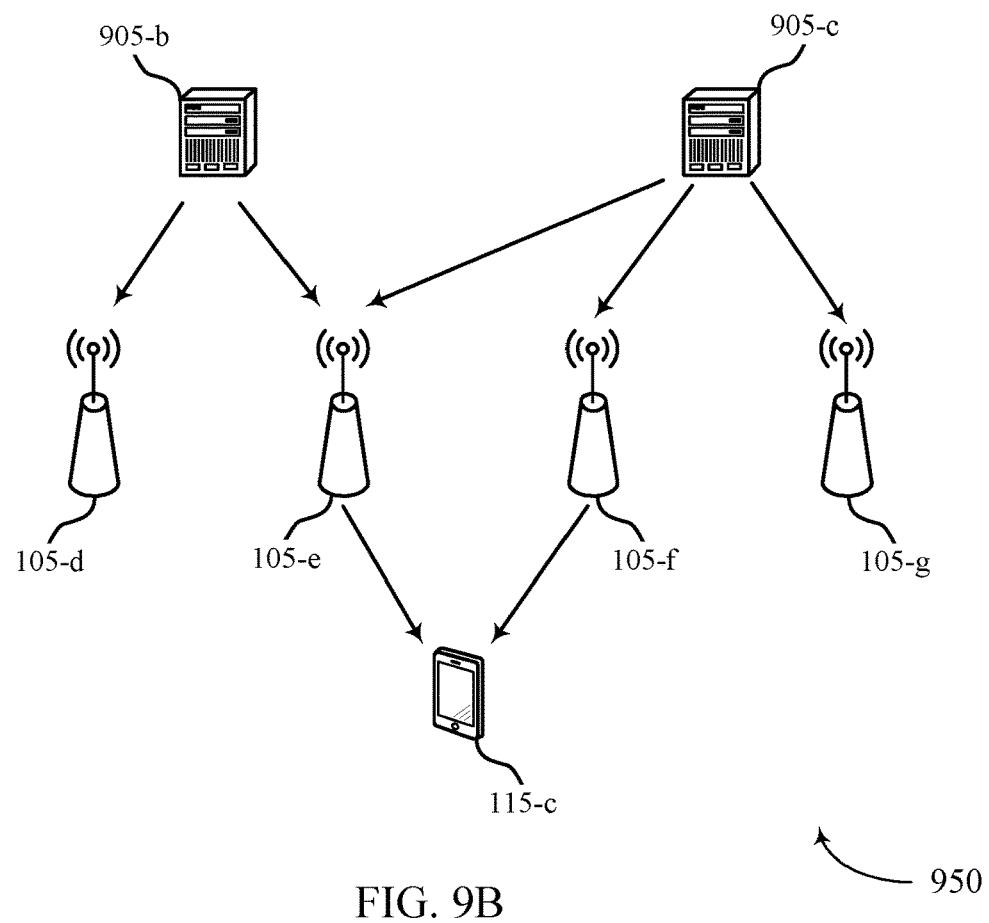

FIG. 9B illustrates an example of a network configuration 950 that supports packet based link aggregation architectures in accordance with various aspects of the present disclosure. In some examples, network configuration 950 may implement aspects of WLAN 100. Aspects of network configuration 950 resemble corresponding components of network configuration 900. For example, network configuration 950 contains multiple APs 105 with which a STA 115 (e.g., STA 115-*c*) may communicate. Each AP 105 may be connected to one controller 905 (e.g., AP 105-*d*, AP 105-*f*, and AP 105-*g*) or multiple controllers 905 (e.g., AP 105-*e*).

In some cases, controller 905-*b* and controller 905-*c* may have different aggregation capabilities. For example, they may support different aggregation types (e.g., controller 905-*b* may support both flow-based aggregation and packet-based aggregation while controller 905-*c* supports only packet-based aggregation), may support a different number of aggregable links for a given type of aggregation (e.g., controller 905-*b* may support two parallel links for packet-based aggregation while controller 905-*c* may support three parallel links for packet-based aggregation), may support a different maximum aggregation throughput for a given type of aggregation, etc. By way of example, AP 105-*d* and AP 105-*e* may be managed by controller 905-*b*, which supports packet-based aggregation. Similarly, AP 105-*e*, AP 105-*f*, and AP 105-*g* may be managed by controller 905-*c*, which supports flow-based aggregation. In this example, AP 105-*e* may thus be capable of supporting both packet-based aggregation and flow-based aggregation (e.g., by virtue of the fact that it is managed by both controller 905-*b* and controller 905-*c*).

In some examples, the APs 105 may support aggregation over different RF spectrum bands. For example, AP 105-*d* may support aggregation on 900 MHz, AP 105-*e* may support aggregation on 2.4 GHz, AP 105-*f* may support aggregation on 5 GHz, and AP 105-*g* may support aggregation on 60 GHz. Such a configuration may support a hierarchical distribution of APs 105 (e.g., because of the different communication ranges supported by the different RF bands). That is, multiple APs 105 that support aggregation on 60 GHz may be deployed within a coverage area of a single AP 105 that supports aggregation on 900 MHz.

Each AP 105 may advertise (e.g., in a broadcast transmission) aggregation capability information to assist STAs 115 (e.g., STA 115-*c*) in selecting APs 105. In some cases, the aggregation capability information may be transmitted in a beacon, management frames, control frames, dedicated action frames, etc. (e.g., as described with reference to FIG. 3). Examples of aggregation capability information which may be advertised by an AP 105 include an aggregation capability bit (e.g., a single bit indicating whether the AP 105 supports aggregation) and/or a connected controller identifier list (e.g., which may be a MAC address of the controller(s) 905 associated with the AP 105). For example, each controller identifier may include one or more of a controller type (e.g., which may indicate whether the controller 905 is an AP 105 or a remote node), supported aggregation type(s) (e.g., MAC-level packet-based, MAC-level flow-based, IP level-based, transport-level based, hypertext transfer protocol (HTTP) level-based, etc.), a maximum number of supported links per aggregation type, a maximum supported throughput per aggregation type, any combination thereof, etc. As described with reference to FIG. 3, an AP 105 may in some cases broadcast its aggregation capability information (e.g., as illustrated at 320) or may send its aggregation capability based on a request received (e.g., as illustrated at 315).

Based on the aggregation capability information, STA 115-*c* may select a set of aggregable APs 105 (e.g., AP 105-*e* and AP 105-*f*) in range under the same controller 905 (e.g., controller 905-*c*) with an aggregation type (e.g., flow-based aggregation or packet-based aggregation) supported by STA 115-*c*. In some cases, the set of aggregable APs 105 may be selected under the constraint that the set size does not exceed the maximum supported number of links of the intended aggregation type. For example, controller 905-*c* may support a maximum of two aggregation links, such that STA 115-*c* is restricted from additionally aggregating communications with AP 105-*g*.

Additionally or alternatively, each aggregation-capable AP 105 may broadcast aggregation capability information relative to the aggregation capability of a neighboring AP 105 (e.g., to assist STA 115-*c* in selecting a set of aggregable APs 105). For example, AP 105-*f* may transmit beacons (e.g., over an anchor link) in the 5 GHz band while AP 105-*g* may operate in the 60 GHz band and experience a correspondingly shorter communication range (e.g., or vice versa). AP 105-*f* may include the aggregation capability information of AP 105-*g* in its own beacons (e.g., may send its own aggregation capability information along with the aggregation capability and target beacon transmission time (TBTT) of one or more neighboring APs 105). Upon receiving the aggregation capability information from AP 105-*f*, STA 115-*c* may search beacons of aggregable neighboring APs 105 (e.g., AP 105-*g*) that operate under the same controller 905-*c* and with an aggregation type supported by STA 115-*c*. Such operations may replace a blind search for aggregable neighboring APs 105, which may be energy intensive or otherwise detrimental to a STA 115.

Figure 10:
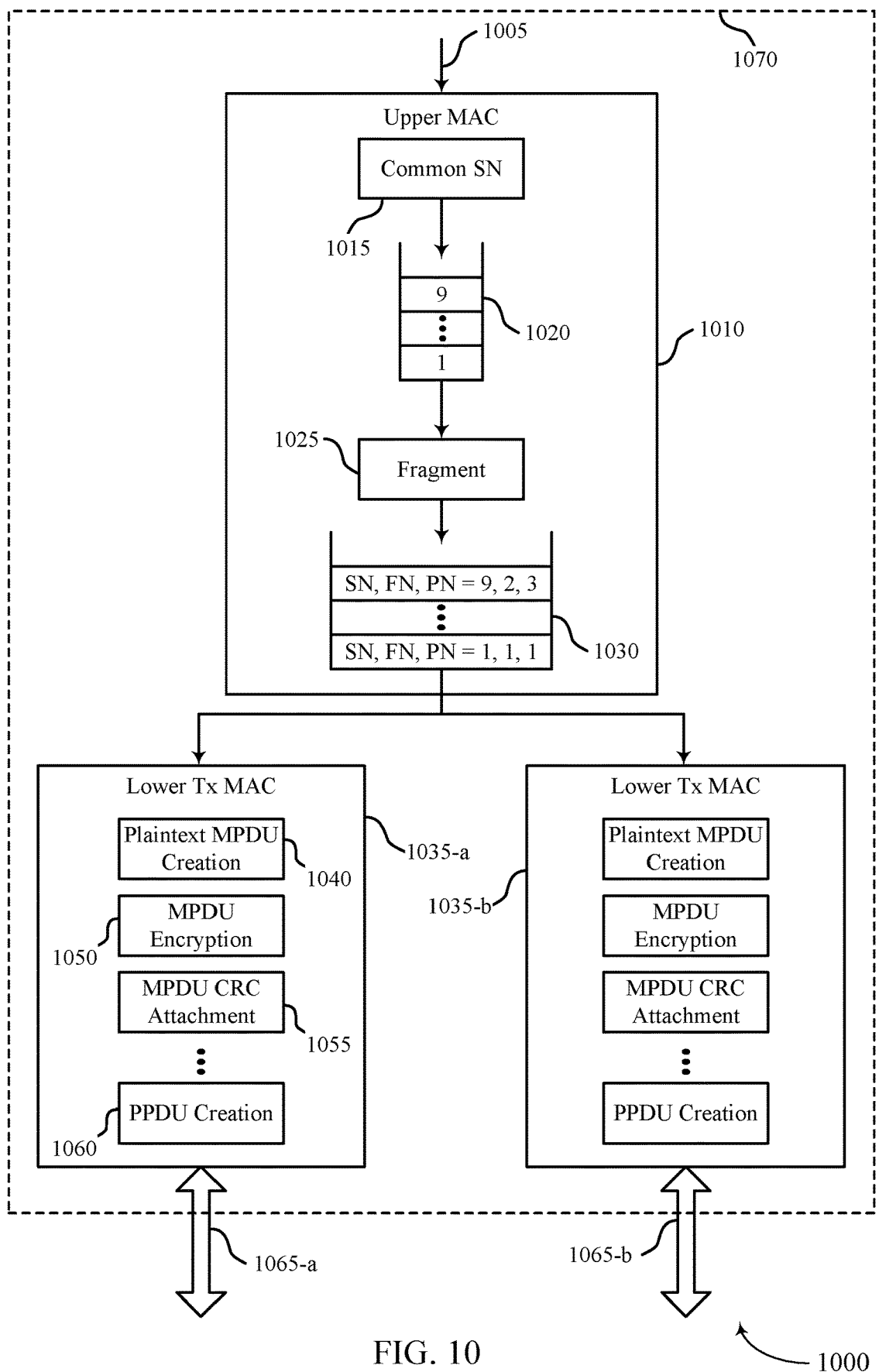
FIG. 10 illustrates an example of a transmission scheme that supports packet based link aggregation architectures in accordance with aspects of the present disclosure.

FIG. 10 illustrates an example of a transmission scheme 1000 that supports packet based link aggregation architectures in accordance with various aspects of the present disclosure. In some examples, transmission scheme 1000 may implement aspects of WLAN 100. For example, transmission scheme 1000 may be implemented between a transmitting device 1070 (e.g., a STA 115 or AP 105) and a receiving device (e.g., a STA 115 or AP 105). Although described in the context of a single transmitting device and a single receiving device, it is to be understood that aspects of the following may be extended to communications with non-co-located APs 105 as described with reference to FIGS. 9A and 9B. Transmission scheme 1000 illustrates aspects of a common transmit queue packet-based aggregation architecture as described with reference to FIG. 6. It is to be understood that aspects of transmission scheme 1000 may additionally be applicable to a per-link transmit queue packet-based aggregation architecture as described with reference to FIG. 5.

The operations of transmission scheme 1000 include generation of a common SN, FN, and PN (across links 1065), negotiation of a common TA and RA, use of a common (e.g., or per-link) encryption key, per-link MPDU and MAC header generation, and determination of AMSDU and MPDU length (e.g., based on requirements of link 1065-*a* and link 1065-*b*).

In the example illustrated by transmission scheme 1000, upper MAC 1010 (e.g., which may be an example of upper MAC 415 described with reference to FIG. 4) may receive application data 1005 as an input. Upper MAC 1010 may in some cases attach a common SN to the MSDUs at 1015 and may allocate these MSDUs to an upper common transmit queue 1020. In some cases, these MSDUs may be fragmented at 1025 before being allocated (e.g., dynamically) from upper common transmit queue 1020 to lower common transmit queue 1030. Subsequently, packets may be allocated to one of lower Tx MAC 1035-*a* or lower Tx MAC 1035-*b* (e.g., which may each be examples of or implement aspects of a lower MAC 425 as described with reference to FIG. 4). In some examples, a transmitting device may contain multiple upper common transmit queues 1020 and multiple lower common transmit queues 1030, each of which is associated with a given access category. Alternatively, all access categories may share a single upper common transmit queue 1020 and a single lower common transmit queue 1030.

In some examples, transmission scheme 1000 may perform on-demand fragmentation and packet allocation. For example, when a link 1065 is ready for transmission (e.g., passes a CCA procedure), an (A)MSDU from upper common transmit queue 1020 may be fragmented at 1025 and passed to lower common transmit queue 1030. In some cases, the fragmentation at 1025 may be performed such that the data that is passed to lower common transmit queue 1030 satisfies the transmit opportunity (TXOP) for the available link 1065. The fragments may be attached with a common FN and PN when entering lower common transmit queue 1030 and allocated to the lower Tx MAC 1035 corresponding to the available link 1065.

The lower Tx MAC 1035 may form the PPDU for transmission. For example, when link 1065-*a* is available for transmission, lower Tx MAC 1035-*a* may copy a fragment form lower common transmit queue 1030. That is, lower Tx MAC 1035-*a* may copy the common SN, FN, and PN associated with each fragment and form a plaintext MPDU at 1040 for each fragment. The plaintext MPDU may, for example, contain the common SN and FN in the MPDU header. At 1050, the MPDU may be further encrypted with the common PN in the CCMP header. In some cases, the encryption may be followed by attachment of a cyclic redundancy check (CRC) at 1055. Subsequently, at 1060, MPDUs may be aggregated as an AMPDU and the final PPDU may be created through the addition of a PHY header. The PPDU may then be transmitted (e.g., via CSMA) over link 1065-*a*. Analogous operations may be performed by lower Tx MAC 1035-*b* for transmissions over link 1065-*b*.

Various considerations are addressed by the operations of transmission scheme 1000. For example, allocation of a common SN at 1015 before allocating packets to a given lower Tx MAC 1035 may support replay check operations described with reference to FIG. 11. The common SN may in some cases be in the form of an internal attribute or may be a new field in the (A)MSDU. Similarly, performing fragmentation at 1025 prior to allocation to a lower Tx MAC 1035 supports various operations described herein. For example, the common PN (e.g., which may be in the form of an internal attribute or a new filed in the (A)MSDU) may have to be assigned after fragmentation, but should be common across links 1065 (e.g., because the PN should increment across MPDUs regardless of which link 1065 carries the eventual PPDU). For example, allocating a PN after allocating to a given link 1065 may force a receiving device to perform a replay check per-link 1065, which may reduce system throughput. Additionally, allocating a PN after allocating packets to a given lower Tx MAC 1035 may in some cases result in degraded throughput if one of the links 1065 suddenly suffers deteriorated communication quality or if some of the fragments do not fit in the TXOP (e.g., in which case they may have to be stored in a per-link transmit queue for that communication link 1065). Similarly, assigning the FN before allocating packets to a given link 1065 (e.g., where the FN may be in the form of an internal attribute or a new field) may support techniques described herein.

In some cases, a common TA and RA may be negotiated across all links 1065 for each aggregated TID. For example, such negotiations may support a BA session that is per <TA, RA, TID> (e.g., where the symbols '< >' indicate a tuple). For example, the common TA and RA may be negotiated during aggregation setup and/or may be based on a pre-defined configuration. Various options for choosing a common TA and RA are included herein. For example, communicating devices may use one original per-link <TA,RA> for a given link 1065. Alternatively, the TA and RA may be generated as a function of certain inputs (e.g., the original per-link <TA, RA> of all aggregated links 1065). For example, the generating function may be based on negotiations or a pre-defined rule. In some cases, the generating function may accept additional inputs such as an aggregated TID, etc. As another option, the common TA and RA may be generated as a random (e.g., or pseudo-random) number (e.g., during aggregation setup).

While negotiation of a common TA and RA may support operations described herein, selection of per-link TA and RA is not precluded by the described techniques. Similarly, transmission scheme 1000 may employ an encryption key that is common to all links 1065 or may employ a per-link encryption key at 1050. For example, in the case of a common encryption key, the operations at 1050 may use a common temporal key (e.g., which may be passed down from upper MAC 1010). The common key identifier may be signaled in a CCMP header of the encrypted MPDU (e.g., to allow a receiving device to use the same common temporal key to decrypt the MPDUs). In the case of a per-link encryption key, the encryption key may be negotiated per-link, which may in some cases increase the complexity of transmission scheme 1000.

Generation of the plaintext MPDU at 1040 (e.g., after link 1065 allocation) may be required because some MAC header fields may be link-specific such that they may only be determined after allocation. Examples of such fields include network allocation vector (NAV) field, HE link adaptation field, power headroom report field, etc. As described above, in order to support MPDU generation at lower Tx MAC 1035, the lower common transmit queue 1030 may pass down the (A)MSDU fragment along with its associated common SN, FN, and PN (e.g., because the SN and FN may be required in the MPDU header and the PN may be required in the CCMP header).

In some cases, restrictions associated with link 1065-*a* and/or link 1065-*b* may inform the length of the (A)MSDU of application data 1005. For example, the (A)MSDU length (or number of (A)MSDUs) may have to satisfy constraints from all links 1065. Similarly, the fragmentation at 1025 may in some cases be performed to meet the maximum MPDU length constrains of all links 1065 (e.g., such that the fragment may fit a single MPDU regardless of which link 1065 to which it is allocated). As described herein, these operations may in some cases be performed per-link (e.g., fragmentation may be performed based on the constraints of link 1065-*a* rather than both links 1065-*a* and 1065-*b*), albeit at the cost of a corresponding increase in complexity of transmission scheme 1000.

Figure 11:
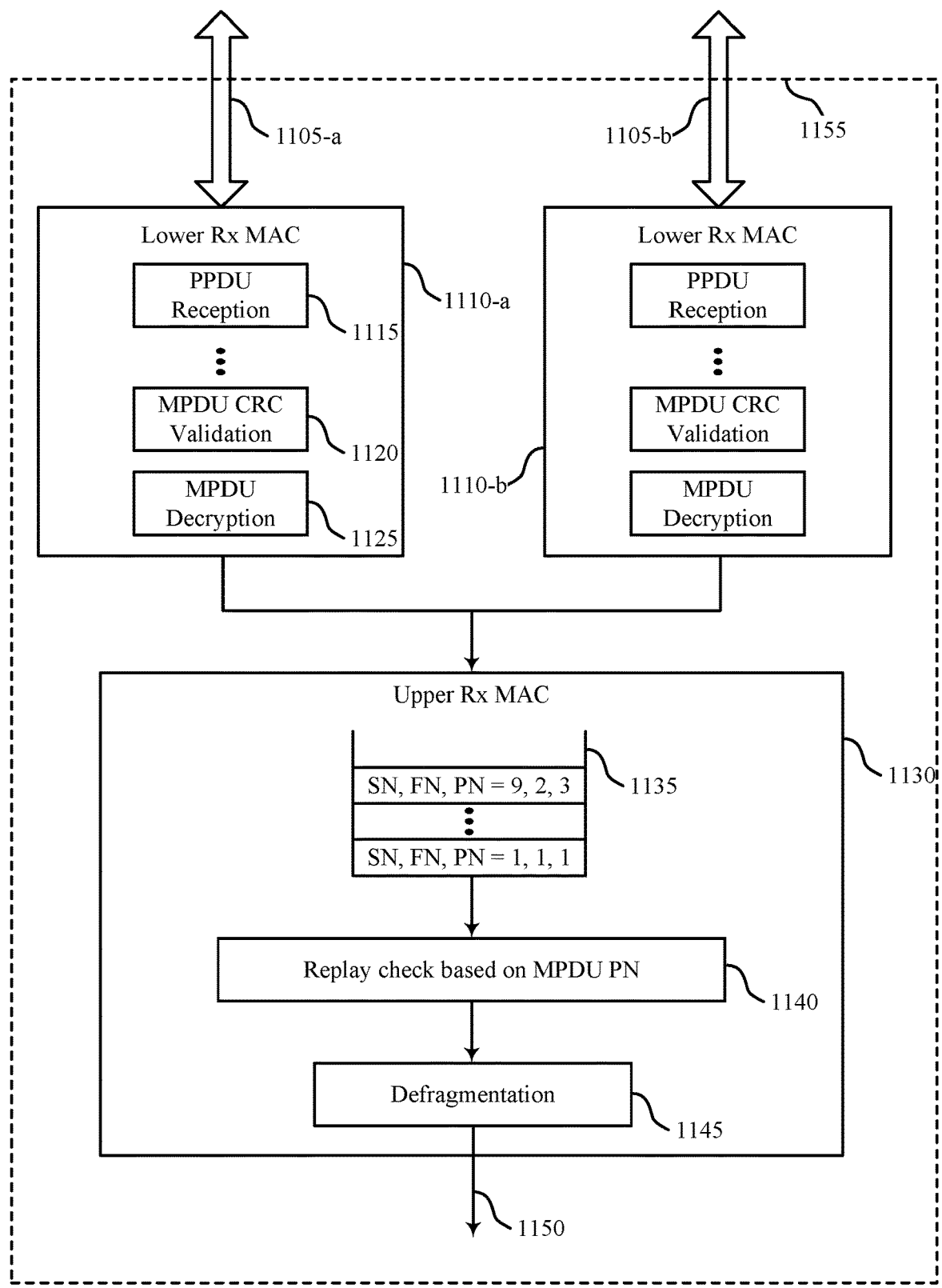
FIG. 11 illustrates an example of a reception scheme that supports packet based link aggregation architectures in accordance with aspects of the present disclosure.

FIG. 11 illustrates an example of a reception scheme 1100 that supports packet based link aggregation architectures in accordance with various aspects of the present disclosure. In some examples, reception scheme 1100 may implement aspects of WLAN 100. For example, reception scheme 1100 may be implemented between a transmitting device (e.g., a STA 115 or AP 105) and a receiving device 1155 (e.g., a STA 115 or AP 105). Although described in the context of a single transmitting device and a single receiving device, it is to be understood that aspects of the following may be extended to communications with non-co-located APs 105 as described with reference to FIGS. 9A and 9B. Reception scheme 1100 illustrates aspects of a common transmit queue packet-based aggregation architecture as described with reference to FIG. 6. It is to be understood that aspects of reception scheme 1100 may additionally be applicable to a per-link transmit queue packet-based aggregation architecture as described with reference to FIG. 5. The operations of reception scheme 1100 may complement the operations of transmission scheme 1000 (e.g., such that analogous operations to those described with respect to transmission scheme 1000 may be performed by reception scheme 1100). Reception scheme 1100 may support common reordering, replay check, and defragmentation across links 1105.

Packets may be received over link 1105-a and link 1105-b by lower Rx MAC 1110-a and lower Rx MAC 1110-b, respectively. The lower Rx MACs 1110 may be an example of the corresponding entities described herein. For example, lower Rx MAC 1110-a may receive a PPDU over link 1105-a at 1115, may perform CRC validation at 1120, and may perform MPDU decryption at 1125 (e.g., using a common decryption key or a decryption key specific to link 1105-a). Analogous operations may be performed by lower Rx MAC 1110-b for packets received over link 1105-b. Each lower Rx MAC 1110 may forward decrypted MPDUs to common receive queue 1135 associated with upper Rx MAC 1130 for reordering. Upper Rx MAC 1130 may be an example of the upper MACs described herein. Packet reordering may be performed by common receive queue 1135 (e.g., based on common SN and FN included in the decrypted MPDU). In some cases, a BA may be sent based on the results in common receive queue 1135. For example, the BA may be sent per link 1105 or on a dedicated link 1105 (e.g., an anchor link). After receiving the BA, a lower common transmit queue of the transmitting device may remove the acknowledged fragments.

Upper Rx MAC 1130 may perform a replay check based on the MPDU PN at 1140. That is, the received MPDUs may be verified with a replay check based on the common MPDU PN. In some cases, the replay check may be performed following reordering by common receive queue 1135 (e.g., because the replay check is based on the common PN and requires MPDUs to be sorted based on common SN and FN). Similarly, defragmentation may be performed after the replay check (e.g., because it may be based on sorted and verified MPDUs). Accordingly, at 1145, (A)MSDU fragments may be extracted from verified MPDUs to form decoded (A)MSDUs 1150.

Figure 12:
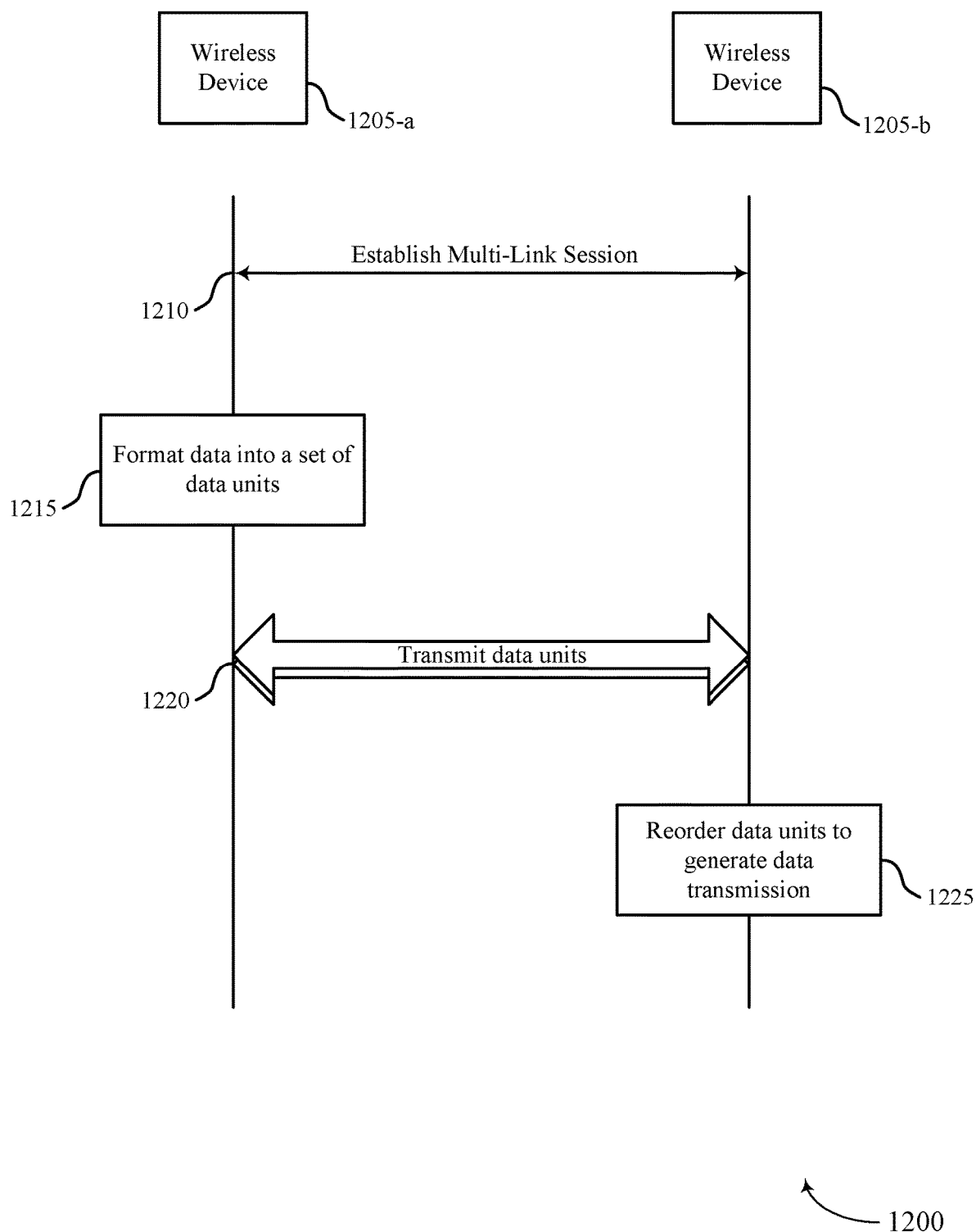
FIGS. 12 and 13 illustrate example process flows that support packet based link aggregation architectures in accordance with aspects of the present disclosure.

FIG. 12 illustrates an example of a process flow 1200 that supports packet based link aggregation architectures in accordance with various aspects of the present disclosure. In some examples, process flow 1200 may implement aspects of WLAN 100. For example, process flow 1200 includes wireless device 1205-a and wireless device 1205-b, each of which may be an example of a STA 115 or an AP 105 as described herein. In some cases, wireless device 1205-a may be an example of wireless device 305-a described with reference to FIG. 3, and wireless device 1205-b may be an example of wireless device 305-b. Alternatively, wireless device 1205-a may be an example of wireless device 305-b, and wireless device 1205-b may be an example of wireless device 305-a. Wireless device 1205-a and wireless device 1205-b may each additionally be an example of or embody aspects of wireless device 455 described with reference to FIG. 4. For example, wireless device 1205-a and wireless device 1205-b may each contain an upper MAC and multiple lower MAC layers to support aspects of the communication schemes outlined above. Further, although process flow 1200 is described in the context of two wireless devices 1205, it is to be understood that in some cases more than two wireless devices 1205 may perform the described techniques (e.g., as described with respect to FIGS. 9A and 9B).

At 1210, wireless device 1205-a and wireless device 1205-b may establish a multi-link session comprising a set of wireless links to support parallel communications between the wireless devices 1205. For example, the multi-link session may be established based on techniques described with reference to FIG. 3.

At 1215, wireless device 1205-a may format data to be transmitted to wireless device 1205-b into a set of data units. For example, the formatting may be performed by an upper MAC layer as described with reference to any of the communication schemes described herein. As an example, the formatting may include fragmenting the data to be transmitted into data units whose length is based at least in part on a constraint associated with one or more of the links of the multi-link session.

At 1220, wireless device 1205-a may transmit (and wireless device 1205-b may receive) the set of data units. For example, wireless device 1205-a may transmit a first subset of data units over a first wireless link of the multi-link session and a second subset of data units over a second wireless link of the multi-link session. The data units may be transmitted according to any of the communication schemes described herein.

At 1225, wireless device 1205-b may reorder the first set of data units and the second set of data units to generate a single data transmission. For example, wireless device 1205-b may perform aspects of reception scheme 1100 described with reference to FIG. 11.

Figure 13:
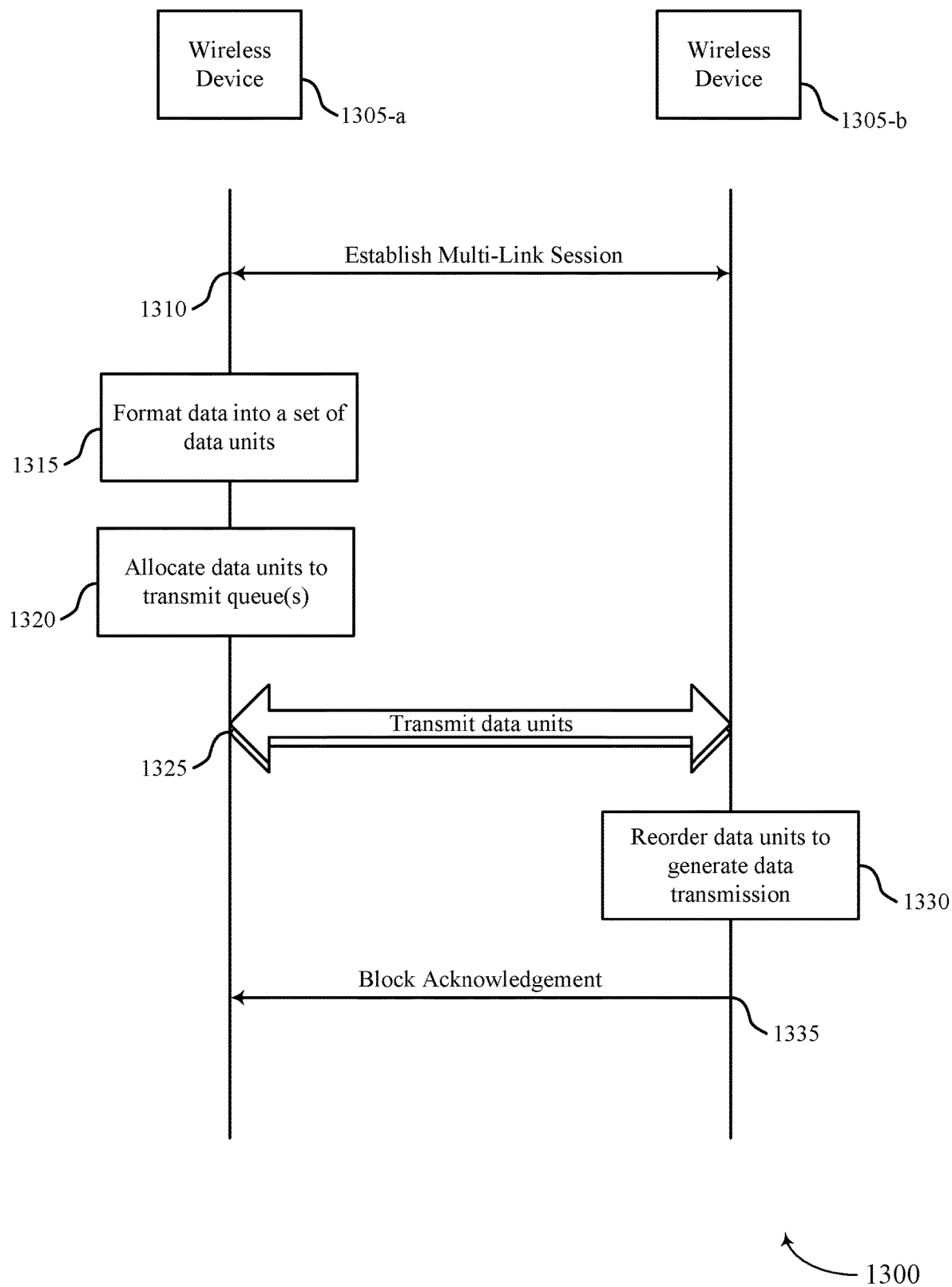

FIG. 13 illustrates an example of a process flow 1300 that supports packet based link aggregation architectures in accordance with various aspects of the present disclosure. In some examples, process flow 1300 may implement aspects of WLAN 100. For example, process flow 1300 includes wireless device 1305-a and wireless device 1305-b, each of which may be an example of a STA 115 or an AP 105 as described herein. In some cases, wireless device 1305-a may be an example of wireless device 305-a described with reference to FIG. 3, and wireless device 1305-b may be an example of wireless device 305-b. Alternatively, wireless device 1305-a may be an example of wireless device 305-b, and wireless device 1305-b may be an example of wireless device 305-a. Similarly, each of wireless device 1305-a and wireless device 1305-b may be an example of either of wireless device 1205-a and wireless device 1205-b. Wireless device 1305-a and wireless device 1305-b may each additionally be an example of or embody aspects of wireless device 455 described with reference to FIG. 4. For example, wireless device 1305-a and wireless device 1305-b may each contain an upper MAC and multiple lower MAC layers to support aspects of the communication schemes outlined above. Further, although process flow 1300 is described in the context of two wireless devices 1305, it is to be understood that in some cases more than two wireless devices 1305 may perform the described techniques (e.g., as described with respect to FIGS. 9A and 9B).

At 1310, wireless device 1305-*a* and wireless device 1305-*b* may establish a multi-link session comprising a group of wireless links to support parallel communications between the wireless devices 1305. For example, the multi-link session may be established based on techniques described with reference to FIG. 3. In some cases, establishing the multi-link session may include assigning a TA, a RA, a TID, or any combination thereof to each of the group of wireless links and establishing a BA session based at least in part on the assignment. Additionally or alternatively, establishing the multi-link session may include establishing a first wireless link between a first lower MAC layer of wireless device 1305-*a* and a first lower MAC layer of wireless device 1305-*b* and establishing a second wireless link between a second lower MAC layer of wireless device 1305-*a* and a second lower MAC layer of wireless device 1305-*b*, where each lower MAC layer of a given wireless device 1305 is in communication with a common upper MAC layer of the given wireless device 1305. In some examples, establishing the multi-link session includes assigning a common value of an operational parameter to a first wireless link and a second wireless link, the operational parameter comprising a sequence number, a frame number, a packet number, a fragment size, a transmitter address, a receiver address, an encryption key, or any combination thereof. For example, assigning the common value of the operational parameter may include identifying a first value of the operational parameter for the first wireless link, identifying a second value of the operational parameter for the second wireless link, and assigning one of the first value or the second value of the operational parameter to be the common value according to a selection criterion for the operational parameter.

At 1315, wireless device 1305-*a* may format data to be transmitted to wireless device 1305-*b* into a group of data units. For example, the formatting may be performed by an upper MAC layer as described with reference to any of the communication schemes described herein. As an example, the formatting may include assigning a respective sequence number of a single set of sequence numbers to each of the group of data units, the set of sequence numbers indicating an order of the group of data units for the data to be transmitted. Alternatively, the formatting may include assigning a respective sequence number of a first set of sequence numbers to each of a first set of data units to be transmitted over a first wireless link of the multi-link session and a respective sequence number of a second set of sequence numbers to each of a second set of data units to be transmitted over a second wireless link of the multi-link session. In some such cases (e.g., cases in which each set of data units is associated with a respective set of sequence numbers), the formatting may further include assigning each of a third set of sequence numbers to one of the first set of data units or the second set of data units, where each of the first set of data units is assigned one of the first set of sequence numbers and one of the third set of sequence numbers, and where each of the second set of data units is assigned one of the second set of sequence numbers and one of the third set of sequence numbers. An example is provided with reference to transmission scheme 1000, which provides techniques for allocating a common sequence number (e.g., which may correspond to the third set of sequence numbers) as well as a per-link sequence number (e.g., which may correspond to the first set of sequence numbers or the second set of sequence numbers). In some cases, wireless device 1305-*a* may encode the data into a group of encoding symbols, such that the data is recoverable at wireless device 1305-*b* by decoding a subset of the group of encoding symbols. In such cases, wireless device 1305-*a* may format the group of encoding symbols into the group of data units.

At 1320, wireless device 1305-*a* may allocate data units to one or more transmit queues. For example, wireless device 1305-*a* may allocate the first set of data units to a first transmit queue for the first wireless link and allocate the second set of data units to a second transmit queue for the second wireless link. Alternatively, wireless device 1305-*a* may allocate the group of data units to a common transmit queue for the first wireless link and the second wireless link. In some such cases, wireless device 1305-*a* may determine a value of a parameter that indicates availability of the first wireless link or the second wireless link (or both) for transmissions to wireless device 1305-*b* and allocate one or more of the group of data units in the common transmit queue to one of the first wireless link or the second wireless link based at least in part on the value of the parameter.

At 1325, wireless device 1305-*a* may transmit (and wireless device 1305-*b* may receive) the group of data units. For example, wireless device 1305-*a* may transmit a first set of data units over a first wireless link of the multi-link session and a second set of data units over a second wireless link of the multi-link session. The data units may be transmitted according to any of the communication schemes described herein. As an example, wireless device 1305-*a* may duplicate one or more data units of the group of data units prior to transmission, where at least one of the first set of data units transmitted over the first wireless link includes a first portion of the duplicated one or more data units and where at least one of the second set of data units transmitted over the second wireless link comprises a second portion of the duplicated one or more data units. In some cases, transmitting the first set of data units includes identifying a pseudo-random sequence known to both wireless device 1305-*a* and wireless device 1305-*b* and transmitting the first set of data units over the first wireless link using a group of frequency resources, each frequency resource of the group of frequency resources used for transmission according to the identified pseudo-random sequence.

At 1330, wireless device 1305-*b* may reorder the first set of data units and the second set of data units to generate a single data transmission. For example, wireless device 1305-*b* may aggregate the first set of data units into a first receive queue for the first wireless link and aggregate the second set of data units into a second receive queue for the second wireless link. In some cases, reordering the first set of data units and the second set of data units includes identifying, for each data unit, one of a set of sequence numbers common between the first set of data units and the second set of data units and reordering the first set of data units and the second set of units based at least in part on the identified common set of sequence numbers. Additionally or alternatively, reordering the data packets may include identifying a sequence number from a first set of sequence numbers for each packet of the first set of packets and a sequence number from a second set of sequence numbers for each packet of the second set of packets. For example, the packets may be reordered based at least in part on a per-link sequence number associated with each data packet (as described herein).

At 1335, wireless device 1305-*b* may transmit a BA based at least in part on a replay check (e.g., a review) of the reordered first set of data units and the second set of data units. For example, the replay check may identify a number of successfully received packets, identify corrupted packets, etc. Additionally or alternatively, wireless device 1305-*b* may defragment the reordered first set of data units and the second set of data units (e.g., as described with reference to reception scheme 1100). The BA may be transmitted on one or more links. For example, it may be transmitted on a designated link (e.g., a link in a lower portion of the RF spectrum that provides adequate coverage). In some cases, the BA may be sent on one (or more) of the wireless links over which the data was received. In some cases, the BA may include or be based on the common SN or per-link SN of each associated data packet.

Figure 14:
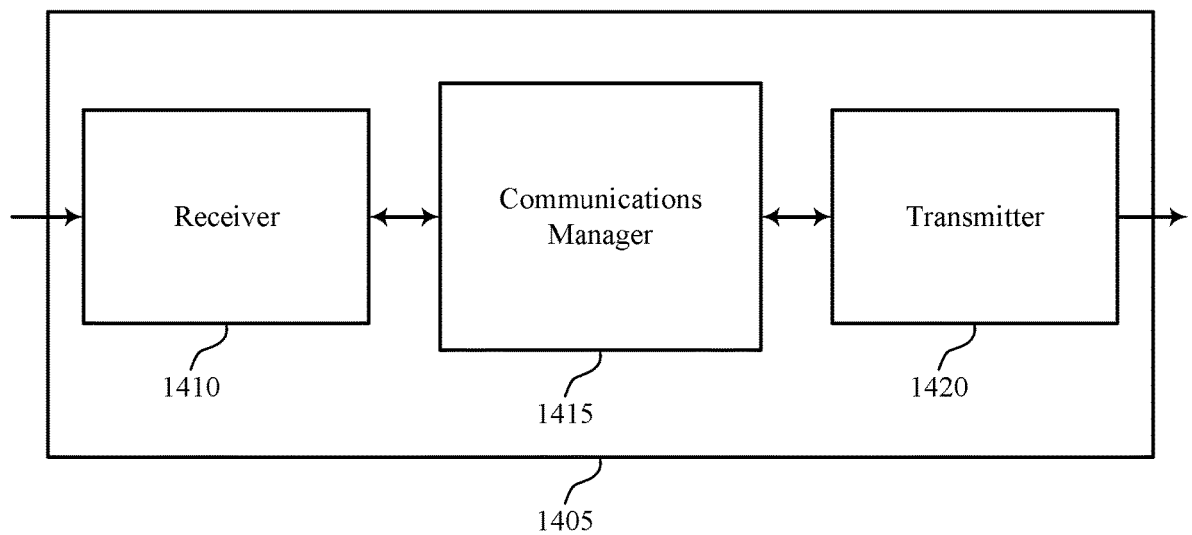
FIGS. 14 through 16 show block diagrams of a device that supports packet based link aggregation architectures in accordance with aspects of the present disclosure.

FIG. 14 shows a block diagram 1400 of a wireless device 1405 that supports packet based link aggregation architectures in accordance with aspects of the present disclosure. Wireless device 1405 may be an example of aspects of a STA 115 or an AP 105 or any of the wireless devices described herein as described herein. Wireless device 1405 may include receiver 1410, communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to packet based link aggregation architectures, etc.). Information may be passed on to other components of the device. The receiver 1410 may be an example of aspects of the transceiver 1735 described with reference to FIG. 17. The receiver 1410 may utilize a single antenna or a set of antennas.

Communications manager 1415 may be an example of aspects of the communications manager 1715 described with reference to FIG. 17. Communications manager 1415 and/or at least some of its various sub-components may be implemented in hardware, software executed by a processor, firmware, or any combination thereof. If implemented in software executed by a processor, the functions of the communications manager 1415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 1415 and/or at least some of its various sub-components may be physically located at various positions, including being distributed such that portions of functions are implemented at different physical locations by one or more physical devices. In some examples, communications manager 1415 and/or at least some of its various sub-components may be a separate and distinct component in accordance with various aspects of the present disclosure. In other examples, communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 1415 may establish a multi-link session between the first wireless device and the second wireless device, the multi-link session including a set of wireless links for communications in parallel between the first wireless device and the second wireless device. Communications manager 1415 may format data to be transmitted to the second wireless device into a set of data units. Communications manager 1415 may transmit a first set of data units of the set of data units to the second wireless device over a first wireless link of the set of wireless links and transmit a second set of data units of the set of data units to the second wireless device over a second wireless link of the set of wireless links. The communications manager 1415 may also receive a first set of data units from the second wireless device over a first wireless link of the set of wireless links, receive a second set of data units from the second wireless device over a second wireless link of the set of wireless links, and reorder the first set of data units and the second set of data units to generate a single data message for the second wireless device.

The communications manager 1415 may also establish a multi-link session between a first wireless device and a second wireless device, the multi-link session may include a plurality of wireless links for communications in parallel between the first wireless device and the second wireless device; and communicate, over the plurality of wireless links, parallel communications between the first wireless device and the second wireless device.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
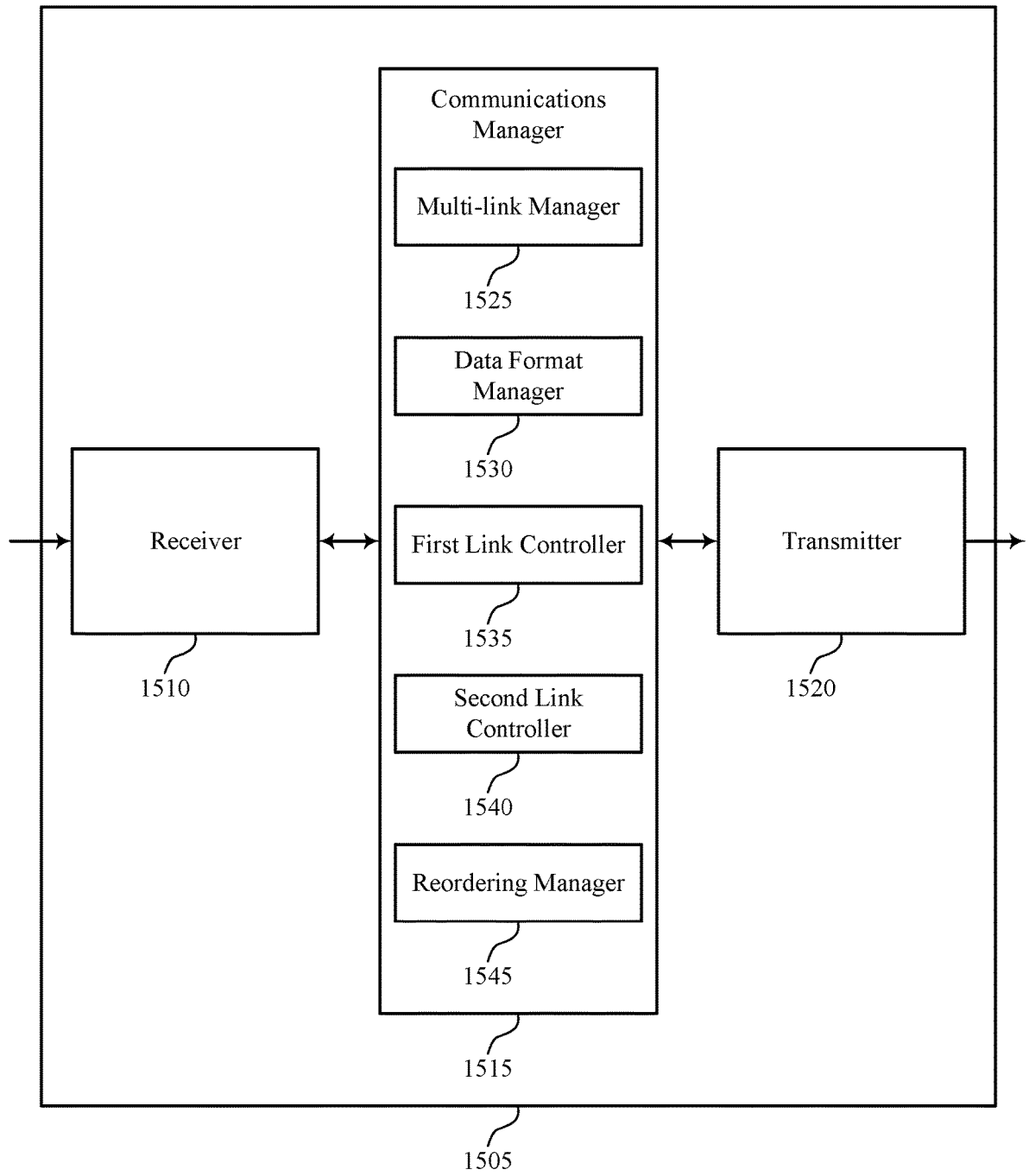

FIG. 15 shows a block diagram 1500 of a wireless device 1505 that supports packet based link aggregation architectures in accordance with aspects of the present disclosure. Wireless device 1505 may be an example of aspects of a STA 115 or an AP 105 or any of the wireless devices described herein. Wireless device 1505 may include receiver 1510, communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to packet based link aggregation architectures, etc.). Information may be passed on to other components of the device. The receiver 1510 may be an example of aspects of the transceiver 1735 described with reference to FIG. 17. The receiver 1510 may utilize a single antenna or a set of antennas.

Communications manager 1515 may be an example of aspects of the communications manager 1715 described with reference to FIG. 17. Communications manager 1515 may also include multi-link manager 1525, data format manager 1530, first link controller 1535, second link controller 1540, and reordering manager 1545.

Multi-link manager 1525 may establish a multi-link session between the first wireless device and a second wireless device, the multi-link session including a set of wireless links for communications in parallel between the first wireless device and the second wireless device. Multi-link manager 1525 may assign a transmitter address, or a receiver address, or a traffic identifier, or a combination thereof, to each of the set of wireless links. Multi-link manager 1525 may establish a block acknowledgement session between the first wireless device and the second wireless device based on the assignment. Multi-link manager 1525 may identify a second value of the operational parameter value for the second wireless link. Multi-link manager 1525 may assign one of the first value or the second value of the operational parameter to be the common value according to a selection criterion for the operational parameter. Multi-link manager 1525 may communicate, over the plurality of wireless links, parallel communications between the first wireless device and the second wireless device. In some examples, the plurality of wireless links are synchronized in time. Additionally or alternatively, a first radio frequency spectrum band may puncture the plurality of wireless links, the first radio frequency spectrum band different from each of a plurality of radio frequency spectrum bands corresponding to the plurality of wireless links of the multi-link session.

In some cases, establishing the multi-link session between the first wireless device and the second wireless device includes establishing the first wireless link between a first lower MAC layer of the first wireless device and a first lower MAC layer of the second wireless device. Multi-link manager 1525 may establish the second wireless link between a second lower MAC layer of the first wireless device and a second lower MAC layer of the second wireless device, where the first lower MAC layer and the second lower MAC layer of the first wireless device are in communication with a common upper MAC layer of the first wireless device. In some cases, establishing the multi-link session between the first wireless device and the second wireless device further includes assigning a common value of an operational parameter to the first wireless link and the second wireless link, the operational parameter including a sequence number, or a frame number, or a packet number, or a fragment size, or a transmitter address, or a receiver address, or an encryption key, or a combination thereof. In some cases, assigning the common value of the operational parameter includes identifying a first value of the operational parameter for the first wireless link.

Data format manager 1530 may format data to be transmitted to the second wireless device into a set of data units. First link controller 1535 may transmit a first set of data units of the set of data units to the second wireless device over a first wireless link of the set of wireless links. First link controller 1535 may transmit the first set of data units using a set of frequency resources of the multi-link session according to the identified pseudo-random sequence. First link controller 1535 may receive a first set of data units from the second wireless device over a first wireless link of the set of wireless links. In some cases, transmitting the first set of data units includes identifying a pseudo-random sequence known to both the first wireless device and the second wireless device. First link controller 1535 may communicate to the second wireless device over a first wireless link of the plurality of wireless links.

Second link controller 1540 may transmit a second set of data units of the set of data units to the second wireless device over a second wireless link of the set of wireless links and receive a second set of data units from the second wireless device over a second wireless link of the set of wireless links. Second link controller 1540 may receive a second set of data units of the plurality of data units from the second wireless device over a second wireless link of the plurality of wireless links. In some cases, the second wireless link may be a narrower bandwidth or operate on a lower frequency band than the first wireless link. In some examples, the received messages from the second wireless device over the second wireless link may include feedback responsive to the transmitted first set of data units. Second link controller 1540 may communicate to a third wireless device over a second wireless link of the plurality of wireless links.

Reordering manager 1545 may reorder the first set of data units and the second set of data units to generate a single data message for the second wireless device. Reordering manager 1545 may reorder the first set of data units and the second set of data units based on the identified set of sequence numbers to generate the single data message. Reordering manager 1545 may identify, for each data unit of the second set of data units, one of a second set of sequence numbers for the first set of data units. Reordering manager 1545 may reorder the first set of data units and the second set of data units based on the identified first set of sequence numbers and the identified second set of sequence numbers to generate the single data message. Reordering manager 1545 may replay check the reordered first set of data units and the second set of data units. Reordering manager 1545 may defragment the reordered first set of data units and the second set of data units. In some cases, reordering the first set of data units and the second set of data units to generate a single data message for the second wireless device includes identifying, for each data unit of the first set of data units and the second set of data units, one of a set of sequence numbers common between the first set of data units and the second set of data units. In some cases, reordering the first set of data units and the second set of data units to generate a single data message for the second wireless device includes identifying, for each data unit of the first set of data units, one of a first set of sequence numbers for the first set of data units.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
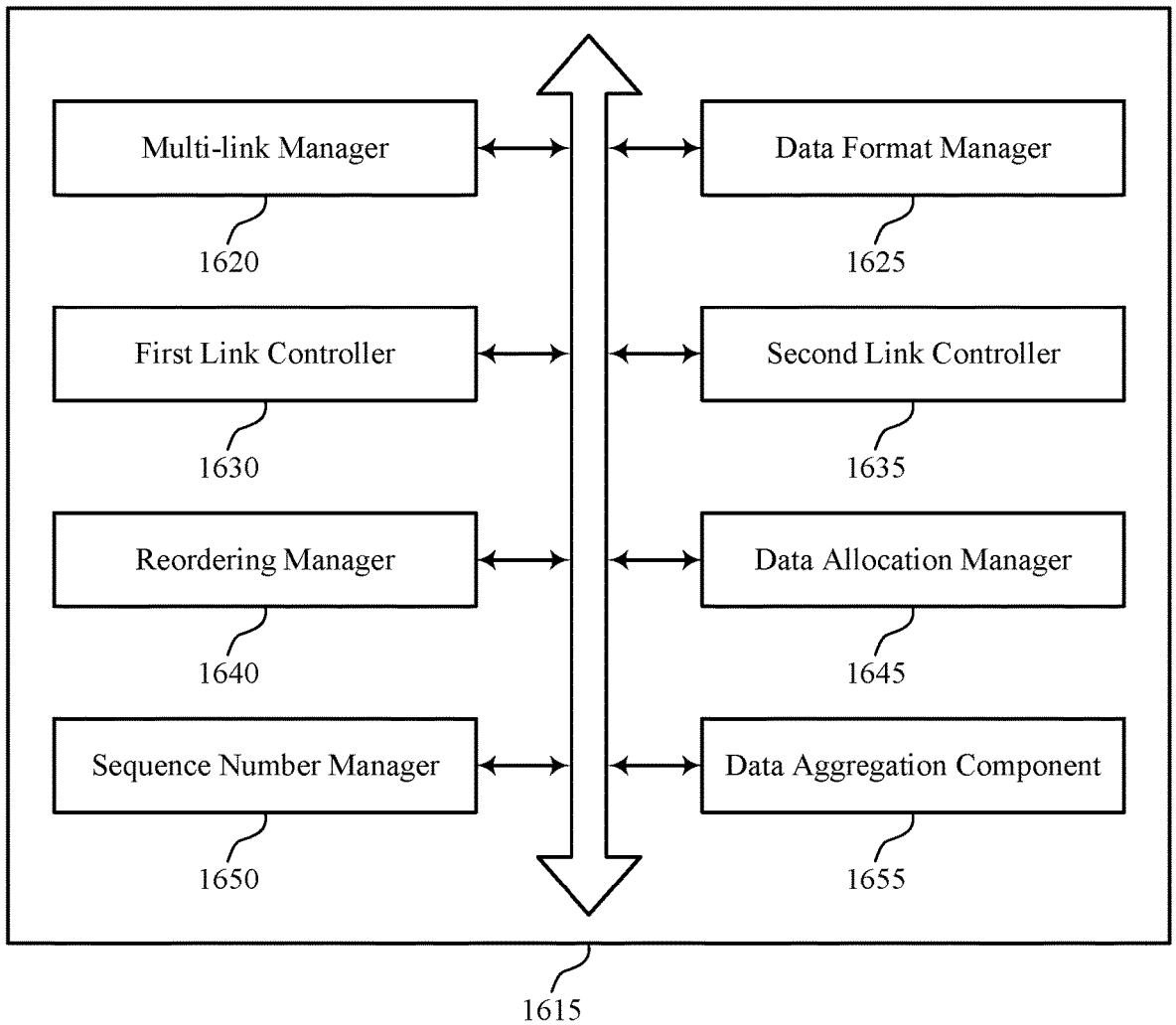

FIG. 16 shows a block diagram 1600 of a communications manager 1615 that supports packet based link aggregation architectures in accordance with aspects of the present disclosure. The communications manager 1615 may be an example of aspects of a communications manager 1415, a communications manager 1515, or a communications manager 1715 described with reference to FIGS. 14, 15, and 17. The communications manager 1615 may include multi-link manager 1620, data format manager 1625, first link controller 1630, second link controller 1635, reordering manager 1640, data allocation manager 1645, sequence number manager 1650, and data aggregation component 1655. Each of these modules may communicate, directly or indirectly, with one another (e.g., via one or more buses).

Multi-link manager 1620 may establish a multi-link session between the first wireless device and the second wireless device, the multi-link session including a set of wireless links for communications in parallel between the first wireless device and the second wireless device. Multi-link manager 1620 may assign a transmitter address, or a receiver address, or a traffic identifier, or a combination thereof, to each of the set of wireless links. Multi-link manager 1620 may establish a block acknowledgement session between the first wireless device and the second wireless device based on the assignment. Multi-link manager 1620 may identify a second value of the operational parameter value for the second wireless link, assign one of the first value or the second value of the operational parameter to be the common value according to a selection criterion for the operational parameter. Multi-link manager 1620 may communicate, over the plurality of wireless links, parallel communications between the first wireless device and the second wireless device. In some examples, the plurality of wireless links are synchronized in time. Additionally or alternatively, a first radio frequency spectrum band may puncture the plurality of wireless links, the first radio frequency spectrum band different from each of a plurality of radio frequency spectrum bands corresponding to the plurality of wireless links of the multi-link session.

In some cases, establishing the multi-link session between the first wireless device and the second wireless device includes: establishing the first wireless link between a first lower MAC layer of the first wireless device and a first lower MAC layer of the second wireless device. Multi-link manager 1620 may establish the second wireless link between a second lower MAC layer of the first wireless device and a second lower MAC layer of the second wireless device, where the first lower MAC layer and the second lower MAC layer of the first wireless device are in communication with a common upper MAC layer of the first wireless device. In some cases, establishing the multi-link session between the first wireless device and the second wireless device further includes assigning a common value of an operational parameter to the first wireless link and the second wireless link, the operational parameter including a sequence number, or a frame number, or a packet number, or a fragment size, or a transmitter address, or a receiver address, or an encryption key, or a combination thereof. In some cases, assigning the common value of the operational parameter includes identifying a first value of the operational parameter for the first wireless link.

Data format manager 1625 may format data to be transmitted to the second wireless device into a set of data units. Data format manager 1625 may encode the data into a group of encoding symbols such that the data is recoverable at a second wireless device by decoding a subset of the plurality of encoding symbols and may format the group of encoding symbols into the set of data units. First link controller 1630 may transmit a first set of data units of the set of data units to the second wireless device over a first wireless link of the set of wireless links. First link controller 1630 may transmit the first set of data units using a set of frequency resources of the multi-link session according to the identified pseudo-random sequence. First link controller 1630 may receive a first set of data units from the second wireless device over a first wireless link of the set of wireless links. In some cases, transmitting the first set of data units includes identifying a pseudo-random sequence known to both the first wireless device and the second wireless device. First link controller 1630 may communicate to the second wireless device over a first wireless link of the plurality of wireless links.

Second link controller 1635 may transmit a second set of data units of the set of data units to the second wireless device over a second wireless link of the set of wireless links and receive a second set of data units from the second wireless device over a second wireless link of the set of wireless links. Second link controller 1640 may receive a second set of data units of the plurality of data units from the second wireless device over a second wireless link of the plurality of wireless links. In some cases, the second wireless link may be a narrower bandwidth or operate on a lower frequency band than the first wireless link. In some examples, the received messages from the second wireless device over the second wireless link may include feedback (e.g., transmission parameters or acknowledgments) responsive to the transmitted first set of data units. The feedback may be live feedback as described herein. Second link controller 1640 may communicate to a third wireless device over a second wireless link of the plurality of wireless links.

Reordering manager 1640 may reorder the first set of data units and the second set of data units to generate a single data message for the second wireless device. Reordering manager 1640 may reorder the first set of data units and the second set of data units based on the identified set of sequence numbers to generate the single data message. Reordering manager 1640 may identify, for each data unit of the second set of data units, one of a second set of sequence numbers for the first set of data units. Reordering manager 1640 may reorder the first set of data units and the second set of data units based on the identified first set of sequence numbers and the identified second set of sequence numbers to generate the single data message. Reordering manager 1640 may replay check the reordered first set of data units and the second set of data units. Reordering manager 1640 may defragment the reordered first set of data units and the second set of data units. In some cases, reordering the first set of data units and the second set of data units to generate a single data message for the second wireless device includes identifying, for each data unit of the first set of data units and the second set of data units, one of a set of sequence numbers common between the first set of data units and the second set of data units. In some cases, reordering the first set of data units and the second set of data units to generate a single data message for the second wireless device includes identifying, for each data unit of the first set of data units, one of a first set of sequence numbers for the first set of data units.

Data allocation manager 1645 may allocate the first set of data units to a first transmit queue for the first wireless link. Data allocation manager 1645 may allocate the set of data units to a common transmit queue for the first wireless link and the second wireless link. Data allocation manager 1645 may allocate the second set of data units to a second transmit queue for the second wireless link. Data allocation manager 1645 may determine a value of a parameter that indicates availability of the first wireless link, or the second wireless link, or both, for transmissions to the second wireless device. Data allocation manager 1645 may allocate one or more of the set of data units in the common transmit queue to one of the first wireless link or the second wireless link based on the value of the parameter. Data allocation manager 1645 may duplicate one or more data units of the set of data units prior to transmission, where at least one of the first set of data units transmitted over the first wireless link includes the duplicated one or more data units, and where at least one of the second set of data units transmitted over the second wireless link includes the duplicated one or more data units.

Sequence number manager 1650 may assign a respective sequence number of a set of sequence numbers to each of the set of data units, the set of sequence numbers indicating an order of the set of data units for the data. Sequence number manager 1650 may assign a respective sequence number of a first set of sequence numbers to each of the first set of data units to be transmitted over the first wireless link. Sequence number manager 1650 may assign a respective sequence number of a second set of sequence numbers to each of the second set of data units to be transmitted over the second wireless link. Sequence number manager 1650 may assign each of a third set of sequence numbers to one of the first set of data units or the second set of data units, where each of the first set of data units is assigned one of the first set of sequence numbers and one of the third set of sequence numbers, and where each of the second set of data units is assigned one of the second set of sequence numbers and one of the third set of sequence numbers.

Data aggregation component 1655 may aggregate the first set of data units into a first receive queue for the first wireless link and aggregate the second set of data units into a second receive queue for the second wireless link.

Figure 17:
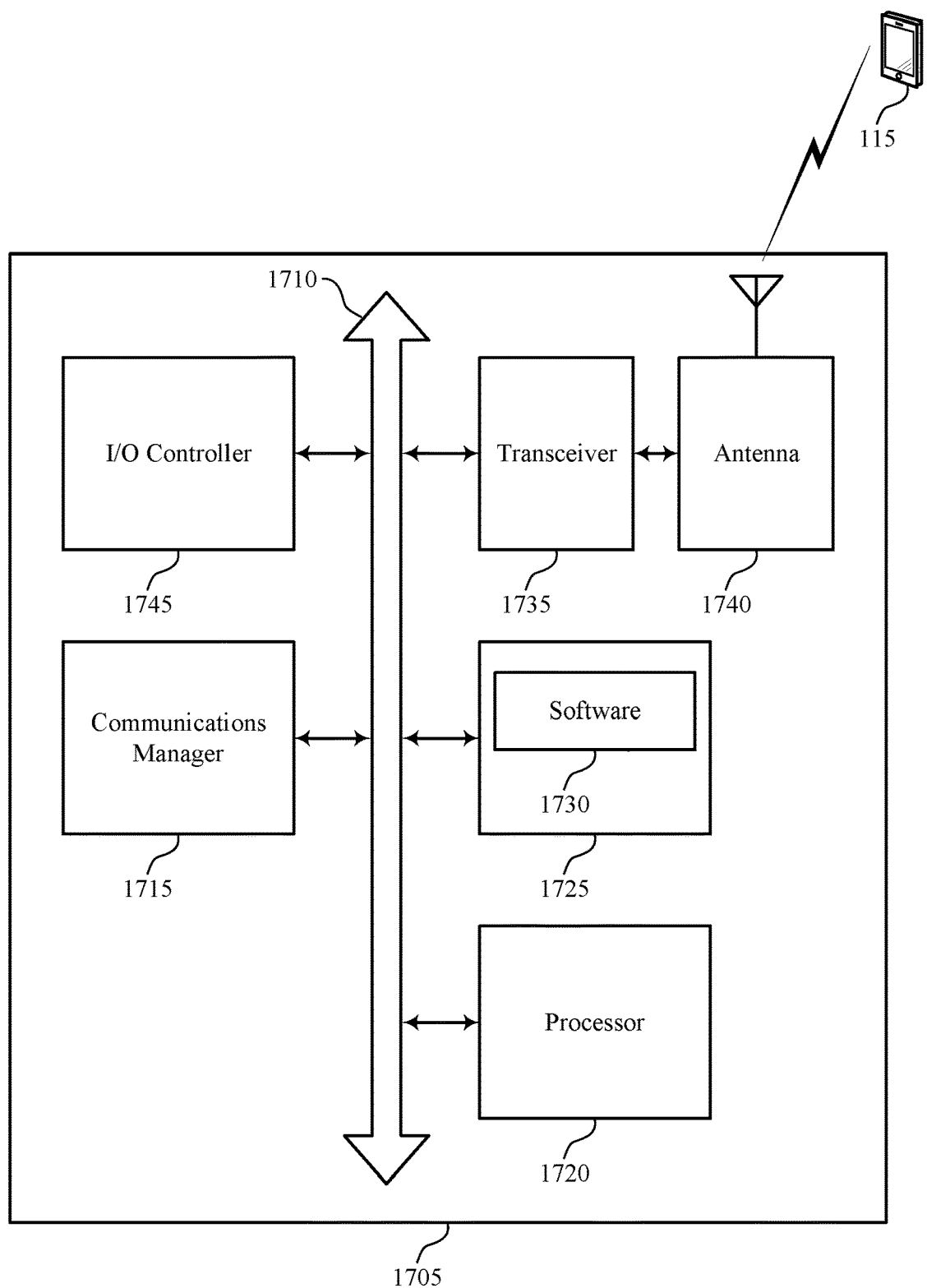
FIG. 17 illustrates a block diagram of a system including a wireless device that supports packet based link aggregation architectures in accordance with aspects of the present disclosure.

FIG. 17 shows a diagram of a system 1700 including a device 1705 that supports packet based link aggregation architectures in accordance with aspects of the present disclosure. Device 1705 may be an example of or include the components of a STA 115 or an AP 105 or any of the wireless devices described herein. Device 1705 may include components for bi-directional voice and data communications including components for transmitting and receiving communications, including communications manager 1715, processor 1720, memory 1725, software 1730, transceiver 1735, antenna 1740, and I/O controller 1745. These components may be in electronic communication via one or more buses (e.g., bus 1710).

Processor 1720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting packet based link aggregation architectures).

Memory 1725 may include random access memory (RAM) and read only memory (ROM). The memory 1725 may store computer-readable, computer-executable software 1730 including instructions that, when executed, cause the processor to perform various functions described herein. In some cases, the memory 1725 may contain, among other things, a basic input/output system (BIOS) which may control basic hardware or software operation such as the interaction with peripheral components or devices.

Software 1730 may include code to implement aspects of the present disclosure, including code to support packet based link aggregation architectures. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described herein. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas. In some cases, the wireless device may include a single antenna 1740. However, in some cases the device may have more than one antenna 1740, which may be capable of concurrently transmitting or receiving multiple wireless transmissions.

I/O controller 1745 may manage input and output signals for device 1705. I/O controller 1745 may also manage peripherals not integrated into device 1705. In some cases, I/O controller 1745 may represent a physical connection or port to an external peripheral. In some cases, I/O controller 1745 may utilize an operating system such as iOS®, ANDROID®, MS-DOS®, MS-WINDOWS®, OS/2®, UNIX®, LINUX®, or another known operating system. In other cases, I/O controller 1745 may represent or interact with a modem, a keyboard, a mouse, a touchscreen, or a similar device. In some cases, I/O controller 1745 may be implemented as part of a processor. In some cases, a user may interact with device 1705 via I/O controller 1745 or via hardware components controlled by I/O controller 1745.

Figure 18:
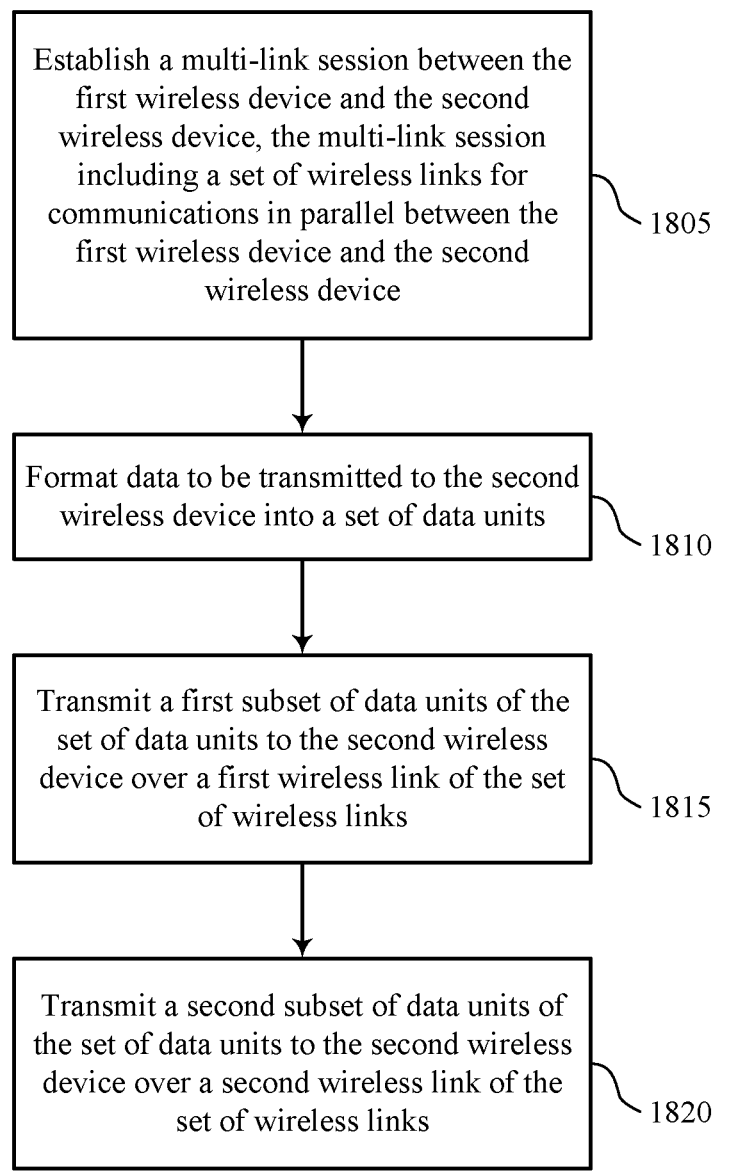
FIGS. 18 through 25 illustrate methods for packet based link aggregation architectures in accordance with aspects of the present disclosure.

FIG. 18 shows a flowchart illustrating a method 1800 for packet based link aggregation architectures in accordance with aspects of the present disclosure. The operations of method 1800 may be implemented by a STA 115 or an AP 105 or any of the wireless devices described herein. For example, the operations of method 1800 may be performed by a communications manager as described with reference to FIGS. 14 through 17. In some examples, a STA 115 or an AP 105 or any of the wireless devices described herein may execute a set of codes to control the functional elements of the device to perform the functions described herein. Additionally or alternatively, the STA 115 or an AP 105 or any of the wireless devices described herein may perform aspects of the functions described herein using special-purpose hardware.

At 1805 the STA 115 or an AP 105 or any of the wireless devices described herein may establish a multi-link session between the first wireless device and the second wireless device, the multi-link session comprising a plurality of wireless links for communications in parallel between the first wireless device and the second wireless device. The operations of 1805 may be performed according to the methods described herein. In certain examples, aspects of the operations of 1805 may be performed by a multi-link manager as described with reference to FIGS. 14 through 17.

At 1810 the STA 115 or an AP 105 or any of the wireless devices described herein may format data to be transmitted to the second wireless device into a plurality of data units. The operations of 1810 may be performed according to the methods described herein. In certain examples, aspects of the operations of 1810 may be performed by a data format manager as described with reference to FIGS. 14 through 17.

At 1815 the STA 115 or an AP 105 or any of the wireless devices described herein may transmit a first set of data units of the plurality of data units to the second wireless device over a first wireless link of the plurality of wireless links. The operations of 1815 may be performed according to the methods described herein. In certain examples, aspects of the operations of 1815 may be performed by a first link controller as described with reference to FIGS. 14 through 17.

At 1820 the STA 115 or an AP 105 or any of the wireless devices described herein may transmit a second set of data units of the plurality of data units to the second wireless device over a second wireless link of the plurality of wireless links. The operations of 1820 may be performed according to the methods described herein. In certain examples, aspects of the operations of 1820 may be performed by a second link controller as described with reference to FIGS. 14 through 17.

Figure 19:
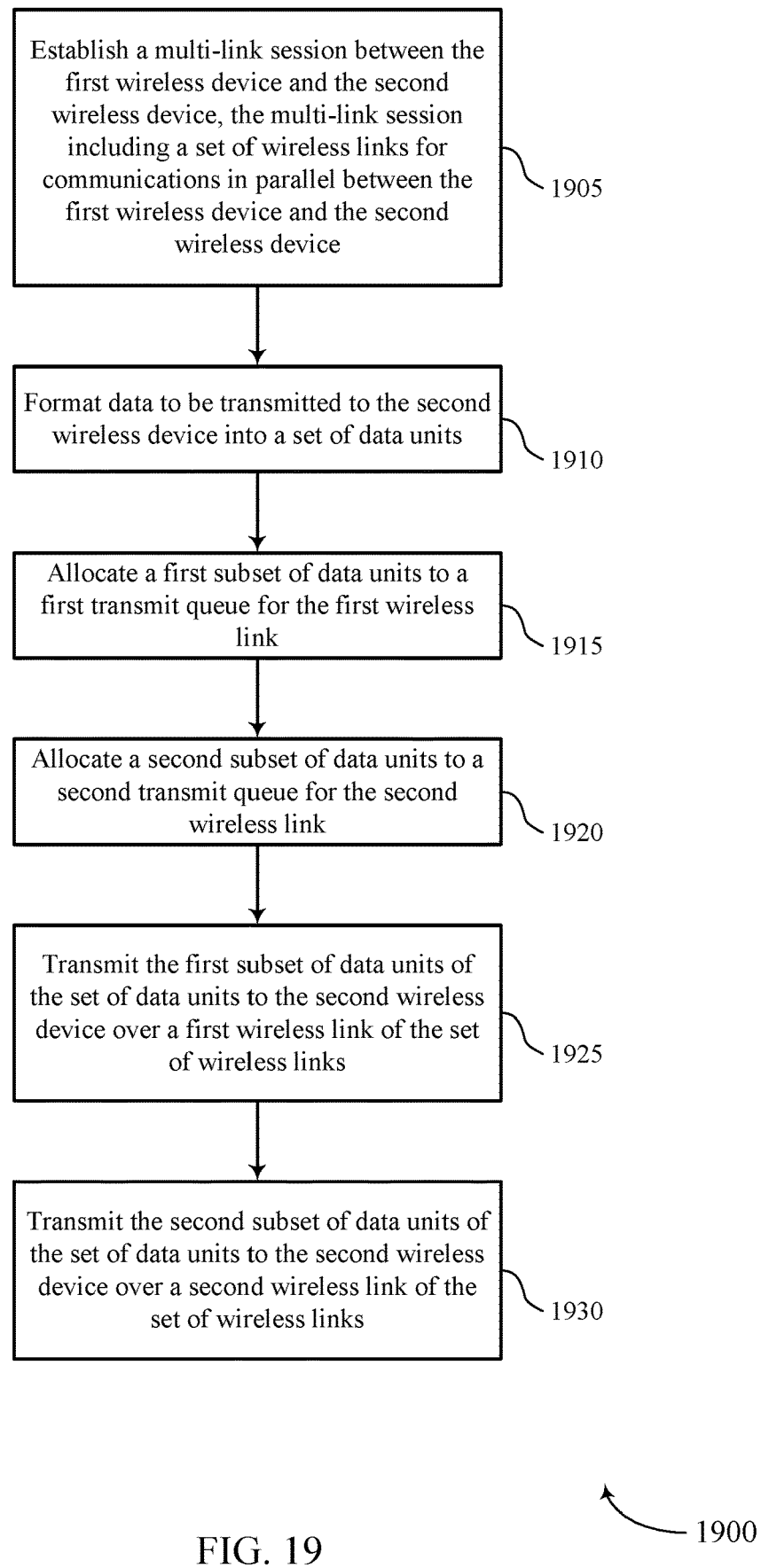

FIG. 19 shows a flowchart illustrating a method 1900 for packet based link aggregation architectures in accordance with aspects of the present disclosure. The operations of method 1900 may be implemented by a STA 115 or an AP 105 or any of the wireless devices described herein or its components as described herein. For example, the operations of method 1900 may be performed by a communications manager as described with reference to FIGS. 14 through 17. In some examples, a STA 115 or an AP 105 or any of the wireless devices described herein may execute a set of codes to control the functional elements of the device to perform the functions described herein. Additionally or alternatively, the STA 115 or an AP 105 or any of the wireless devices described herein may perform aspects of the functions described herein using special-purpose hardware.

At 1905 the STA 115 or an AP 105 or any of the wireless devices described herein may establish a multi-link session between the first wireless device and the second wireless device, the multi-link session comprising a plurality of wireless links for communications in parallel between the first wireless device and the second wireless device. The operations of 1905 may be performed according to the methods described herein. In certain examples, aspects of the operations of 1905 may be performed by a multi-link manager as described with reference to FIGS. 14 through 17.

At 1910 the STA 115 or an AP 105 or any of the wireless devices described herein may format data to be transmitted to the second wireless device into a plurality of data units. The operations of 1910 may be performed according to the methods described herein. In certain examples, aspects of the operations of 1910 may be performed by a data format manager as described with reference to FIGS. 14 through 17.

At 1915 the STA 115 or an AP 105 or any of the wireless devices described herein may allocate the first set of data units to a first transmit queue for the first wireless link. The operations of 1915 may be performed according to the methods described herein. In certain examples, aspects of the operations of 1915 may be performed by a data allocation manager as described with reference to FIGS. 14 through 17.

At 1920 the STA 115 or an AP 105 or any of the wireless devices described herein may allocate the second set of data units to a second transmit queue for the second wireless link. The operations of 1920 may be performed according to the methods described herein. In certain examples, aspects of the operations of 1920 may be performed by a data allocation manager as described with reference to FIGS. 14 through 17.

At 1925 the STA 115 or an AP 105 or any of the wireless devices described herein may transmit a first set of data units of the plurality of data units to the second wireless device over a first wireless link of the plurality of wireless links. The operations of 1925 may be performed according to the methods described herein. In certain examples, aspects of the operations of 1925 may be performed by a first link controller as described with reference to FIGS. 14 through 17.

At 1930 the STA 115 or an AP 105 or any of the wireless devices described herein may transmit a second set of data units of the plurality of data units to the second wireless device over a second wireless link of the plurality of wireless links. The operations of 1930 may be performed according to the methods described herein. In certain examples, aspects of the operations of 1930 may be performed by a second link controller as described with reference to FIGS. 14 through 17.

Figure 20:
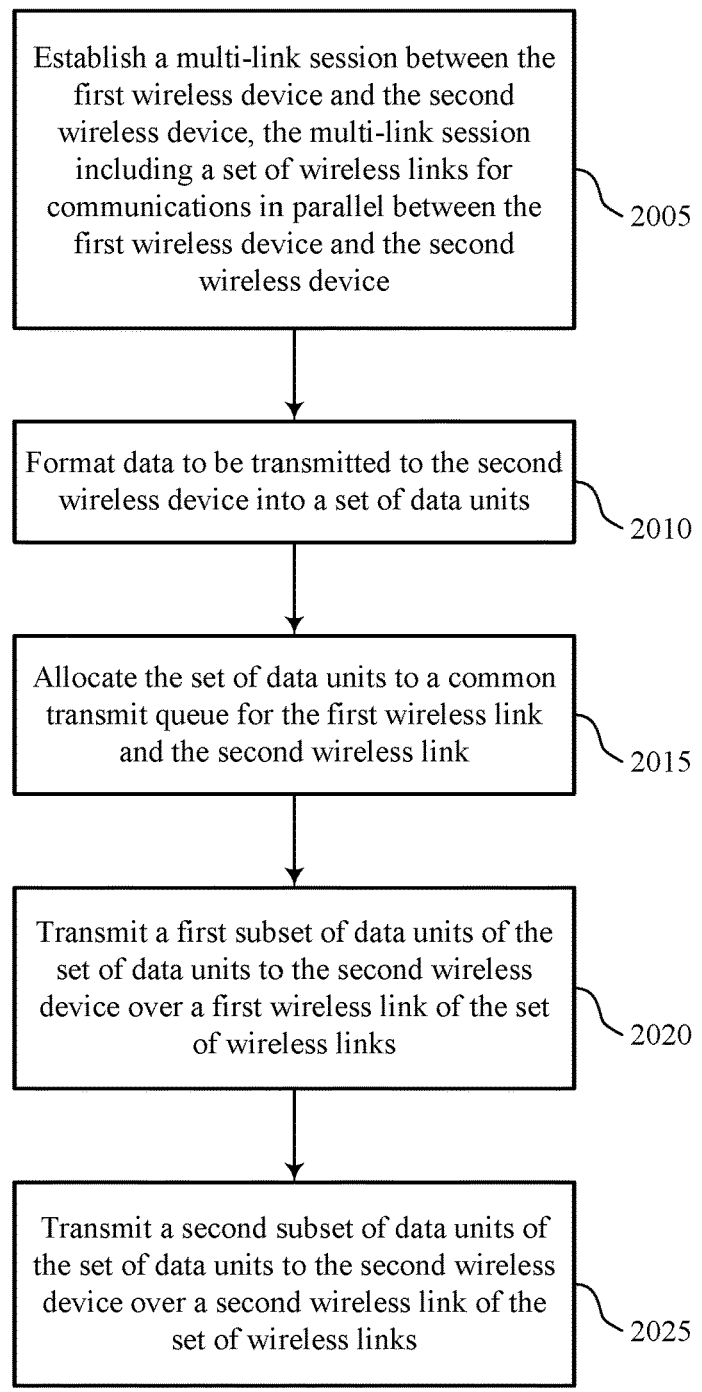

FIG. 20 shows a flowchart illustrating a method 2000 for packet based link aggregation architectures in accordance with aspects of the present disclosure. The operations of method 2000 may be implemented by a STA 115 or an AP 105 or any of the wireless devices described herein or its components as described herein. For example, the operations of method 2000 may be performed by a communications manager as described with reference to FIGS. 14 through 17. In some examples, a STA 115 or an AP 105 or any of the wireless devices described herein may execute a set of codes to control the functional elements of the device to perform the functions described herein. Additionally or alternatively, the STA 115 or an AP 105 or any of the wireless devices described herein may perform aspects of the functions described herein using special-purpose hardware.

At 2005 the STA 115 or an AP 105 or any of the wireless devices described herein may establish a multi-link session between the first wireless device and the second wireless device, the multi-link session comprising a plurality of wireless links for communications in parallel between the first wireless device and the second wireless device. The operations of 2005 may be performed according to the methods described herein. In certain examples, aspects of the operations of 2005 may be performed by a multi-link manager as described with reference to FIGS. 14 through 17.

At 2010 the STA 115 or an AP 105 or any of the wireless devices described herein may format data to be transmitted to the second wireless device into a plurality of data units. The operations of 2010 may be performed according to the methods described herein. In certain examples, aspects of the operations of 2010 may be performed by a data format manager as described with reference to FIGS. 14 through 17.

At 2015 the STA 115 or an AP 105 or any of the wireless devices described herein may allocate the plurality of data units to a common transmit queue for the first wireless link and the second wireless link. The operations of 2015 may be performed according to the methods described herein. In certain examples, aspects of the operations of 2015 may be performed by a data allocation manager as described with reference to FIGS. 14 through 17.

At 2020 the STA 115 or an AP 105 or any of the wireless devices described herein may transmit a first set of data units of the plurality of data units to the second wireless device over a first wireless link of the plurality of wireless links. The operations of 2020 may be performed according to the methods described herein. In certain examples, aspects of the operations of 2020 may be performed by a first link controller as described with reference to FIGS. 14 through 17.

At 2025 the STA 115 or an AP 105 or any of the wireless devices described herein may transmit a second set of data units of the plurality of data units to the second wireless device over a second wireless link of the plurality of wireless links. The operations of 2025 may be performed according to the methods described herein. In certain examples, aspects of the operations of 2025 may be performed by a second link controller as described with reference to FIGS. 14 through 17.

Figure 21:
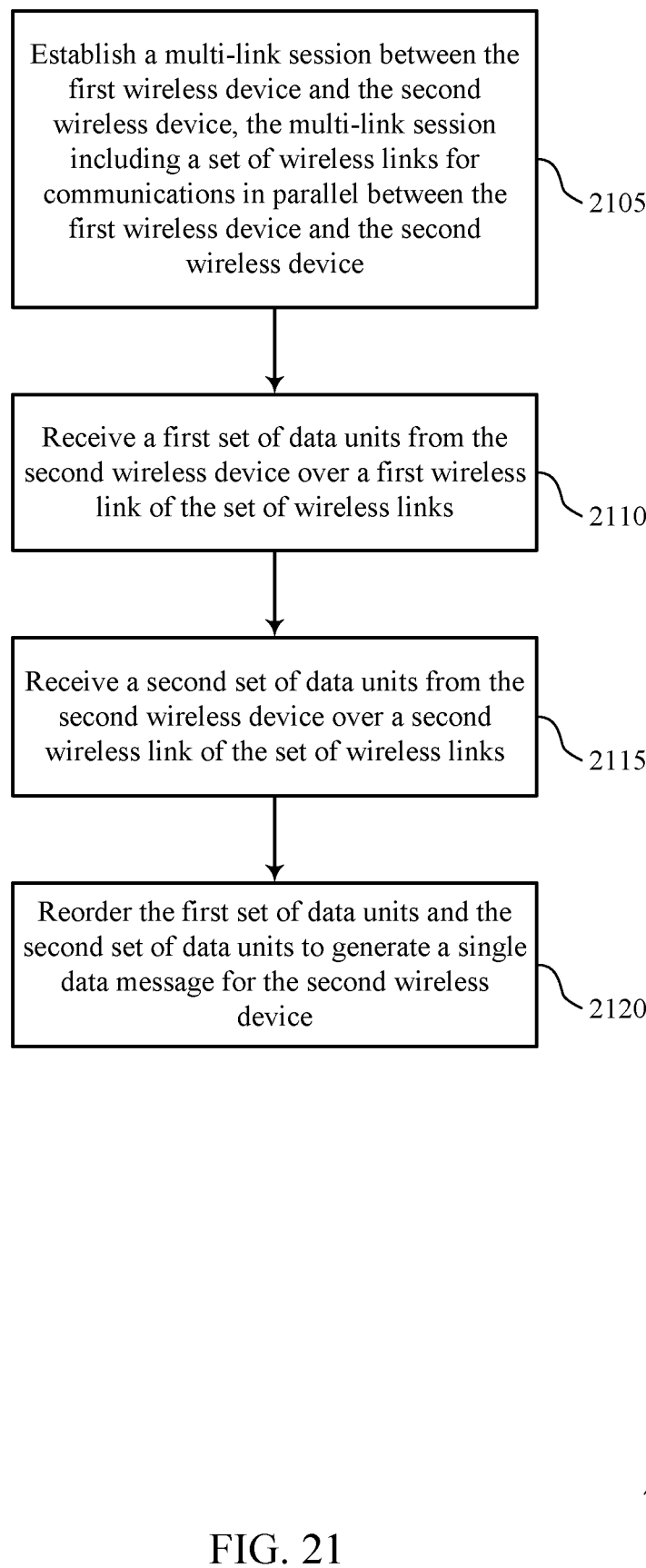

FIG. 21 shows a flowchart illustrating a method 2100 for packet based link aggregation architectures in accordance with aspects of the present disclosure. The operations of method 2100 may be implemented by a STA 115 or an AP 105 or any of the wireless devices described herein or its components as described herein. For example, the operations of method 2100 may be performed by a communications manager as described with reference to FIGS. 14 through 17. In some examples, a STA 115 or an AP 105 or any of the wireless devices described herein may execute a set of codes to control the functional elements of the device to perform the functions described herein. Additionally or alternatively, the STA 115 or an AP 105 or any of the wireless devices described herein may perform aspects of the functions described herein using special-purpose hardware.

At 2105 the STA 115 or an AP 105 or any of the wireless devices described herein may establish a multi-link session between the first wireless device and the second wireless device, the multi-link session comprising a plurality of wireless links for communications in parallel between the first wireless device and the second wireless device. The operations of 2105 may be performed according to the methods described herein. In certain examples, aspects of the operations of 2105 may be performed by a multi-link manager as described with reference to FIGS. 14 through 17.

At 2110 the STA 115 or an AP 105 or any of the wireless devices described herein may receive a first set of data units from the second wireless device over a first wireless link of the plurality of wireless links. The operations of 2110 may be performed according to the methods described herein. In certain examples, aspects of the operations of 2110 may be performed by a first link controller as described with reference to FIGS. 14 through 17.

At 2115 the STA 115 or an AP 105 or any of the wireless devices described herein may receive a second set of data units from the second wireless device over a second wireless link of the plurality of wireless links. The operations of 2115 may be performed according to the methods described herein. In certain examples, aspects of the operations of 2115 may be performed by a second link controller as described with reference to FIGS. 14 through 17.

At 2120 the STA 115 or an AP 105 or any of the wireless devices described herein may reorder the first set of data units and the second set of data units to generate a single data message for the second wireless device. The operations of 2120 may be performed according to the methods described herein. In certain examples, aspects of the operations of 2120 may be performed by a reordering manager as described with reference to FIGS. 14 through 17.

Figure 22:
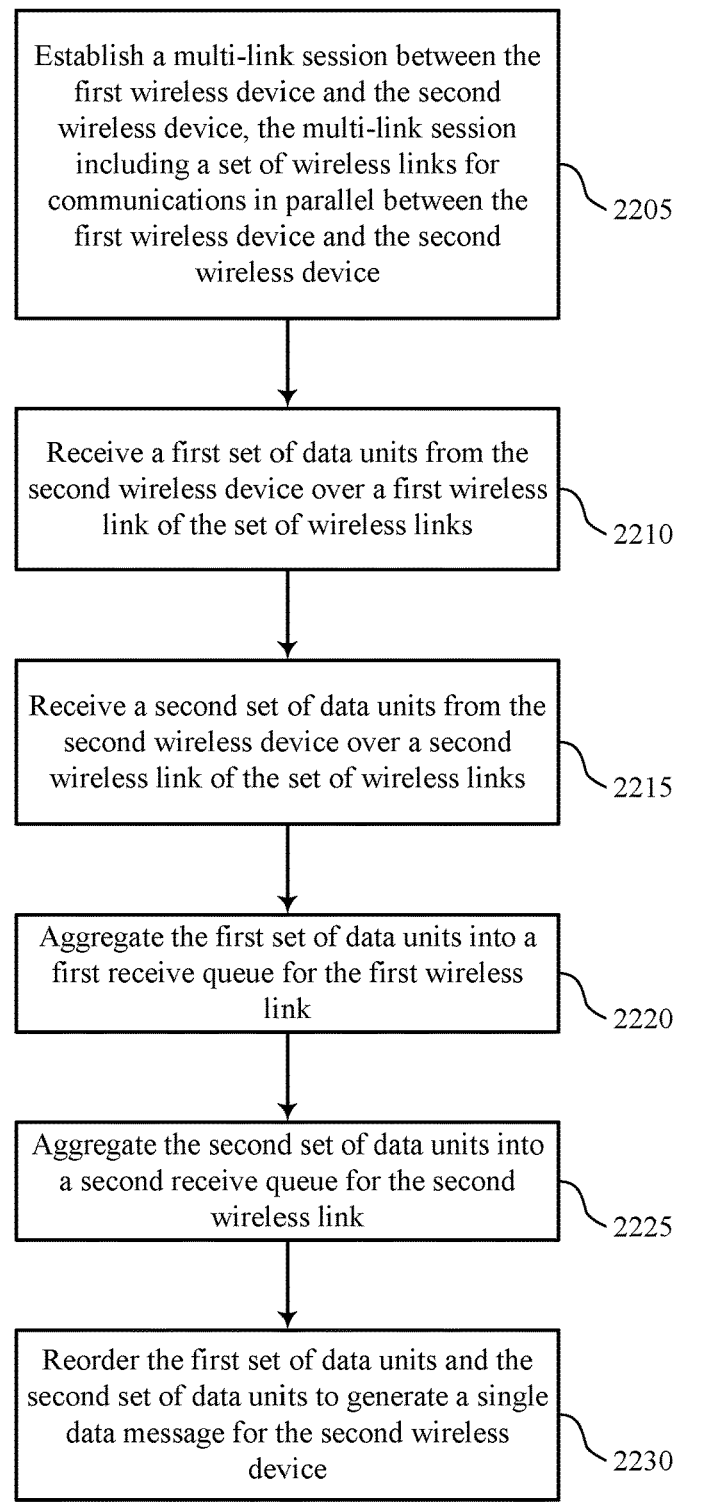

FIG. 22 shows a flowchart illustrating a method 2200 for packet based link aggregation architectures in accordance with aspects of the present disclosure. The operations of method 2200 may be implemented by a STA 115 or an AP 105 or any of the wireless devices described herein or its components as described herein. For example, the operations of method 2200 may be performed by a communications manager as described with reference to FIGS. 14 through 17. In some examples, a STA 115 or an AP 105 or any of the wireless devices described herein may execute a set of codes to control the functional elements of the device to perform the functions described herein. Additionally or alternatively, the STA 115 or an AP 105 or any of the wireless devices described herein may perform aspects of the functions described herein using special-purpose hardware.

At 2205 the STA 115 or an AP 105 or any of the wireless devices described herein may establish a multi-link session between the first wireless device and the second wireless device, the multi-link session comprising a plurality of wireless links for communications in parallel between the first wireless device and the second wireless device. The operations of 2205 may be performed according to the methods described herein. In certain examples, aspects of the operations of 2205 may be performed by a multi-link manager as described with reference to FIGS. 14 through 17.

At 2210 the STA 115 or an AP 105 or any of the wireless devices described herein may receive a first set of data units from the second wireless device over a first wireless link of the plurality of wireless links. The operations of 2210 may be performed according to the methods described herein. In certain examples, aspects of the operations of 2210 may be performed by a first link controller as described with reference to FIGS. 14 through 17.

At 2215 the STA 115 or an AP 105 or any of the wireless devices described herein may receive a second set of data units from the second wireless device over a second wireless link of the plurality of wireless links. The operations of 2215 may be performed according to the methods described herein. In certain examples, aspects of the operations of 2215 may be performed by a second link controller as described with reference to FIGS. 14 through 17.

At 2220 the STA 115 or an AP 105 or any of the wireless devices described herein may aggregate the first set of data units into a first receive queue for the first wireless link. The operations of 2220 may be performed according to the methods described herein. In certain examples, aspects of the operations of 2220 may be performed by a data aggregation component as described with reference to FIGS. 14 through 17.

At 2225 the STA 115 or an AP 105 or any of the wireless devices described herein may aggregate the second set of data units into a second receive queue for the second wireless link. The operations of 2225 may be performed according to the methods described herein. In certain examples, aspects of the operations of 2225 may be performed by a data aggregation component as described with reference to FIGS. 14 through 17.

At 2230 the STA 115 or an AP 105 or any of the wireless devices described herein may reorder the first set of data units and the second set of data units to generate a single data message for the second wireless device. The operations of 2230 may be performed according to the methods described herein. In certain examples, aspects of the operations of 2230 may be performed by a reordering manager as described with reference to FIGS. 14 through 17.

Figure 23:
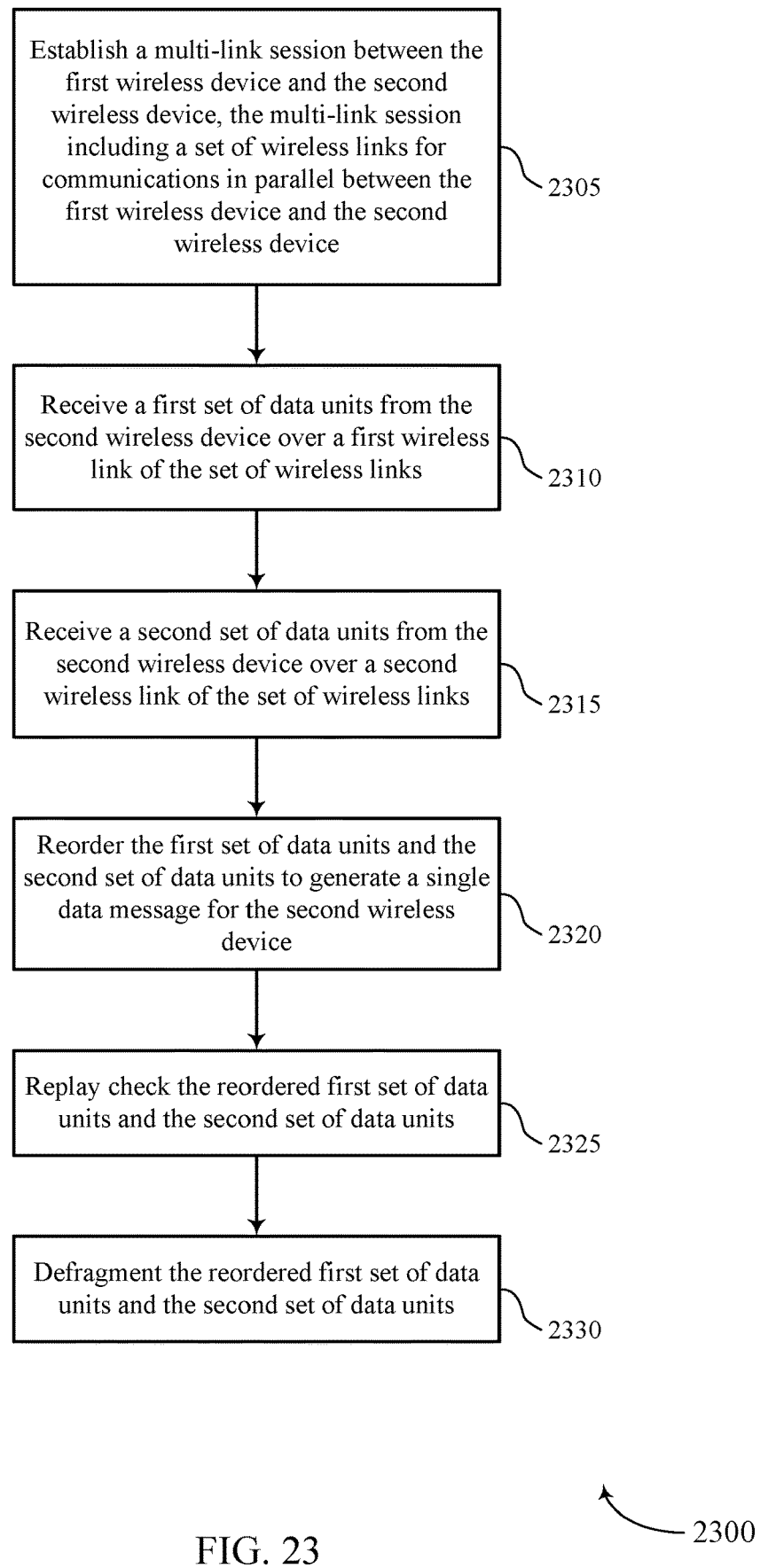

FIG. 23 shows a flowchart illustrating a method 2300 for packet based link aggregation architectures in accordance with aspects of the present disclosure. The operations of method 2300 may be implemented by a STA 115 or an AP 105 or any of the wireless devices described herein or its components as described herein. For example, the operations of method 2300 may be performed by a communications manager as described with reference to FIGS. 14 through 17. In some examples, a STA 115 or an AP 105 or any of the wireless devices described herein may execute a set of codes to control the functional elements of the device to perform the functions described herein. Additionally or alternatively, the STA 115 or an AP 105 or any of the wireless devices described herein may perform aspects of the functions described herein using special-purpose hardware.

At 2305 the STA 115 or an AP 105 or any of the wireless devices described herein may establish a multi-link session between the first wireless device and the second wireless device, the multi-link session comprising a plurality of wireless links for communications in parallel between the first wireless device and the second wireless device. The operations of 2305 may be performed according to the methods described herein. In certain examples, aspects of the operations of 2305 may be performed by a multi-link manager as described with reference to FIGS. 14 through 17.

At 2310 the STA 115 or an AP 105 or any of the wireless devices described herein may receive a first set of data units from the second wireless device over a first wireless link of the plurality of wireless links. The operations of 2310 may be performed according to the methods described herein. In certain examples, aspects of the operations of 2310 may be performed by a first link controller as described with reference to FIGS. 14 through 17.

At 2315 the STA 115 or an AP 105 or any of the wireless devices described herein may receive a second set of data units from the second wireless device over a second wireless link of the plurality of wireless links. The operations of 2315 may be performed according to the methods described herein. In certain examples, aspects of the operations of 2315 may be performed by a second link controller as described with reference to FIGS. 14 through 17.

At 2320 the STA 115 or an AP 105 or any of the wireless devices described herein may reorder the first set of data units and the second set of data units to generate a single data message for the second wireless device. The operations of 2320 may be performed according to the methods described herein. In certain examples, aspects of the operations of 2320 may be performed by a reordering manager as described with reference to FIGS. 14 through 17.

At 2325 the STA 115 or an AP 105 or any of the wireless devices described herein may replay checking the reordered first set of data units and the second set of data units. The operations of 2325 may be performed according to the methods described herein. In certain examples, aspects of the operations of 2325 may be performed by a reordering manager as described with reference to FIGS. 14 through 17.

At 2330 the STA 115 or an AP 105 or any of the wireless devices described herein may defragment the reordered first set of data units and the second set of data units. The operations of 2330 may be performed according to the methods described herein. In certain examples, aspects of the operations of 2330 may be performed by a reordering manager as described with reference to FIGS. 14 through 17.

Figure 24:
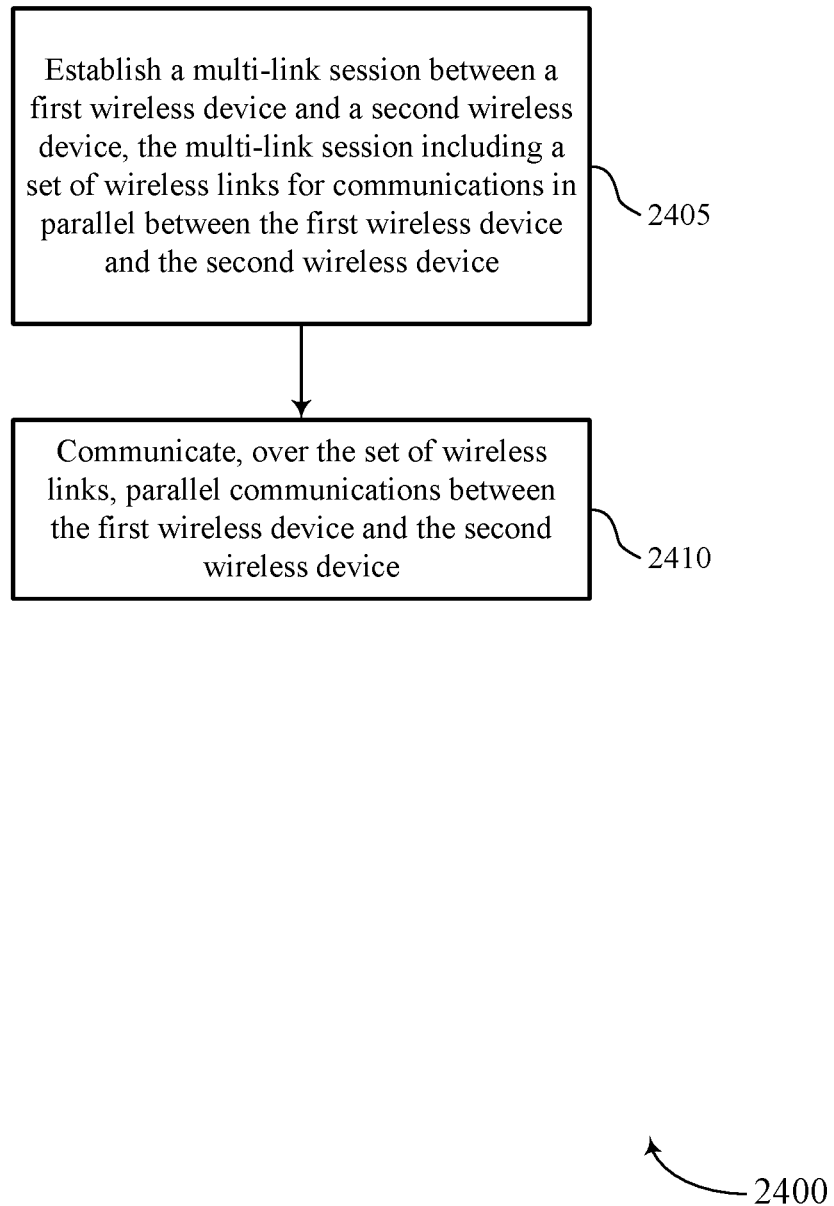

FIG. 24 shows a flowchart illustrating a method 2400 that supports packet based link aggregation architectures in accordance with aspects of the present disclosure. The operations of method 2400 may be implemented by a wireless device or its components as described herein. For example, the operations of method 2400 may be performed by a communications manager as described with reference to FIGS. 14 through 17. In some examples, a wireless device may execute a set of instructions to control the functional elements of the wireless device to perform the functions described herein. Additionally or alternatively, a wireless device may perform aspects of the functions described herein using special-purpose hardware.

At 2405, the wireless device may establish a multi-link session between a first wireless device and a second wireless device, the multi-link session including a set of wireless links for communications in parallel between the first wireless device and the second wireless device. The operations of 2405 may be performed according to the methods described herein. In some examples, aspects of the operations of 2405 may be performed by a multi-link manager as described with reference to FIGS. 14 through 17.

At 2410, the wireless device may communicate, over the set of wireless links, parallel communications between the first wireless device and the second wireless device. The operations of 2410 may be performed according to the methods described herein. In some examples, aspects of the operations of 2410 may be performed by a multi-link manager as described with reference to FIGS. 14 through 17.

Figure 25:
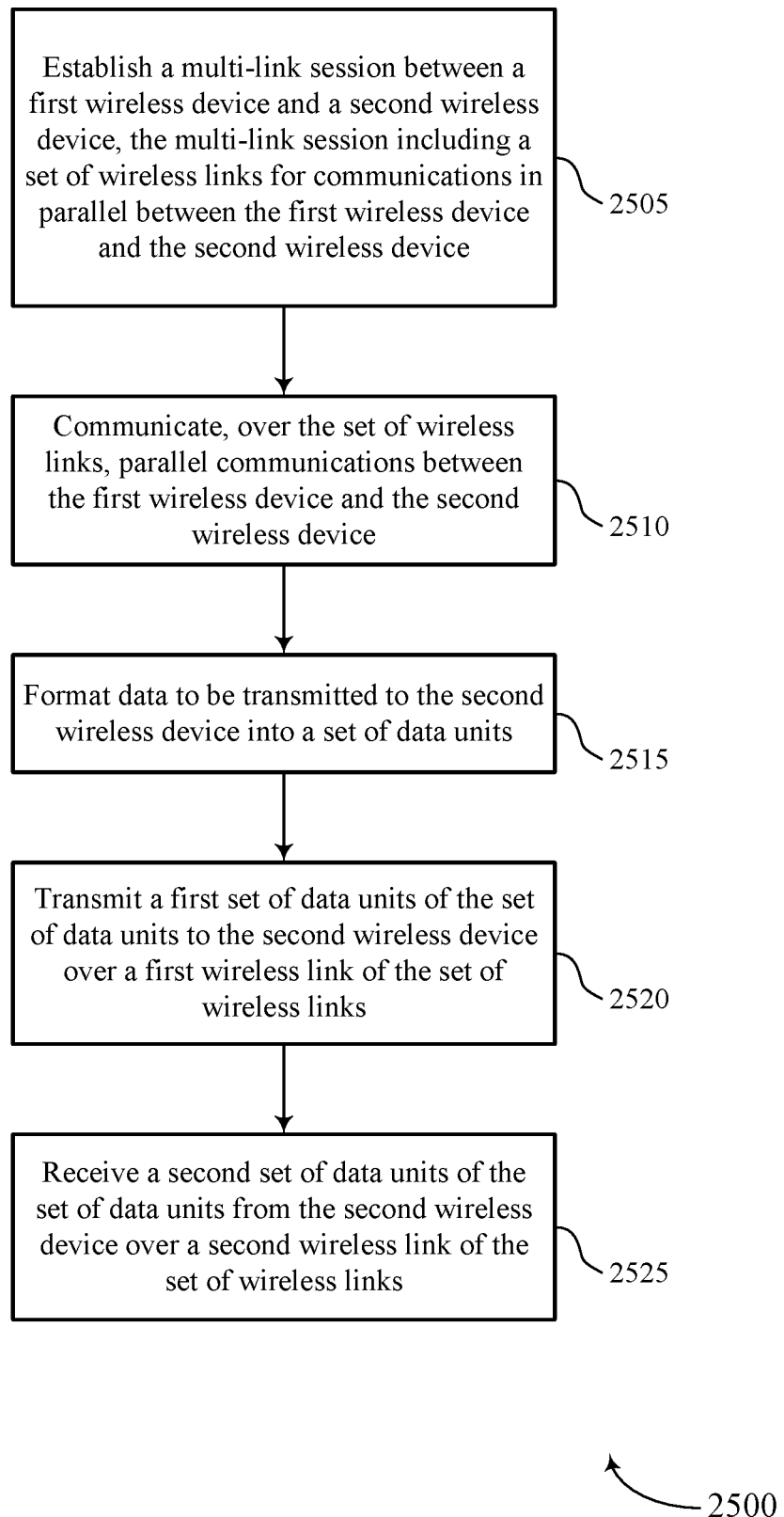

FIG. 25 shows a flowchart illustrating a method 2500 that supports packet based link aggregation architectures in accordance with aspects of the present disclosure. The operations of method 2500 may be implemented by a wireless device or its components as described herein. For example, the operations of method 2500 may be performed by a communications manager as described with reference to FIGS. 14 through 17. In some examples, a wireless device may execute a set of instructions to control the functional elements of the wireless device to perform the functions described herein. Additionally or alternatively, a wireless device may perform aspects of the functions described herein using special-purpose hardware.

At 2505, the wireless device may establish a multi-link session between a first wireless device and a second wireless device, the multi-link session including a set of wireless links for communications in parallel between the first wireless device and the second wireless device. The operations of 2505 may be performed according to the methods described herein. In some examples, aspects of the operations of 2505 may be performed by a multi-link manager as described with reference to FIGS. 14 through 17.

At 2510, the wireless device may communicate, over the set of wireless links, parallel communications between the first wireless device and the second wireless device. The operations of 2510 may be performed according to the methods described herein. In some examples, aspects of the operations of 2510 may be performed by a multi-link manager as described with reference to FIGS. 14 through 17.

At 2515, the wireless device may format data to be transmitted to the second wireless device into a set of data units. The operations of 2515 may be performed according to the methods described herein. In some examples, aspects of the operations of 2515 may be performed by a multi-link manager as described with reference to FIGS. 14 through 17.

At 2520, the wireless device may transmit a first set of data units of the set of data units to the second wireless device over a first wireless link of the set of wireless links. The operations of 2520 may be performed according to the methods described herein. In some examples, aspects of the operations of 2520 may be performed by a multi-link manager as described with reference to FIGS. 14 through 17.

At 2525, the wireless device may receive a second set of data units of the set of data units from the second wireless device over a second wireless link of the set of wireless links. The operations of 2525 may be performed according to the methods described herein. In some examples, aspects of the operations of 2525 may be performed by a multi-link manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a processor,
memory in electronic communication with the processor; and instructions stored in the memory and executable by the processor to cause the apparatus to:
  establish a multi-link session between a first wireless device and a second wireless device, the multi-link session comprising a plurality of wireless links for communications in parallel between the first wireless device and the second wireless device, wherein the plurality of wireless links support communications between a first media access control (MAC) entity of the first wireless device and a second MAC entity of the second wireless device, wherein each wireless link of the plurality of wireless links is identified by a unique address comprising a transmitter address and a receiver address;
  assign data packets associated with a plurality of traffic flows to a common transmit queue, wherein MAC service data units are allocated to the plurality of wireless links from the common transmit queue; and
  communicate, over the plurality of wireless links, parallel communications between the first wireless device and the second wireless device, wherein a first traffic flow of the plurality of traffic flows is communicated over a first wireless link of the plurality of wireless links, and a second traffic flow different from the first traffic flow of the plurality of traffic flows is communicated over a second wireless link of the plurality of wireless links.

2. The apparatus of claim 1, wherein the instructions are further executable by the processor to cause the apparatus to:
  format data to be transmitted to the second wireless device into a plurality of data units; and
  transmit a first set of data units of the plurality of data units to the second wireless device over the first wireless link of the plurality of wireless links.

3. The apparatus of claim 2, wherein the instructions are further executable by the processor to cause the apparatus to:
  receive a second set of data units of the plurality of data units from the second wireless device over the second wireless link of the plurality of wireless links.

4. The apparatus of claim 2, wherein the instructions are further executable by the processor to cause the apparatus to:
  transmit a second set of data units of the plurality of data units to the second wireless device over the second wireless link of the plurality of wireless links.

5. The apparatus of claim 4, wherein the instructions are further executable by the processor to cause the apparatus to:
  allocate the first set of data units to a first transmit queue for the first wireless link; and
  allocate the second set of data units to a second transmit queue for the second wireless link.

6. The apparatus of claim 4, wherein the instructions are further executable by the processor to cause the apparatus to:
  allocate the plurality of data units to the common transmit queue for the first wireless link and the second wireless link.

7. The apparatus of claim 2, wherein the instructions are further executable by the processor to cause the apparatus to:
  receive messages from the second wireless device over the second wireless link of the plurality of wireless links, wherein the second wireless link comprises a narrower bandwidth than the first wireless link.

8. The apparatus of claim 7, wherein the received messages from the second wireless device over the second wireless link comprise feedback responsive to the transmitted first set of data units.

9. The apparatus of claim 1, wherein the plurality of wireless links are synchronized in time.

10. The apparatus of claim 1, wherein a first radio frequency spectrum band punctures the plurality of wireless links, the first radio frequency spectrum band different from each of a plurality of radio frequency spectrum bands corresponding to the plurality of wireless links of the multi-link session.

11. The apparatus of claim 1, wherein the instructions to communicate further are executable by the processor to cause the apparatus to:
  communicate to the second wireless device over the first wireless link of the plurality of wireless links; and
  communicate to a third wireless device over the second wireless link of the plurality of wireless links.

12. The apparatus of claim 1, wherein the instructions are further executable by the processor to cause the apparatus to:
  receive a first set of data units from the second wireless device over the first wireless link of the plurality of wireless links;
  receive a second set of data units from the second wireless device over the second wireless link of the plurality of wireless links; and
  reorder the first set of data units and the second set of data units to generate a single data message for the second wireless device.

13. The apparatus of claim 12, wherein the instructions are further executable by the processor to cause the apparatus to:
  aggregate the first set of data units into a first receive queue for the first wireless link; and
  aggregate the second set of data units into a second receive queue for the second wireless link.

14. The apparatus of claim 1, wherein the first traffic flow of the plurality of traffic flows is associated with a first traffic identifier and the second traffic flow of the plurality of traffic flows is associated with a second traffic identifier.

15. The apparatus of claim 1, wherein the first traffic flow of the plurality of traffic flows is associated with a first type of data packets and the second traffic flow of the plurality of traffic flows is associated with a second type of data packets.

16. A method for wireless communication at a first wireless device, comprising:
  establish a multi-link session between the first wireless device and a second wireless device, the multi-link session comprising a plurality of wireless links for communications in parallel between the first wireless device and the second wireless device, wherein the plurality of wireless links support communications between a first media access control (MAC) entity of the first wireless device and a second MAC entity of the second wireless device, wherein each wireless link of the plurality of wireless links is identified by a unique address comprising a transmitter address and a receiver address;
  assign data packets associated with a plurality of traffic flows to a common transmit queue, wherein MAC service data units are allocated to the plurality of wireless links from the common transmit queue; and
  communicate, over the plurality of wireless links, parallel communications between the first wireless device and the second wireless device, wherein a first traffic flow of the plurality of traffic flows is communicated over a first wireless link of the plurality of wireless links, and a second traffic flow different from the first traffic flow of the plurality of traffic flows is communicated over a second wireless link of the plurality of wireless links.

17. The method of claim 16, further comprising:
formatting data to be transmitted to the second wireless device into a plurality of data units; and
transmitting a first set of data units of the plurality of data units to the second wireless device over the first wireless link of the plurality of wireless links.

18. The method of claim 17, further comprising:
receiving a second set of data units of the plurality of data units from the second wireless device over the second wireless link of the plurality of wireless links.

19. The method of claim 17, further comprising:
transmitting a second set of data units of the plurality of data units to the second wireless device over the second wireless link of the plurality of wireless links.

20. The method of claim 19, further comprising:
allocating the first set of data units to a first transmit queue for the first wireless link; and
allocating the second set of data units to a second transmit queue for the second wireless link.

21. The method of claim 19, further comprising:
allocating the plurality of data units to the common transmit queue for the first wireless link and the second wireless link.

22. The method of claim 17, further comprising:
receiving messages from the second wireless device over the second wireless link of the plurality of wireless links, wherein the second wireless link comprises a narrower bandwidth than the first wireless link.

23. The method of claim 22, wherein the received messages from the second wireless device over the second wireless link comprise feedback responsive to the transmitted first set of data units.

24. The method of claim 16, wherein the plurality of wireless links are synchronized in time.

25. The method of claim 16, wherein a first radio frequency spectrum band punctures the plurality of wireless links, the first radio frequency spectrum band different from each of a plurality of radio frequency spectrum bands corresponding to the plurality of wireless links of the multi-link session.

26. The method of claim 16, wherein communicating further comprises:
communicating to the second wireless device over the first wireless link of the plurality of wireless links; and
communicating to a third wireless device over the second wireless link of the plurality of wireless links.

27. The method of claim 16, further comprising:
receiving a first set of data units from the second wireless device over the first wireless link of the plurality of wireless links;
receiving a second set of data units from the second wireless device over the second wireless link of the plurality of wireless links; and
reordering the first set of data units and the second set of data units to generate a single data message for the second wireless device.

28. The method of claim 27, further comprising:
aggregating the first set of data units into a first receive queue for the first wireless link; and
aggregating the second set of data units into a second receive queue for the second wireless link.

29. An apparatus for wireless communication, comprising:
means for establishing a multi-link session between a first wireless device and a second wireless device, the multi-link session comprising a plurality of wireless links for communications in parallel between the first wireless device and the second wireless device, wherein the plurality of wireless links support communications between a first media access control (MAC) entity of the first wireless device and a second MAC entity of the second wireless device, wherein each wireless link of the plurality of wireless links is identified by a unique address comprising a transmitter address and a receiver address;
means for assigning data packets associated with a plurality of traffic flows to a common transmit queue, wherein MAC service data units are allocated to the plurality of wireless links from the common transmit queue; and
means for communicating, over the plurality of wireless links, parallel communications between the first wireless device and the second wireless device, wherein a first traffic flow of the plurality of traffic flows is communicated over a first wireless link of the plurality of wireless links, and a second traffic flow different from the first traffic flow of the plurality of traffic flows is communicated over a second wireless link of the plurality of wireless links.

30. The apparatus of claim 29, further comprising:
means for formatting data to be transmitted to the second wireless device into a plurality of data units; and
means for transmitting a first set of data units of the plurality of data units to the second wireless device over the first wireless link of the plurality of wireless links.

* * * * *